US008677751B2

(12) United States Patent
VanDyne et al.

(10) Patent No.: US 8,677,751 B2
(45) Date of Patent: *Mar. 25, 2014

(54) RICH FUEL MIXTURE SUPER-TURBOCHARGED ENGINE SYSTEM

(75) Inventors: Ed VanDyne, Loveland, CO (US); Jared William Brown, Fort Collins, CO (US)

(73) Assignee: VanDyne SuperTurbo, Inc., Loveland, CO (US)

( * ) Notice: Subject to any disclaimer, the term of this patent is extended or adjusted under 35 U.S.C. 154(b) by 242 days.

This patent is subject to a terminal disclaimer.

(21) Appl. No.: 13/108,831

(22) Filed: May 16, 2011

(65) Prior Publication Data

US 2012/0117962 A1    May 17, 2012

Related U.S. Application Data

(63) Continuation-in-part of application No. 13/012,778, filed on Jan. 24, 2011, and a continuation-in-part of application No. PCT/US2009/051742, filed on Jul. 24, 2009.

(51) Int. Cl.
  *F02B 33/44*       (2006.01)
(52) U.S. Cl.
  USPC .............................................. 60/606; 60/611
(58) Field of Classification Search
  USPC ................................... 60/606, 611, 607–609
  See application file for complete search history.

(56) References Cited

U.S. PATENT DOCUMENTS

| | | | |
|---|---|---|---|
| 1,874,681 A | * | 8/1932 | Woolson .................... 123/195 A |
| 4,729,225 A | | 3/1988 | Bucher |
| 5,586,540 A | | 12/1996 | Marzec et al. |

(Continued)

FOREIGN PATENT DOCUMENTS

| | | | |
|---|---|---|---|
| EP | 2183471 | 5/2010 | |
| JP | 63109235 A | * 5/1988 | ............. F02B 37/10 |
| JP | 9209742 | 8/1997 | |

OTHER PUBLICATIONS

International Search Report, mailed Nov. 2, 2009, in PCT Application Serial No. PCT/US09/51742.

(Continued)

*Primary Examiner* — Thai Ba Trieu
*Assistant Examiner* — Ngoc T Nguyen
(74) *Attorney, Agent, or Firm* — William W. Cochran; Cochran Freund & Young LLC

(57) ABSTRACT

Disclosed is a super-turbocharger system that increases power and efficiency of an engine. The system uses the exothermic properties of a catalytic converter to extract additional energy from exhaust heat that is used to add power to the engine. Compressed air is supplied and mixed with exhaust gases upstream and/or downstream from a catalytic converter that is connected to an exhaust manifold. The gaseous mixture of exhaust gases and compressed air is sufficiently rich in oxygen to oxidize hydrocarbons and carbon monoxide in the catalytic converter, which adds heat to the gaseous mixture. In addition, a sufficient amount of compressed air is supplied to the exhaust gases to maintain the temperature of the gaseous mixture at a substantially optimal temperature level. The gaseous mixture is applied to the turbine of the super-turbocharger, which increases the output of said super-turbocharger, which increases the power and efficiency of said engine. The engine throttle is used to control the pressure level of the compressed air to ensure proper flow of cooling gases and oxidation gases.

39 Claims, 21 Drawing Sheets

(56) References Cited

U.S. PATENT DOCUMENTS

| | | | |
|---|---|---|---|
| 5,709,081 A * | 1/1998 | Bruestle | 60/274 |
| 5,713,204 A | 2/1998 | Kadlicko | |
| 6,062,026 A | 5/2000 | Woollenweber et al. | |
| 6,227,180 B1 | 5/2001 | Hoffman et al. | |
| 6,276,139 B1 * | 8/2001 | Moraal et al. | 60/605.2 |
| 6,427,639 B1 | 8/2002 | Andrews et al. | |
| 6,637,204 B2 * | 10/2003 | Ellmer et al. | 60/606 |
| 6,681,574 B2 | 1/2004 | Berglund et al. | |
| 7,251,932 B2 * | 8/2007 | Huang | 60/297 |
| 8,109,093 B2 | 2/2012 | Hallback et al. | |
| 8,200,413 B2 * | 6/2012 | Brooks et al. | 701/103 |
| 2003/0196436 A1 | 10/2003 | Hoecker et al. | |
| 2006/0032225 A1 | 2/2006 | VanDyne et al. | |
| 2007/0062189 A1 | 3/2007 | Keppeler et al. | |
| 2008/0133110 A1 | 6/2008 | Vetrovec | |
| 2009/0277431 A1 | 11/2009 | Nitzke et al. | |

OTHER PUBLICATIONS

International Search Report, mailed Apr. 4, 2011, in PCT Application Serial No. PCT/US2011/22298.

English translation of JP9209742, published on Aug. 12, 1997.

* cited by examiner

RICH FUEL MIXTURE SUPER-TURBOCHARGED ENGINE SYSTEM

CROSS-REFERENCE TO RELATED APPLICATION

This patent application is a continuation-in-part of U.S. application Ser. No. 13/012,778, filed Jan. 24, 2011, by Ed VanDyne, Volker Schumacher, Jared, William Brown and Tom Waldron, which application is a continuation-in-part of PCT Application Serial No. PCT/US09/51742, filed Jul. 24, 2009, by Woodward Governor Company, the entire teachings and disclosures of which are incorporated herein by reference thereto.

BACKGROUND OF THE INVENTION

Super-turbochargers are convenient devices for increasing the power and/or efficiency of internal combustion engines. A smaller, more efficient engine that uses a super-turbocharger can produce the same power as a larger, less efficient engine, thereby improving the overall efficiency of the system. Super-turbochargers have at least one compressor and at least one turbine that are connected to a power transmission device that transmits power to and receives power from a propulsion train that is coupled to the engine, or to a crank shaft, vehicle transmission, or other coupling when the engine is used on a vehicle. In this manner, super-turbochargers can increase the performance of a piston engine, whether that engine is used on a vehicle, for power generation, or other function.

BRIEF SUMMARY OF THE INVENTION

An embodiment of the present invention may therefore comprise a method of improving performance of an engine system having a super turbocharger, the engine system having an engine that operates with a rich fuel mixture comprising: generating an amount of compressed air from a compressor that compresses intake air in the superturbocharger in response to a control signal; using a throttle control to increase pressure levels of the compressed air; mixing the amount of the compressed air with exhaust gases from the engine to produce a gaseous mixture of the exhaust gases and the compressed air; supplying the gaseous mixture to a catalytic converter; detecting oxygen levels of the gaseous mixture that enter the catalytic converter; detecting the temperature levels of the gaseous mixture exiting the catalytic converter; adjusting the amount of compressed air, in response to the oxygen levels, to provide a sufficient amount of the compressed air to substantially oxidize hydrocarbons and carbon monoxide present in the gaseous mixture in the catalytic converter, while maintaining a predetermined substantially optimal temperature level of the gaseous mixture; supplying the gaseous mixture to a turbine of the super-turbocharger to drive the super-turbocharger.

An embodiment of the present invention may further comprise an engine system that operates with a rich fuel mixture comprising: a super-turbocharger having a turbine and a compressor that supplies an amount of compressed air; a throttle that increases pressure of the compressed air; a mixing chamber that mixes exhaust gases from the engine system with the amount of compressed air to produce a gaseous mixture of the exhaust gases and the compressed air; a catalytic converter coupled to the mixing chamber that receives the gaseous mixture; an oxygen sensor that senses oxygen levels of the gaseous mixture entering the catalytic converter and generates an oxygen sensor signal; a temperature sensor that senses the temperature levels of the gaseous mixture exiting the catalytic converter and generates a temperature sensor signal; a controller that generates the control signal in response to the oxygen sensor signal and the temperature sensor signal so that the amount of compressed air supplied by the additional compressor to the catalytic converter is sufficient for the catalytic converter to substantially oxidize hydrocarbons and carbon monoxide in the gaseous mixture while maintaining a predetermined substantially optimal temperature level of the gaseous mixture exiting the catalytic converter, and controls operation of the throttle to increase the pressure of the compressed air; supplying the gaseous mixture to the turbine to drive the super-turbocharger.

An embodiment of the present invention may further comprise a method of improving performance of an engine system having a super-turbocharger comprising: providing a catalytic converter that receives exhaust gases from the engine system and produces an exothermic reaction that adds heat to the exhaust gases to generate converted hot exhaust gases at an output of the catalytic converter; providing compressed air from a compressor; using a throttle to increase pressure levels of the compressed air; mixing a portion of the compressed air with the converted hot exhaust gases from the catalytic converter to create a gaseous mixture having a temperature that does not exceed a predetermined maximum temperature so as to prevent damage to the turbine of the super-turbocharger; driving the turbine with the gaseous mixture; transferring excess turbine rotational mechanical energy from the turbine to a propulsion train that would otherwise cause the turbine to rotate at a speed which would cause damage to the compressor.

An embodiment of the present invention may further comprise a method of improving performance of a super-turbocharged engine system comprising: providing an engine; providing a catalytic converter that is connected to an exhaust outlet proximate to the engine that receives engine exhaust gases from the engine that activate an exothermic reaction in the catalytic converter which adds additional energy to the engine exhaust gases and produces catalytic converter exhaust gases at an output of the catalytic converter that are hotter than the engine exhaust gases; providing a flow of compressed air to an intake of the engine; increasing pressure levels of the compressed air using a throttle; mixing the additional compressed air with the catalytic converter exhaust gases downstream from the catalytic converter to produce a gaseous mixture of the catalytic converter exhaust gases and the additional compressed air; generating a control signal to regulate the flow of the additional compressed air into the mixing chamber to maintain the gaseous mixture below a maximum temperature; supplying the gaseous mixture to a turbine that produces turbine rotational mechanical energy in response to flow of the gaseous mixture; transmitting the turbine rotational mechanical energy from the turbine to the compressor that uses the turbine rotational mechanical energy to compress a source of air to produce the compressed air when the flow of the gas mixture through the turbine is sufficient to drive the compressor; extracting at least a portion of the turbine rotational mechanical energy from the turbine and applying the portion of the turbine rotational mechanical energy to a propulsion train when the portion of the turbine rotational mechanical energy from the turbine is not needed to run the compressor; providing propulsion train rotational mechanical energy from the propulsion train to the compressor to prevent turbo-lag when the flow of the gaseous mixture through the turbine is not sufficient to drive the compressor.

An embodiment of the present invention may further comprise a super-turbocharged engine comprising: an engine; a catalytic converter connected to an exhaust conduit proximate to an exhaust outlet of the engine such that hot exhaust gases from the engine activate an exothermic reaction in the catalytic converter that adds energy to the hot exhaust gases and produces converted exhaust gases; a compressor connected to a source of air that provides compressed air that is applied to an intake of the engine; a throttle on the engine that increases pressure levels of the compressed air to a level that is greater than exhaust gas pressure levels; a conduit that supplies the compressed air to the converted exhaust gases so that the compressed air is mixed with the converted exhaust gases to produce a gaseous mixture; a turbine that is mechanically coupled to the compressor and generates turbine rotational mechanical energy from the gaseous mixture; a controller that generates a control signal that regulates the amount of the compressed air to maintain the gaseous mixture below a maximum temperature; a transmission that provides propulsion train rotational mechanical energy from a propulsion train to the compressor to reduce turbo-lag when the flow of the exhaust through the turbine is not sufficient to drive the compressor to a desired boost level, and extracts excess turbine rotational mechanical energy from the turbine to maintain rotational speeds of the compressor below a predetermined maximum rotational speed at which damage would occur to the compressor.

An embodiment of the present invention may further comprise a method of increasing the performance of a piston engine system having a super turbocharger: applying exhaust gases from the piston engine system to an $NO_X$ converter, which converts the exhaust gases to produce $NO_X$ converted gases; generating an amount of compressed air from a compressor in response to a control signal; increasing pressure levels of the compressed air using a throttle; mixing the amount of the compressed air with the $NO_X$ converted gases to produce a gaseous mixture of the $NO_X$ converted gases and the compressed air; supplying the gaseous mixture to a hydrocarbon/carbon monoxide converter to produce hydrocarbon/carbon monoxide converted gases; detecting the temperature level of the hydrocarbon/carbon monoxide converted gases; adjusting the amount of compressed air to adjust the temperature level of the hydrocarbon/carbon monoxide converted gases to a desired temperature level.

An embodiment of the present invention may further comprise a method of increasing the performance of a piston engine system having a super turbocharger: applying exhaust gases from the piston engine system to an $NO_X$ converter, which converts the exhaust gases to produce $NO_X$ converted gases; generating a first amount of compressed air; increasing pressure levels of the first amount of compressed air using a throttle that controls the first amount of compressed air that is applied to an input of the piston engine system; mixing the first amount of the compressed air with the $NO_X$ converted gases to produce a first gaseous mixture of the $NO_X$ converted gases and the compressed air; supplying the first gaseous mixture to a hydrocarbon/carbon monoxide converter to produce hydrocarbon/carbon monoxide converted gases; generating a second amount of compressed air; increasing pressure levels of the second amount of compressed air using a throttle that controls the second amount of compressed air that is applied to the input of said piston engine system; mixing the second amount of compressed air with the hydrocarbon/carbon monoxide converted gases to cool the hydrocarbon/carbon monoxide converted gases to a desired temperature to produce cooled hydrocarbon/carbon monoxide converted gases; driving a turbine of the superturbocharger with the cooled hydrocarbon/carbon monoxide converted gases.

An embodiment of the present invention may further comprise a super-turbocharged engine system comprising a piston engine that generates exhaust gases; a $NO_X$ converter coupled to receive the exhaust gases and produce $NO_X$ converted gases; a compressor connected to a source of air that provides compressed air that is applied to an intake of the engine; a throttle that increases pressure levels of the compressed air; a feedback valve that supplies a portion of the compressed air that is mixed with the $NO_X$ converted gases to produce a gaseous mixture; a hydrocarbon/carbon monoxide converter connected to receive the gaseous mixture and oxidize hydrocarbons and carbon monoxide in the gaseous mixture to produce a hydrocarbon/carbon monoxide converted gaseous mixture; a turbine that is coupled to receive the hydrocarbon/carbon monoxide gaseous mixture and generate turbine rotational mechanical energy from the hydrocarbon/carbon monoxide converted gaseous mixture.

An embodiment of the present invention may further comprise a super-turbocharged engine system comprising: a piston engine that generates exhaust gases; a $NO_X$ converter coupled to receive the exhaust gases and produce $NO_X$ converted gases; a compressor that generates a source of compressed air; a throttle that increases pressure levels of the compressed air; a conduit that supplies the compressed air to the $NO_X$ converted gases so that the $NO_X$ converted gases are mixed with the compressed air to produce a gaseous mixture; a hydrocarbon/carbon monoxide converter coupled to receive the gaseous mixture and oxidize hydrocarbons and carbon monoxide present in the gaseous mixture to produce a hydrocarbon/carbon monoxide converted gaseous mixture; a turbine that is coupled to receive the hydrocarbon/carbon monoxide gaseous mixture and generate turbine rotational mechanical energy from the hydrocarbon/carbon monoxide converted gaseous mixture.

DETAILED DESCRIPTION OF THE EMBODIMENTS

Figure 1:
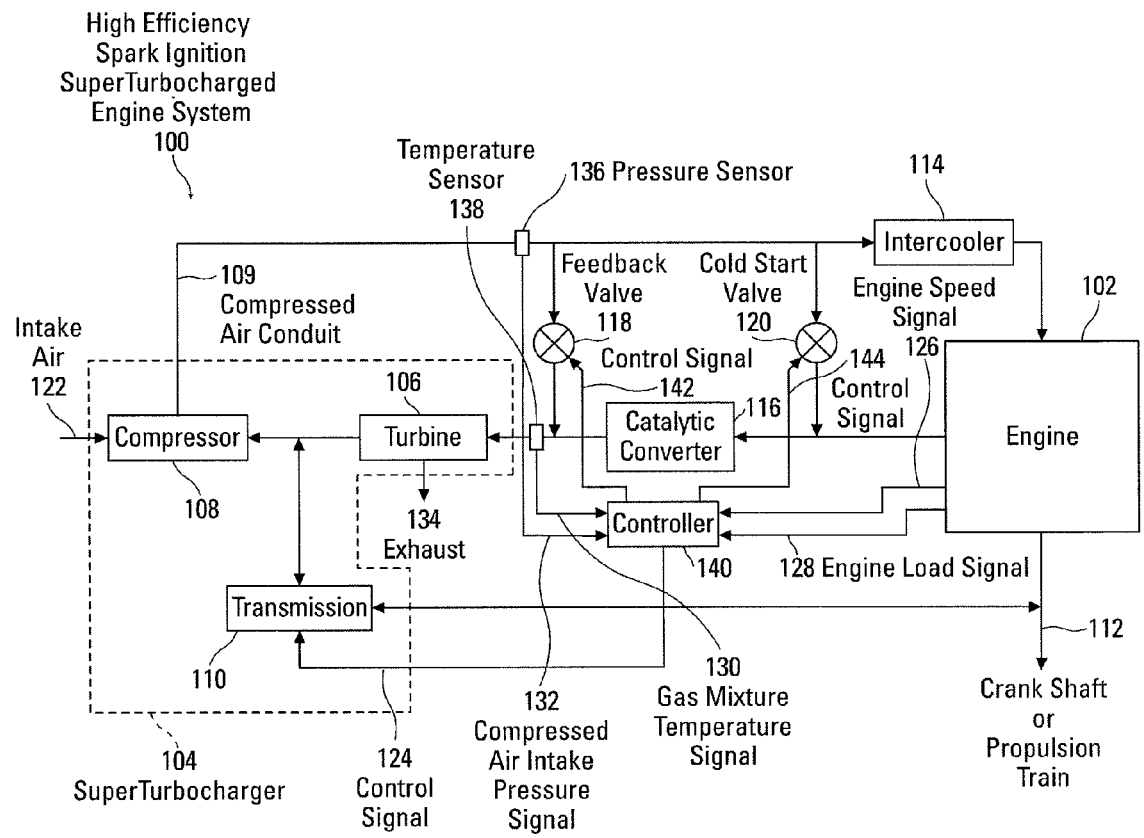
FIG. 1 is a simplified single line system diagram of one embodiment of a super-turbocharger engine in accordance with the teachings of the present invention.

FIG. 1 is simplified illustration of one embodiment of a high efficiency, super-turbocharged engine system 100 constructed in accordance with the teachings of the present invention. As will become apparent to those skilled in the art from the following description, such a super-turbocharged engine system 100 finds particular applicability in spark ignited, gasoline engines that are used in passenger and commercial vehicles, and therefore the illustrative examples discussed herein utilize such an environment to aid in the understanding of the invention. However, recognizing that embodiments of system 100 of the present invention have applicability to other operating environments such as, for example, land based, power generation engines, and other land based engines, such examples should be taken by way of illustration and not by way of limitation.

As may be seen from FIG. 1, the system 100 includes an engine 102 that utilizes a super-turbocharger 104 to increase the performance of the engine 102. In general, a super-turbocharger comprises a compressor and a turbine that are coupled together with a turbo shaft. Other ways to couple the compressor and turbine together have been used. Further, the super-turbocharger includes a transmission which transmits power between the turbo shaft and the power train or drive train (propulsion train) of the vehicle. For example, the transmission may be mechanically coupled to the crank shaft of an engine, to the vehicle's transmission, or other portions of the drive train or power train. These are collectively referred to as the propulsion train. The transmission can be a mechanical transmission that uses gearing, a hydraulic transmission, pneumatic transmission, a traction drive transmission or an electrical transmission. An electric motor/generator can be coupled to the turbo shaft and used to either drive the turbo shaft or be driven by the turbo shaft and generate electrical energy. The electrical energy generated by the motor/generator can be used to simply produce electricity, charge batteries, drive motor/generators that are used to propel a vehicle, or assist in powering a hybrid vehicle. In that regard, the super-turbocharged engine system 100 may be sized and used for the purposes of generating electricity in an electric car system, or may be employed to both generate energy and assist in powering the vehicle with mechanical energy, such as in a hybrid vehicle system.

As shown in FIG. 1, the super-turbocharger 104 includes a turbine 106, a compressor 108, and a transmission 110 that is coupled to the crank shaft 112 of the engine 102 or other portions of the propulsion train. While not required in all embodiments, the illustrated embodiment of FIG. 1 also includes an intercooler 114 to increase the density of the air supplied to the engine 102 from the compressor 108 to further increase the power available from the engine 102.

Super-turbochargers have certain advantages over turbochargers. A turbocharger utilizes a turbine that is driven by the exhaust of the engine. This turbine is coupled to a compressor which compresses the intake air that is fed into the cylinders of the engine. The turbine in a turbocharger is driven by the exhaust from the engine. As such, the engine experiences a lag in boost when first accelerated until there is enough hot exhaust to spin up the turbine to power a compressor, which is mechanically coupled to the turbine, to generate sufficient boost. To minimize lag, smaller and/or lighter turbochargers are typically utilized. The lower inertia of the lightweight turbochargers allows them to spin up very quickly, thereby minimizing the lag in performance.

Unfortunately, such smaller and/or lighter weight turbochargers may be over-sped during high engine speed operation when a great deal of exhaust flow and temperature is produced. To prevent such over-speed occurrences, typical turbochargers include a waste gate valve that is installed in the exhaust pipe upstream from the turbine. The waste gate valve is a pressure operated valve that diverts some of the exhaust gas around the turbine when the output pressure of the compressor exceeds a predetermined limit. This limit is set at a pressure which is less than the pressure which would cause the turbocharger to be over-sped. Unfortunately, this results in a portion of the energy available from the exhaust gases of the engine being wasted.

Recognizing that conventional turbochargers sacrifice low end performance for high end power, devices known as super-turbochargers were developed. One such super-turbocharger is described in U.S. Pat. No. 7,490,594 entitled "Super-Turbocharger," issued Feb. 17, 2009, and assigned to the assignee of the instant application. This application is specifically incorporated herein by reference for all that it discloses and teaches.

As discussed in the above-referenced application, in a super-turbocharger the compressor is driven by the engine crank shaft via a transmission that is coupled to the engine during low engine speed operation when sufficiently heated engine exhaust gas is not available to drive the turbine. The mechanical energy supplied by the engine to the compressor reduces the turbo lag problem suffered by conventional turbochargers, and allows for a larger or more efficient turbine and compressor to be used.

The super-turbocharger 104, illustrated in FIG. 1, operates to supply compressed air from the compressor 108 to the engine 102 without suffering from the turbo-lag problem of a conventional turbocharger at the low end and without wasting energy available from the engine exhaust gas heat supplied to the turbine 106 at the high end. These advantages are provided by inclusion of the transmission 110 that can both extract power from, and supply power to, the engine crank shaft 112 to both drive the compressor 108 and load the turbine 106, respectfully, during various modes of operation of the engine 102.

During start up, when conventional turbochargers suffer a lag due to the lack of sufficient power from the engine exhaust heat to drive the turbine, the super-turbocharger 104 provides a supercharging action whereby power is taken from the crank shaft 112 via the transmission 110 to drive the compressor 108 to provide sufficient boost to the engine 102. As the engine comes up to speed and the amount of power available from the engine exhaust gas heat is sufficient to drive the turbine 106, the amount of power taken from the crank shaft 112 by the transmission 110 is reduced. Thereafter, the turbine 106 continues to supply power to the compressor 108 to compress the intake air for use by the engine 102.

As the engine speed increases, the amount of power available from the engine exhaust gas heat increases to the point where the turbine 106 would over-speed in a conventional turbocharger. However, in super-turbocharger 104, the excess energy provided by the engine exhaust gas heat to the turbine 106 is channeled through the transmission 110 to the engine crank shaft 112 while maintaining the compressor 108 at the proper speed to supply the ideal boost to the engine 102. As more output power is available from the exhaust gas heat of the engine 102, more power is generated by the turbine 106, which is channeled through the transmission 110 to the crank shaft 112, while boost available from the compressor 108 is maintained. Loading of the turbine 106 by the transmission 110 prevents the turbine 106 from over-speeding and maximizes the efficiency of the power extracted from the engines exhaust gases. As such, a conventional waste gate is not required and energy is not lost through a waste gate.

While the amount of power available to drive the turbine 106 in a conventional super-turbocharged application is limited strictly to the amount of power available from the engine exhaust, the turbine 106 is capable of generating significantly more power if the thermal energy and mass flow supplied to the turbine blades can be fully utilized and/or can be increased. However, the turbine 106 cannot operate above a certain temperature without damage, and the mass flow is conventionally limited to the exhaust gases coming out of the engine 102.

Recognizing this, the embodiment of the system 100 is capable of extracting additional energy from the exhaust gases while protecting the turbine 106 from high temperature transients. In one embodiment, the catalytic converter 116 is placed upstream from the turbine near the exhaust manifold which enables exothermic reactions that result in an increase in exhaust gas temperature during sustained high speed or high load operation of the engine. To cool the exhaust gas, prior to reaching the turbine, a portion of the compressed air generated by the compressor 108 is fed directly into the exhaust upstream from the turbine via a controllable feedback valve 118 and added to the engine exhaust gases leaving the catalytic converter 116. The cooler intake air 122 expands and cools the exhaust gas and adds additional mass to the exhaust gas flow, which adds additional power to the turbine of the super-turbocharger, as described in more detail below. As more cooler air is provided to the hot exhaust gases to maintain the temperature of the combined flow to the turbine at the optimum temperature, the energy and the mass flow that is delivered to the turbine blades also increases. This increases the power supplied by the turbine to drive the engine crank shaft.

So as to not interfere with the stoichiometric reaction within the catalytic converter, the compressor feedback air is added downstream of the catalytic converter. In such an embodiment, the engine exhaust gas is passed through the catalytic converter and temperature of the exhaust gas is increased by the exothermic reaction. The compressor feedback air is then added and expands so that the total mass flow supplied to the turbine is increased. Embodiments of the present invention control the amount of compressed feedback air supplied to cool the exhaust and to drive the turbine to ensure that the combination of the cooler compressor feedback air and the engine exhaust gases are delivered to the turbine at an optimum temperature for turbine blade operation.

Since the catalytic converter 116, illustrated in FIG. 1, has a large thermal mass, catalytic converter 116 operates as a thermal damper initially, which prevents high temperature thermal spikes from reaching the turbine 106. However, since the reactions in the catalytic converter 116 are exothermic in nature, the temperature of the exhaust gases leaving the catalytic converter 116 will eventually be higher than that of the exhaust gas entering the catalytic converter 116. So long as the temperature of the exhaust gas entering the turbine remains below the maximum operating temperature of the turbine 106, the turbine will not be damaged.

However, during sustained high speed and high load operation of the engine 102, the exit temperatures of the converted exhaust gas from catalytic converter 116 can exceed the maximum operating temperature of turbine 106. As set forth above, the temperature of the exhaust gases exiting the catalytic converter 116 are reduced by supplying a portion of the compressed air from the compressor 108 via a feedback valve 118, and mixed with the exhaust gas exiting the catalytic converter 116. Significantly improved fuel economy is achieved by not using fuel as a coolant during such conditions, as is done in conventional systems. Additionally, the operation of the transmission is controlled to allow the compressor 108 to supply a sufficient amount of compressed air to provide optimum boost to the engine 102 and the compressed feedback air to the turbine 106 via the feedback valve 118. The excess power generated by the turbine 106 resulting from the increased mass flow of the compressed air through the turbine is channeled via the transmission 110 to the crank shaft 112, yet further increasing fuel efficiency.

The output temperature of the compressed air from the compressor 108 is typically between about 200° C. to 300° C. A conventional turbine can operate optimally to extract power from gases at approximately 950° C., but not significantly higher, without distortion or possible failure. Because of the material limits of the turbine blades, the optimal power is achieved at approximately 950° C. Since the materials limit the exhaust gas temperatures to about 950° C., supplying more air to increase the mass flow across the turbine at the temperature limit, e.g., 950° C., increases the performance of the turbine.

While such a flow of compressed feedback air at 200° C. to 300° C. is helpful in reducing the temperature of the exhaust gas coming out of the catalytic converter 116, it is recognized that maximum power from the turbine 106 can be supplied when the temperature and the mass flow is maximized within the thermal limits of the turbine 106. As such, in one embodiment, the amount of feedback air is controlled so that the combination of exhaust gas and feedback air is maintained at or near the turbine's maximum operating temperature so that the amount of power delivered to the turbine is maximized or significantly increased. Since all of this excess power is normally not required by the compressor 108 to supply the optimum boost to engine 102 and to supply the compressor feedback air via feedback valve 118, the excess power may be transferred by the transmission 110 to the crank shaft 112 of the engine 102, or to the propulsion train of a vehicle, to thereby increase the overall efficiency or power of the engine 102.

As discussed above, in one embodiment, the connection of the compressor feedback air via feedback valve 118 employs a catalytic converter 116 as the thermal buffer between the engine 102 and turbine 106. As such, the supply of air from the compressor is provided downstream of the catalytic converter 116 so as to not disrupt the stoichiometric reaction within the catalytic converter 116. That is, in embodiments that utilize a catalytic converter 116, supplying the compressor feedback air upstream of the catalytic converter 116 would result in excess oxygen being supplied to the catalytic converter 116, thereby preventing the catalytic converter 116 from generating a stoichiometric reaction that is required for proper operation, as described in more detail below.

Since increased efficiency of power generation by the turbine 106 is achieved when the temperature of the gas mixture of the compressor feedback air and exhaust gas on the turbine blades is nearly maximized (within the material limits of the turbine itself), the amount of compressor feedback air admitted by the feedback valve 118 is limited so as to not reduce the temperature significantly below such an optimized temperature. As the catalytic converter 116 produces more thermal energy via an exothermic reaction and the temperature of the converted exhaust gases from the catalytic converter 116 increases to near the maximum operating temperature of the turbine 106, more compressor feedback air may be supplied via feedback valve 118, which increases the mass flow and energy supplied to the turbine 106. As the amount of thermal energy generated by catalytic converter 116 is reduced, the amount of compressor feedback air supplied by feedback valve 118 can also be reduced so as to avoid supplying more air than necessary, which results in the maintenance of the temperature of the gas mixture at nearly the optimum operating condition.

In another embodiment, the system utilizes the feedback valve 118 for feeding back the cooler compressor air into the exhaust ahead of the turbine at low speed, high load operating conditions to avoid surging the compressor. Compressor surge occurs when the compressor pressure gets high but the mass flow allowed into the engine is low as a result of the engine from turning at a slow rpm and not requiring much intake air flow. Surging (or aerodynamic stalling) of the compressor resulting from low airflow across the compressor blades causes the efficiency of the compressor to fall very rapidly. In the case of a normal turbocharger, enough surge can stop the turbine from spinning. In the case of a super-turbocharger it is possible to use power from the engine crank shaft to push the compressor into surge. Opening the feedback valve 118 allows a portion of the compressed air to feedback around the engine. This feedback flow brings the compressor out of surge and allows higher boost pressure to reach the engine 102, thereby allowing the engine 102 to generate more power than would normally be possible at low engine speeds. Injecting the compressed air into the exhaust ahead of the turbine conserves the total mass flow through the compressor so that all the flow reaches the turbine which minimizes the power needed from the engine to supercharge to a high boost pressure level.

In another embodiment, an additional cold start control valve 120 may be included for operation during rich engine cold starts. During such an engine cold start, the exhaust gases from the engine 102 typically include excess un-burnt fuel. Since this rich mixture is not stoichiometric, the catalytic converter 116 is unable to fully oxidize the un-burnt hydrocarbons (UHC) in the exhaust gas. During such times, the cold start control valve 120 may be opened to provide compressor feedback air to the input of the catalytic converter 116 to supply the extra oxygen necessary to bring the rich mixture down to stoichiometric levels. This allows the catalytic converter 116 to light off faster and more efficiently reduce the emissions during the cold start event. If the engine is idling, a normal turbocharger would have no boost pressure to be able to supply the feedback air. However, the transmission ratio of transmission 110 can be adjusted to give enough speed to the compressor to generate the pressure needed for the air to flow through valve 120. In that regard, control signal 124 can be used to adjust the ratio of transmission 110 so that sufficient rotational speed can be provided from the engine drive shaft 112 to the compressor 108 during idling, especially during a cold start, to compress enough air to flow through the cold start valve 120 and ignite catalytic converter 116 with a sufficient amount of oxygen.

The requirement for the additional oxygen is typically limited in a cold start event, and often lasts only for 30 to 40 seconds. Many vehicles currently include a separate air pump to supply this oxygen during the cold start event, at significant cost and weight compared to the limited amount of time that such an air pump is required to operate. By replacing the separate air pump with the simple cold start control valve 120, significant costs, weight and complexity savings are realized. Because the super-turbocharger 104 can control the speed of the compressor 108 via the transmission 110, the cold start control valve 120 may comprise a simple on-off valve. The amount of air supplied during the cold start event can then be controlled by controlling the speed of the compressor 108 via transmission 110 under operation of the control signal 124.

The cold start control valve 120 may also be used during periods of extremely high temperature operation if fuel is used as a coolant within the engine and/or for the catalytic converter 116, despite the negative effect on fuel efficiency. As explained in more detail below, the cold start control valve 120 will be able to supply the extra oxygen necessary to bring the rich exhaust back down to stoichiometric levels to allow the catalytic converter 116 to properly oxidize the unburned hydrocarbon emissions in the exhaust. This provides a significant benefit to the environment over prior systems.

In embodiments where the cold start control valve 120 is an on/off valve, the system can modulate cold start control valve 120 to vary the amount of compressed air supplied so as to bring the exhaust down to stoichiometric levels. Other types of variable flow control valves may also be used to accomplish this same function.

FIG. 1 also discloses a controller 140. Controller 140 controls the operation of the feedback valve 118 and the cold start valve 120. Controller 140 operates to optimize the amount of air flow through feedback valve 118 for different conditions. The amount of air that flows through the feedback valve 118, for optimal operation, is the minimal amount of air flow that is necessary to obtain a specific desired condition, as described above. There are two specific conditions in which controller 140 operates feedback valve 118, which are: 1) surge limit of the compressor for a given boost requirement is approaching when the engine is operating at low rpm, high load conditions; and, 2) temperature of the gas mixture entering the turbine 106 is nearing temperature limits when the engine is operating at high rpm, high load conditions.

As shown in FIG. 1, controller 140 receives the gas mixture temperature signal 130 from a temperature sensor 138 that detects the temperature of the gas mixture of the cooling air supplied from the compressor 108 that is mixed with the hot exhaust gases produced by the catalytic converter 116. In addition, the controller 140 detects the compressed air intake pressure signal 132 that is generated by the pressure sensor 136 that is disposed in the conduit of compressed air supplied from the compressor 108. Further, an engine speed signal 126 and an engine load signal 128 that are supplied from the engine 102, or a throttle, are fed to the controller 140.

With respect to control of the temperature of the gas mixture that is supplied to the turbine 106 at high speed, high load conditions, controller 140 generates control signals to operate feedback valve 118 to limit the temperature of the gas mixture to a temperature that, in some cases, maximizes the operation of the turbine 106, without being so high as to damage the mechanisms of the turbine 106. In one embodiment, a temperature of approximately 925° C. is an optimal temperature for the gas mixture to operate the turbine 106. Once the temperature of the gas mixture that is fed into the turbine 106 begins to exceed 900° C., the feedback valve 118 is opened, to allow compressed air from the compressor 108 to cool the hot exhaust gases from the catalytic converter 116 prior to passing into the turbine 106. The controller 140 can be designed to target a temperature of approximately 925° C., with an upper bound of 950° C. and a lower bound of 900° C. The limit of just slightly more than 950° C. is one at which damage to the turbine 106 may occur using conventional materials. Of course, the controller can be designed for other temperatures, depending upon the particular types of components and materials used in the turbine 106. A conventional proportional integral derivative (PID) control logic device can be used in the controller 140 to produce these controlled results.

The benefit of controlling the temperature of the gas mixture that enters the turbine 106 is that the use of fuel in the exhaust to limit the turbine inlet temperatures of the gas mixture is eliminated, which increases efficiency of the system. Using the flow of the cooler compressed air to cool the hot exhaust gases from the catalytic converter 116 requires a large amount of air, which contains a large mass to achieve the desired cooler temperatures of the gas mixture. The amount of air that is required to cool the hot exhaust gases from the catalytic converter 116 is large because the cooler compressed air from the compressor 108 is not a good coolant, especially when compared to liquid fuel that is inserted in the exhaust gas. The hot exhaust gases from the output of the catalytic converter 116 cause the cooler compressed gas from the compressor 108 to expand to create the gas mixture. Since a large mass of the cooler compressed air from the compressor 108 is required to lower the temperature of the hot exhaust gases from the catalytic converter 116, a large mass flow of the gas mixture flows across the turbine 106, which greatly increases the output of the turbine 106. The turbine power increases by the difference of the power created by the differential of the mass flow minus the work required to compress the compressed air flowing through the feedback valve 118. By obtaining the gas mixture temperature signal 130 from temperature sensor 138 and controlling the addition of compressed air by feedback valve 118, the maximum temperature is not exceeded.

Controller 140 also controls the feedback valve 118 to limit surge in the compressor 108. The surge limit is a boundary that varies as a function of the boost pressure, the flow of air through the compressor and the design of the compressor 108. Compressors, such as compressor 108, that are typically used in turbochargers, exceed a surge limit when the flow of intake air 122 is low and the pressure ratio between the intake air 122 and the compressed air is high. In conventional super-turbochargers, the flow of intake air 122 is low when the engine speed (rpm) 126 is low. At low rpm, when the compressed air is not used in large volumes by the engine 102, the mass flow of intake air 122 is low and surge occurs because the rotating compressor 108 cannot push air into a high pressure conduit without a reasonable flow of intake air 122. The feedback valve 118 allows flow through the compressed air conduit 109 and prevents or reduces surge in the compressor 108. Once surge in the compressor 108 occurs, the pressure in the compressed air conduit 109 cannot be maintained. Hence, at low rpm, high load operating conditions of the engine 102, the pressure of the compressed air in the compressed air conduit 109 may drop below desired levels. By opening the feedback valve 118, the flow of intake air 122 through the compressor 108 is increased, especially at low rpm, high load operating conditions of the engine, which allows the desired level of boost to be achieved in the compressed air conduit 109. Feedback valve 118 can simply be opened until the desired pressure in the compressed air conduit 109 is reached. However, by simply detecting boost pressure in the compressed air conduit 109, surge will occur prior to the feedback valve 118 being opened to bring the compressor 108 out of a surge condition.

It is preferable, however, to determine a surge limit and open the feedback valve 118 in advance, prior to the occurrence of a surge condition. For a given rpm and desired boost level a surge limit can be determined. The feedback valve 118 can begin to open prior to the compressor 108 reaching a calculated surge limit. Opening the valve early allows the compressor to spool up to a higher boost pressure more quickly because the compressor stays closer to the higher efficiency points of the compressor operational parameters. Rapid boost pressure rise at low rpm can then be achieved. By opening the valve before surge occurs, a more stable control system can also be achieved.

Opening the feedback valve 118 in such a way as to improve the responsiveness of the engine 102, is achieved by allowing the engine 102 to get to a higher boost pressure more quickly when the engine 102 is at a lower rpm. Compressor 108 is also more efficient, which results in less work for the transmission 110 to achieve supercharging. Surge limit control can be modeled within standard model based control simulation code, such as MATLAB. Modeling in this manner will allow simulation of the controller 140 and auto-coding of algorithms for controller 140.

A model based control system, such as described above, is unique, in that the utilization of the transmission 110 to control the rotation of the turbine 106 and compressor 108 generates boost pressure without turbo lag. In other words, the transmission 110 can extract rotational energy from the crank shaft 112 to drive the compressor 108 to achieve a desired boost in compressed air conduit 109 very quickly and prior to the turbine 106 generating sufficient mechanical energy to drive the compressor 108 at such a desired level. In this manner, controls in a conventional turbocharger to reduce lag are reduced or eliminated. The model based control of the controller 140 should be designed to maintain the optimum efficiency of the compressor 108 within the operational parameters of the compressor 108.

The control model of controller 140 should also be carefully modeled on the pressure operational parameters, as mapped against the mass flow allowed by the engine for a given target speed and load in which target speed and load may be defined relative to the position of the throttle of the vehicle. As shown in FIG. 1, the engine speed signal 126 can be obtained from engine 102 and is applied to the controller 140. Similarly, the engine load signal 128 can be obtained from the engine 102 and applied to controller 140. Alternatively, these parameters can be obtained from a sensors located on the engine throttle (not shown). The feedback valve 118 can then be operated in response to a control signal 142 generated by controller 140. Pressure sensor 136 generates the compressed air intake pressure signal 132 that is applied to the controller 140, which calculates the control signal 142 in response to engine speed signal 126, engine load signal 128 and compressed air intake pressure signal 132.

During operational conditions of the engine 102, in which a surge limit is not being approached by the compressor 108 and the temperature of the gas mixture, as detected by the temperature sensor 138, is not reached, the feedback valve 118 is closed so that the system works as a conventional super-turbocharged system. This occurs over a majority of the operating parameters of the engine 102. When high load and low rpm conditions of the engine 102 occur, the feedback valve 118 is opened to prevent surge. Similarly, at high rpm, high load operating conditions of engine 102, high temperatures are produced in the exhaust gases at the output of the catalytic converter 116, so that the feedback valve 118 must be opened to reduce the temperature of the gas mixture applied to the turbine 106 below a temperature which would cause damage to the turbine 106.

Figure 2:
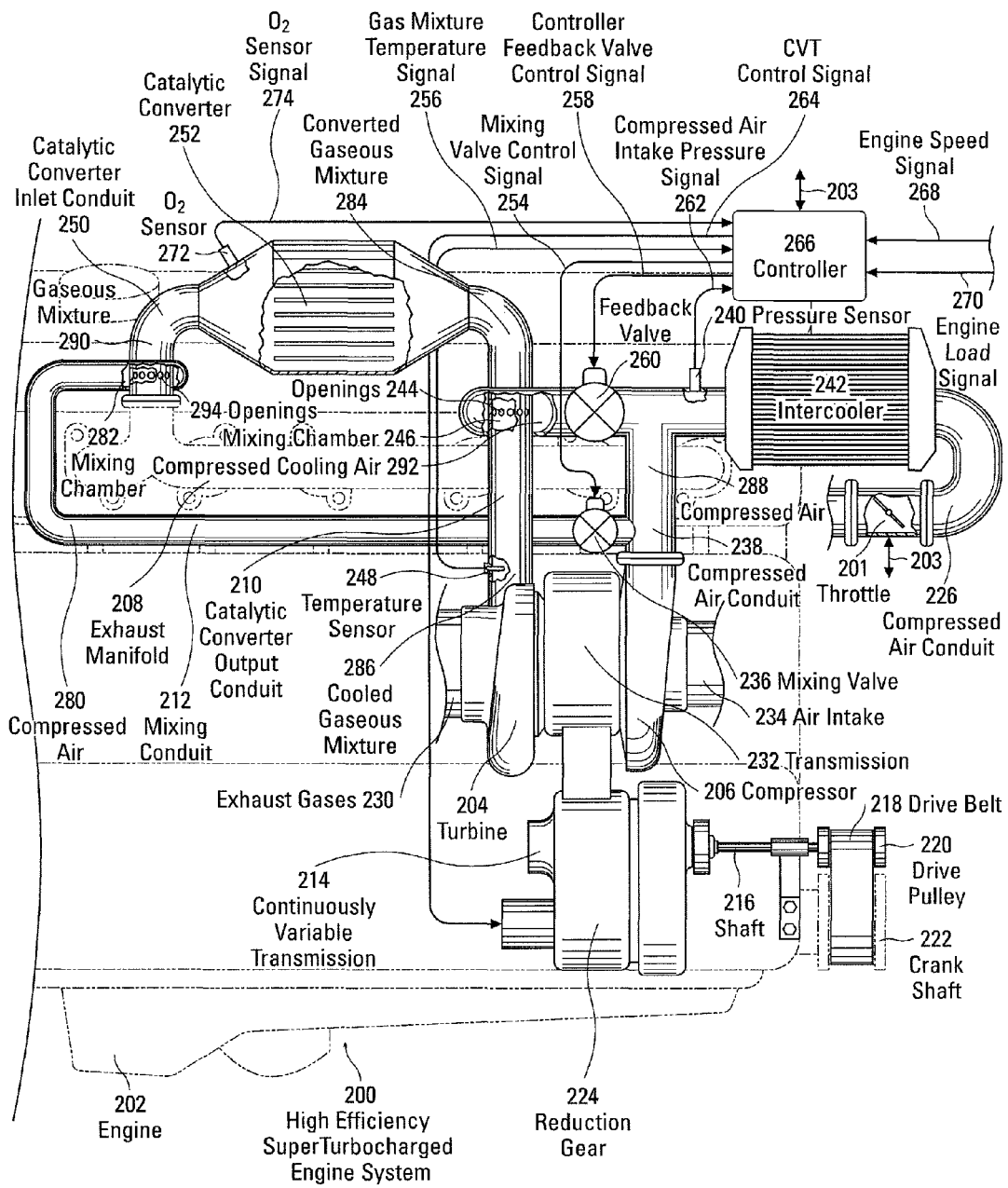
FIG. 2 is a schematic illustration of another embodiment of a high efficiency super-turbocharged engine system.

FIG. 2 is a detailed diagram of an embodiment of a high efficiency super-turbocharged engine system 200. As shown in FIG. 2, engine 202 includes a super-turbocharger that has been modified, as described above with respect to FIG. 1, to provide overall higher efficiency than conventional super-turbocharged engines, as well as providing high, nearly optimal efficiency in low rpm, high load operating conditions, and high, nearly optimal efficiency at high rpm, high load conditions. The super-turbocharger includes a turbine 204 that is mechanically connected by a shaft to compressor 108. Compressor 206 compresses intake air 234 to produce compressed air 288 which is supplied air to compressed air conduit 238. Compressed air conduit 238 is connected to feedback valve 260 and intercooler 242. As disclosed above, intercooler 242 functions to cool the compressed air, 288 which becomes heated during the compression process. The intercooler 242 is connected to the compressed air conduit 238 which, in turn, is connected to the intake manifold (not shown) of the engine 202. Pressure sensor 240 is connected to the compressed air conduit 238 to detect the pressure of compressed air 288 and supply a pressure reading via the compressed intake air pressure signal 262, which is applied to controller 266. The feedback valve 260 is controlled by a feedback valve control signal 258 generated by the controller 266, as disclosed above. Under certain operating conditions, feedback valve 260 opens to supply compressed air 288 from compressed air conduit 238 to a mixing chamber 246.

As shown in the embodiment of FIG. 2, the mixing chamber 246 simply comprises a series of openings 244 in the catalytic converter output conduit 210, which is surrounded by the compressed air conduit, 238 so that compressed air 288 supplied from the compressed air conduit 238 passes through the openings 244 to mix with the converted gaseous mixture 292 in the catalytic converter output conduit 210. Any desired type of mixing chamber can be used to mix the cooler compressed air 288 with the converted gaseous mixture 284 to lower the temperature of the cooled gaseous mixture 288. Temperature sensor 248 is located in the catalytic converter output conduit 210 to measure the temperature of the cooled gaseous mixture 286 in the catalytic converter output conduit 210. Temperature sensor 248 supplies a gas mixture temperature signal 256 to controller 266, which controls the feedback valve 260 via feedback valve control signal 258 to ensure that the temperature of the cooled gaseous mixture 286 210 do not exceed a maximum temperature that would damage to the turbine 204. Catalytic converter 252 is connected to the exhaust manifold 208 by way of catalytic converter inlet conduit 250. By locating the catalytic converter 252 proximate to the exhaust manifold 208, the hot exhaust gases from the engine 202 flow directly into the catalytic converter 252, which assists in activating the catalytic converter 252. In other words, the proximate location of the catalytic converter 252 near the outlet of the engine exhaust gases does not allow the exhaust gases to cool substantially prior to entering the catalytic converter 252, which increases the performance of the catalytic converter 252. As the exhaust gases pass through the catalytic converter 252, the catalytic converter 252 adds additional heat to the exhaust gases, since the exhaust gases are catalyzed by the catalytic converter 252 in an exothermic reaction that occurs in catalytic converter 252. This very hot, converted gaseous mixture 284 at the output of the catalytic converter 252 is supplied to the catalytic converter output conduit 210 and is cooled by the compressed air 288. Depending upon the temperature of the very hot converted gaseous mixture 284, which varies depending upon the operating conditions of the engine 202, a different amount of compressed air 288 will be added to the converted gaseous mixture 284, such as during high speed, high load conditions. During low engine speed, high engine load conditions, the feedback valve 260 also functions to allow intake air to flow through the compressor to avoid surge. Surge is similar to aerodynamic stall of the compressor blades, which occurs as a result of the low flow conditions through the compressor during low engine speed conditions. As disclosed above, rotational mechanical energy is transferred from the engine crank shaft 222 through the continuously variable transmission 214, that drives compressor 206, at a speed that is controlled by CVT control signal 264, that is sufficient to spin the compressor 206 to avoid surge. When surge occurs, the pressure in the intake manifold (not shown) falls because the compressor 206 is unable to compress the intake air. By allowing air to flow through the compressor 206 as a result of the feedback valve 260 being opened, pressure can be maintained in the intake manifold so that, when high torque is required at low engine speeds, the high torque can be achieved because of the high intake manifold pressure.

As disclosed above, when the engine 202 is operating under high speed, high load conditions, the catalytic converter 252 causes a large amount of heat to be generated in the exhaust gases that are supplied to the catalytic converter output conduit 210. By supplying compressed, cooling air 292 to the catalytic converter output conduit 210, the hot converted gaseous mixture 284, under high speed, high load conditions are cooled. As the load and speed of the engine increases, hotter converted gases are produced and more of the compressed cooling air 292 is required. If the turbine 204 does not provide sufficient rotational energy to drive the compressor 206, such as under low speed, high load conditions, the engine crank shaft 222 can supply rotational energy to the compressor 206 via drive belt 218, drive pulley 220, shaft 216, reduction gear 224 and transmission 232. Again, any portion of the propulsion train of a vehicle can be used to supply rotational energy to the compressor 206, and FIG. 2 discloses one implementation in accordance with one disclosed embodiment.

As also illustrated in FIG. 2, a mixing valve 236 is also connected to the compressed air conduit 238 and mixing conduit 212. Mixing conduit 212 is connected to the catalytic converter inlet conduit 250, which is upstream from the catalytic converter 252. The purpose of the mixing control valve 236 is to provide compressed air 280 to the input of the catalytic converter 252 during startup conditions, as disclosed above, and other rich fuel mixture conditions. Under startup conditions, prior to the catalytic converter 252 reaching full operational temperatures, additional oxygen is provided via compressed air 280, through the mixing conduit 212, to initiate the catalytic process. The additional oxygen that is provided via the mixing conduit 212 assists in the initiation of the catalytic process. As explained in more detail below, additional oxygen can be supplied to the input of the catalytic converter 252 during rich fuel engine operating conditions, such as when driving in open throttle conditions, to bring the catalytic converter to stoichiometric operating conditions, which reduces pollutants and increases the temperature of exhaust gases exiting the catalytic converter 252, which can be used to increase the output of the superturbocharger illustrated in FIG. 2. Controller 266 controls mixing valve 236 via mixing valve control signal 254 in response to the engine speed signal 268, engine load signal 270, and the gas mixture temperature signal 256.

Hence, the high efficiency, spark ignition, super-turbocharged engine system 200 operates in a manner similar to a super-turbocharger, with the exception that feedback valve 260 supplies a portion of the compressed air 288 from the compressor to the input of the turbine for two reasons. One reason is to cool the converted gaseous mixture 284 prior to entering the turbine so that the full energy of the exhaust gases can be utilized and a waste gate is not needed under high speed, high load conditions. The other reason is to provide a flow of air through the compressor to prevent surge at low rpm, high load conditions. In addition, the catalytic converter 252 can be connected in the exhaust stream before the exhaust gases reach the turbine so that the heat generated by the catalytic converter 252 can be used in driving the turbine 204, and expanding the compressed air 238 that is mixed with the hot gases from the catalytic converter 252, which increases efficiency of the system. Further, the mixing valve 236 can be used to initiate the catalytic process in the catalytic converter 252 by providing oxygen to the exhaust gases during startup conditions, and reduce pollutants and add more heat to the exhaust gases during other rich fuel mixture operating conditions As mentioned above, other rich air/fuel mixtures can occur, especially on engines used in vehicles. For example, when a vehicle is accelerated by opening the throttle, a rich air/fuel mixture is generated, and the engine 202, as well as the catalytic converter 252, do not operate in a stoichiometric manner. As a result, CO gases and hydrocarbons are emitted in the exhaust gases 230. Although the engine 200 can create greater horsepower when a rich fuel mixture is used, which allows for acceleration of the vehicle, the rich fuel mixture is not fully burned by the engine 202, or the catalytic converter 252. By controlling the mixing valve 236 to add more oxygen to the exhaust gases exiting the exhaust manifold 208, and entering the catalytic converter inlet conduit 250, the additional oxygen provided by the compressed air 280 allows the carbon monoxide and hydrocarbons to be oxidized in the catalytic converter 252. An $O_2$ sensor 272 is located in the catalytic converter inlet conduit 250 that provides an $O_2$ sensor input 274 that is applied to the controller 266. The $O_2$ sensor input detects the amount of oxygen in the gaseous mixture at the input of the catalytic converter 252 and generates the mixing valve control signal 254 to operate the mixing valve 236. In this manner, the mixing valve 236 can be opened to supply enough oxygen to the catalytic converter inlet conduit 250 to adjust the gaseous mixture 290 entering the catalytic converter 252, which comprises the rich fuel mixture of the exhaust from exhaust manifold 208 and the compressed air 280, to oxidize the carbon monoxide and hydrocarbons, while maintaining stoichiometric operation of the catalytic converter 252. Both the engine speed signal 268 and the engine load signal 270 can be used to determine when a rich fuel mixture is being applied to the engine 202 and thereby adjust the opening of mixing valve 236 by generating a mixing valve control signal 252 by controller 266 to anticipate the generation of rich fuel exhaust in exhaust manifold 208. Since the rich fuel mixture is oxidized in the catalytic converter 252, additional heat is created by catalytic converter 252. Hence, temperature sensor 248 will detect a higher temperature in the gases in the catalytic converter output conduit 210, and feedback valve 260 may be opened to add additional compressed cooling air 292 to the catalytic converter output conduit 210 to ensure that the cooled gaseous mixture 286 does not exceed a maximum temperature, which may be approximately 950° C., that could damage turbine 204. Use of the mixing valve 236 in this manner allows the catalytic converter 252 to operate in a stoichiometric manner in most or all operating conditions, significantly reducing the pollutants that are emitted by the high efficiency super-turbocharged engine system 200.

One of the issues encountered in implementing the bypass configuration illustration in FIG. 2 is creating a high enough pressure differential between the compressed air 288 in compressed air conduit 238 and the exhaust pressure of exhaust gases from exhaust manifold 208 to ensure that compressed air 280 in mixing conduit 212 and compressed cooling air 292 flow into mixing chamber 246 and mixing chamber 282. For proper operation, the pressure of compressed air 288 should be sufficiently greater than the pressure of the exhaust gases in the catalytic converter inlet conduit 250 and the catalytic converter output conduit 210 for the whole operating range of engine 202. In other words, the exhaust pressure needs to be lower than the pressure of the compressed air 280 in mixing conduit 212 and compressed cooling air 292 so that a sufficient amount of the compressed air 280 and the compressed cooling air 292 flows into catalytic converter inlet conduit 250 for both oxidation and cooling, respectively. This pressure gradient is necessary to drive the compressed air 280 and compressed cooling air 292 into catalytic converter inlet conduit 250 and catalytic converter outlet conduit 210, respectively, without the use of additional pumping mechanisms, such as disclosed in other embodiments herein. As the engine RPM increases, the mass flow through the engine increases. Although the intake pressure in the compressed air conduit 226 remains substantially constant as RPMs increase, the exhaust back pressure from the turbine 204 increases with the increase in mass flow of the exhaust. The input pressure at the turbine 204 may be greater than the pressure of the compressed air 288 in the compressed air conduit 238, at some high engine RPM conditions. Further, the exhaust pressure in the catalytic converter inlet conduit 250 is pulsed, so that the pressure of the compressed air 280 in mixing conduit 212 must be greater than at least the average pressure of the exhaust gases in the catalytic converter inlet conduit 250.

Maintaining a pressure gradient of the compressed air 288 over the pressure of the exhaust gases so that the pressure of the compressed air 288 is greater than the exhaust gas pressure, to allow oxidation air and cooling air to flow, can be accomplished in several different ways. One way is to drop the exhaust gas pressure. This can be accomplished by increasing the flow area of the turbine to lower back pressure for all operating points. Another method is to utilize a waste gate that is attached to the catalytic converter output conduit 210 to exhaust the exhaust gases during higher mass flow conditions, when the engine is running at higher RPM. Both of these methods will generally result in a decrease in performance, due to the loss of turbine power from lower pressures and/or loss of mass flow rate through the turbine, which results in lower turbo-compounding power.

An alternative way to generate the necessary pressure gradient is to increase the pressure of the compressed air 288 in the compressed air conduit 238. Having a superturbo with turbo speed control and a throttle allows two degrees of freedom to control both the output pressure of compressor 206 and intake manifold pressure at the same time. When the pressure of the compressed air 288 is increased, a higher than desired air flow through compressed air conduit 226, to the intake manifold of the engine can occur. However, throttle 201 can be used to reduce the pressure at the intake manifold, by creating a back pressure in the compressed air conduit 226 by controlling the amount that throttle 201 is opened. So, when throttle 201 is closed, or at least mostly closed, the pressure of the compressed air 288 in the compressed air conduit 238 increases. Since a higher pressure is created in the compressed air conduit 238, more compressor power is required from compressor 206. The power to operate the compressor to create high pressures is then retrieved from the crankshaft 222, which drives the transmission 232, under the control of continuously variable transmission 214, which, in turn, drives compressor 206 to compress the compressed air 288 to the desired pressure level. As the pressure of the compressed air 288 increases, more mass flow of the cooled gaseous mixture 286 will occur, which generates more power in the turbine 204. Part of the increased power of the turbine 204 may be used to offset the supercharging of the transmission 232 by the continuously variable transmission 214. Controller 266 sets the compressor power to meet the desired pressure levels required in compressed air conduit 238. Continuously variable transmission 214 controls the compressor 206 using power generated by turbine 204 and/or power from crankshaft 222 by supercharging. Controller 266 generates a control signal 203, which is applied to the throttle 201 to control the operation of the throttle 201. Again, additional power, as a result of additional air mass flow through turbine 204, may offset the additional compressor power that is supplied by supercharging. The high pressures of compressed air 288 cause more mass flow to turbine 204, which increases the turbine power, which can be used for turbocompounding, or to offset increased power required by compressor 206 to create the required pressures in compressed air conduit 238 to overcome exhaust gas pressure at high engine RPMs.

The loss of turbo-compounding energy, using the throttling technique described above, is compensated for by the increased mass flow of air in the catalytic converter output conduit 210, which increases the output power of the turbine 204. In some cases, there may be a net energy gain that is greater than the loss of the energy that would otherwise be utilized for turbo-compounding. In other cases, there may be a net energy loss. However, the increased turbine power will offset the increased power required by the compressor 206, as a result of supercharging. Some of the increased power of the turbine 204 may also be used for turbocompounding in certain cases. The reason why the higher pressures created in the compressed air conduit 238 create a net positive energy gain is that the cooled gaseous mixture 286 is held at the limit of the turbine inlet temperature. The compressed cooling air 292, which is used to cool the exhaust flow to a temperature of approximately 950° C., is also heated to approximately 950° C. (or the limit of the turbine temperature) in mixing chamber 246. This extra heated air mass flow across the turbine 204 may provide more power to the turbine than the energy lost in the compression of the compressed air 288 by compressor 206, but will certainly offset the energy lost in the compression. Hence, the throttling approach gives the best overall efficiency gains over the whole range of the engine speeds and loads, while still preventing the need for adding additional fuel for cooling the exhaust gases.

The mixing valve 236, of FIG. 2, can also be used in a manner that does not create stoichiometric operation of catalytic converter 252. For example, some classes of race car engines, and vehicle engines in some countries, do not require pollution control. In that case, the mixing valve 236 can be opened to provide enough oxygen to ensure that all of the carbon monoxide and hydrocarbons are oxidized in the catalytic converter 252 without necessarily maintaining stoichiometric operation of the catalytic converter 252. Racing engines typically use a very rich mixture that increases the output power of the engine 202. In addition, the extra fuel helps to cool the engine components. Additional compressed air can be added, via mixing valve 236, to not only add oxygen to oxidize hydrocarbons and carbon monoxide, but to also add cooling gases at the input of the catalytic converter 252. The oxidation of very rich fuel mixtures may cause the catalytic converter 252 to operate at too high a temperature, which can be reduced by adding additional air via mixing valve 236.

Figure 3:
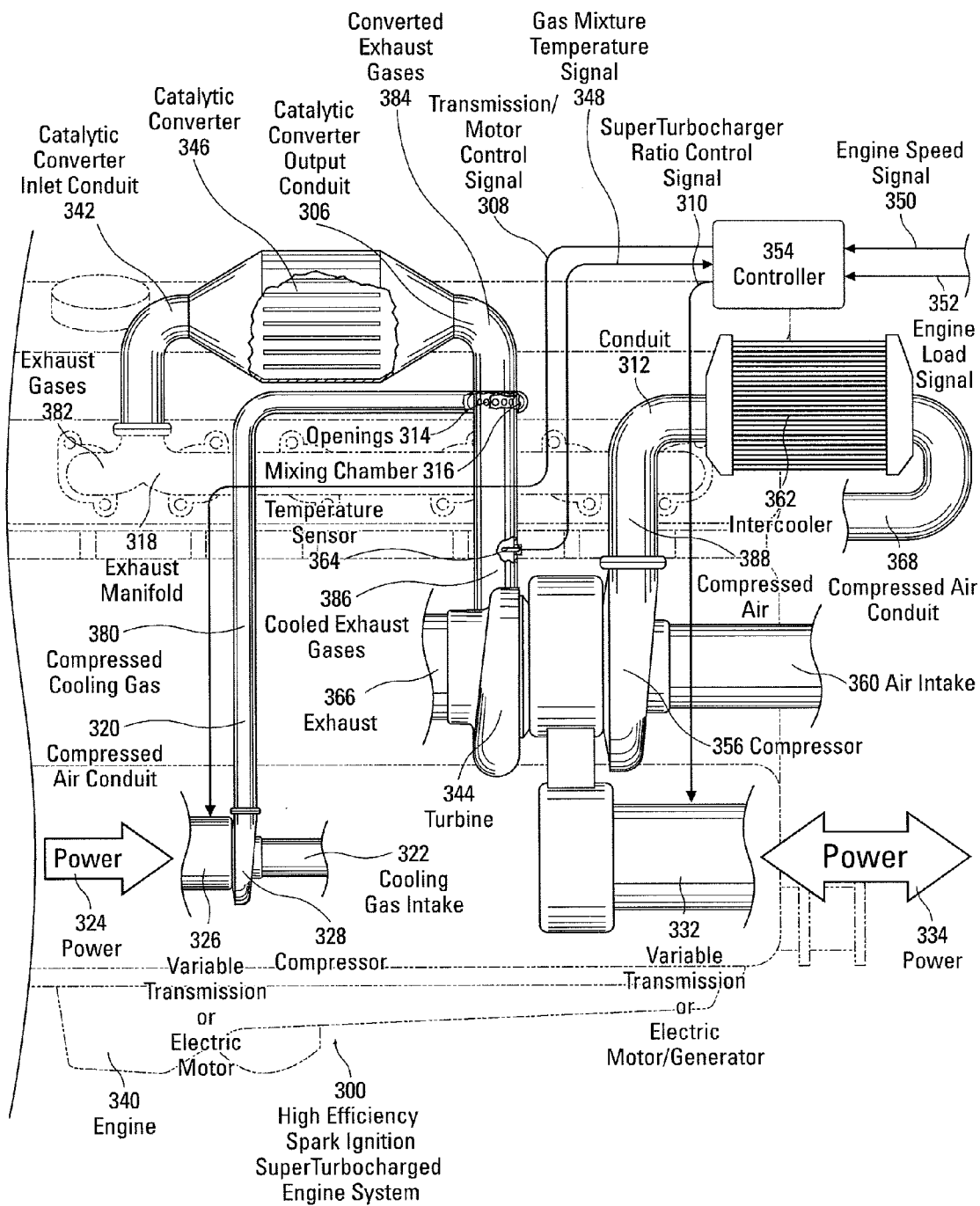
FIG. 3 is a schematic illustration of another embodiment of a high efficiency super-turbocharged engine system.

FIG. 3 is a schematic diagram of another embodiment of a high efficiency super-turbocharged engine system 300. The super-turbocharged engine system 300 differs in at least one respect from the embodiment of FIGS. 1 and 2 in that an additional compressor 328 is provided. As illustrated in FIG. 3, engine 340 includes a turbine 344 that mechanically drives a compressor 356. Compressor 356 compresses air from air intake 360 and supplies the compressed air 388 to conduit 312. Conduit 312 is connected to an intercooler 362 that cools the compressed air 388. The intercooler 362 is connected to the compressed air conduit 368 which, in turn, is connected to the intake manifold (not shown) of the engine 340. As also shown in FIG. 3, controller 354 receives an engine speed signal 350 and an engine load signal 352. These signals are used to calculate a super-turbocharger ratio control signal 310 that is applied to the variable transmission or electric motor/generator 326. Power 334 from the engine 340 or propulsion train of a vehicle is coupled to the variable transmission or electric motor/generator 332 so that power 334 can be transferred between the variable transmission or electric motor/generator 332 and a mechanical propulsion train or electrical propulsion system.

As also shown in FIG. 3, a separate compressor 328 is connected to a variable transmission or electric motor 326. Power 324 from the propulsion train can be used to drive variable transmission 326. Alternatively, electric power from the engine system 300 can be used to drive an electric motor 326. Compressor 328 compresses the air from the cooling gas intake 322 to provide compressed cooling gas 380, which is applied to a compressed air conduit 320. The compressed cooling gas 380 in compressed air conduit 320 is applied to mixing chamber 316, having openings 314 in the catalytic converter output conduit 306. Any desired type of mixing chamber can be used to mix the compressed cooling gas 380 with the converted exhaust gases 384 to lower the temperature of the cooled exhaust gases 386 in the catalytic converter output conduit 306. Temperature sensor 364 is disposed in the catalytic converter output conduit 306 downstream from the mixing chamber 316 to measure the temperature of the cooled exhaust gases 386. Temperature sensor 364 supplies a gas mixture temperature signal 348 to the controller 354, which controls the operation of the variable transmission or electric motor 332. Controller 354 generates a transmission/motor control signal 308 that is applied to the variable transmission or electric motor 326 to control the speed of the compressor 328 and the amount of the compressed cooling gas 380 that is supplied to the compressed air conduit 320. The amount of compressed cooling gas 380 that is supplied to the compressed air conduit 320 is controlled to ensure that the temperature of the cooled exhaust gases 386 that enter the turbine 344 do not exceed a maximum temperature that would damage the turbine 344. This maximum temperature may be in the range of 900 to 950° C. Exhaust gases from the turbine 344 are then exhausted by exhaust 366.

As also illustrated in FIG. 3, the catalytic converter inlet conduit 342 is connected to the exhaust manifold 318 at a location close to the exhaust manifold 318 so that the hot exhaust gases from the exhaust manifold 318 activate the catalyst in the catalytic converter 346. The hot converted exhaust gases 384 that are converted by catalytic converter 346 exit the catalytic converter 346 and are applied to catalytic converter output conduit 306. The converted exhaust gases 384 are subsequently mixed with compressed cooling gas 380.

Hence, the additional compressor 328 and variable transmission or electric motor 326, as illustrated in FIG. 3, replace the feedback valve 118 of FIG. 1 by supplying a source of cooler compressed cooling gas 380 via compressed air conduit 320 to ensure that the hot, converted exhaust gases 384 from the catalytic converter, in catalytic converter output conduit 306, are cooled sufficiently to prevent damage to the turbine 344. The embodiment of FIG. 3 does not provide, however, a manner of limiting surge through the use of a feedback valve, such as feedback valve 260 in FIG. 2. Hence, the embodiment of FIG. 3, as well as the embodiment illustrated in FIG. 4, can be modified to include a feedback valve 118 that can be opened when surge limits are approaching, such as low RPM, high load operating conditions of the engine to prevent surge. A feedback valve, such as feedback valve 260, in FIG. 2, can also assist in adding additional cooler gases to the converted hot exhaust gases in the catalytic converter output conduit 306 to further assist in lowering the temperature of the cooled exhaust gases 386 to an optimal temperature, and to prevent damage to the turbine 344.

Figure 4:
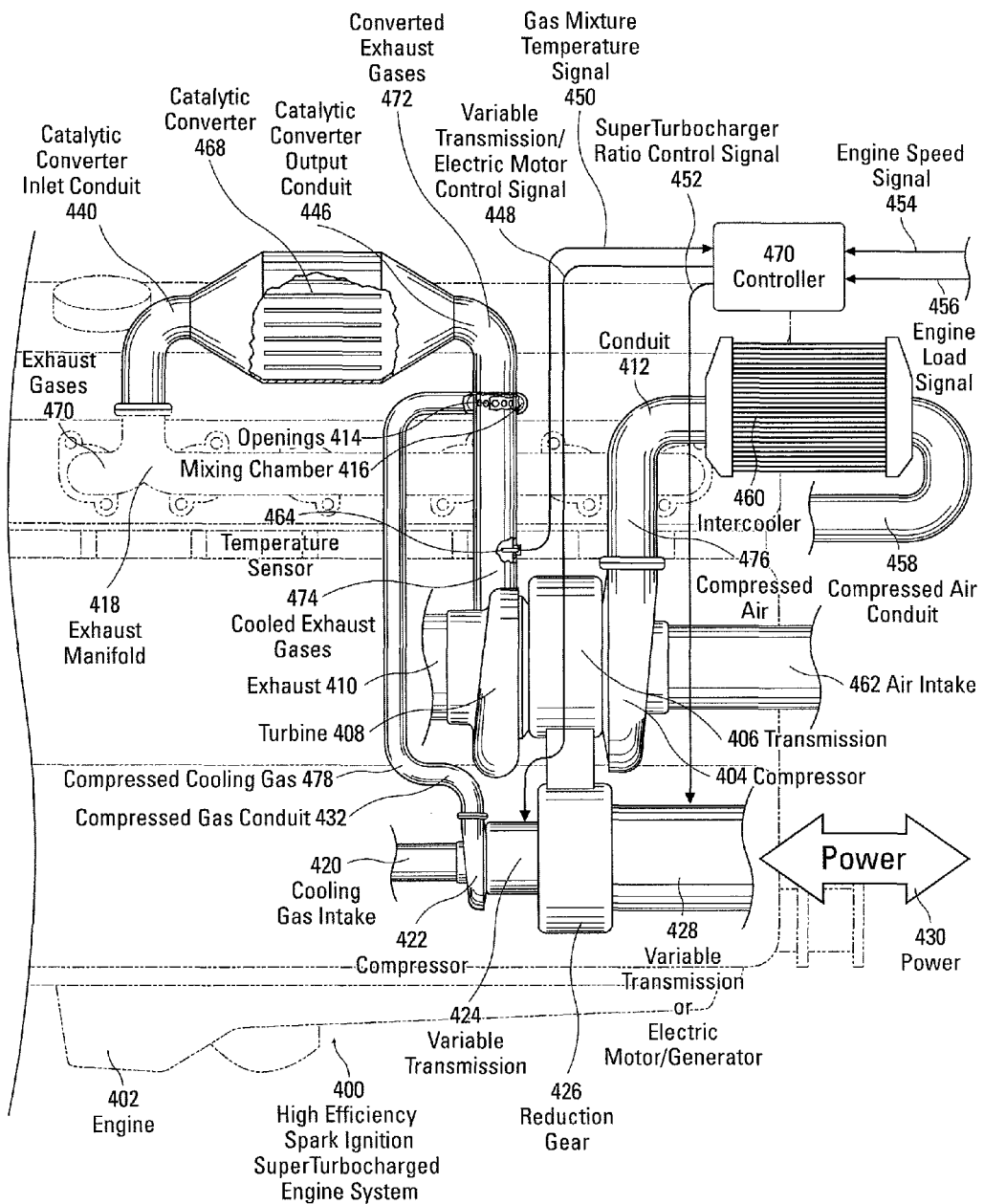
FIG. 4 is another embodiment of a high efficiency super-turbocharged engine system.

FIG. 4 is another embodiment of a high efficiency super-turbocharged engine system 400. As shown in FIG. 4, engine 402 includes a super-turbocharger that comprises high speed transmission 406, turbine 408, exhaust 410, compressor 404 and intake air 462. The super-turbocharger also includes a variable speed transmission or electric motor/generator 428 that is coupled to a power system 430, such as a mechanical propulsion train or electric propulsion system. Compressed air from compressor 404 is applied to conduit 412. Intercooler 460 cools the compressed air and applies the compressed air to compressed air conduit 458. Compressed air conduit 458 is coupled to an input manifold (not shown) of engine 402.

As illustrated in FIG. 4 and as disclosed above, power 430 can be either transferred from the super-turbocharger to a mechanical propulsion train or electrical propulsion train, or be transferred from the mechanical or electrical propulsion train back into the super-turbocharger to run the super-turbocharger during certain conditions, such as, for example, during turbo lag conditions. The variable transmission or electric/motor generator 428 can either be a mechanical continuously variable transmission or can constitute a motor/generator. As disclosed above, examples of mechanical continuously variable transmissions are disclosed in U.S. patent application Ser. No. 12/701,440, filed Feb. 5, 2010, by Ed VanDyne, Barry T. Brinks, Michael B. Riley and Jared William Brown, which is specifically incorporated herein by reference for all that it discloses and teaches. Various types of electric motors/generators can be used. For example, motor/generators similar to the motor/generators that are used on electric cars for propulsion and braking can be used. When reduction gear 426 is driving an electric motor/generator 428, electrical power generated by the electric motor/generator can be supplied to an electric propulsion system to assist in propelling the car. Alternatively, an electric motor/generator 428 can function as a motor that is driven by electrical power from the electrical system of a vehicle to drive the reduction gear 426 during certain conditions, such as conditions when turbo lag may occur, as one example. Variable transmission or electric motor/generator 428 operates in a manner similar to the variable transmission or electric motor/generator 326 of FIG. 3. The variable transmission or electronic motor/generator 428 functions in response to the super-turbocharger ratio control signal 452. Engine load signal 456 and engine speed signal 454 are applied to controller 470, which controls the variable transmission or electric motor/generator 428 via the super-turbocharger ratio control signal 452.

The system of FIG. 4 also includes a catalytic converter 468 that is connected to catalytic converter inlet conduit 440. Catalytic converter inlet conduit 440 is, in turn, connected to the exhaust manifold 418. Catalytic converter 468 is located near the exhaust manifold 418 that allows the hot exhaust gases 470 from the exhaust manifold 418 to activate the catalysts in the catalytic converter. Catalytic converter 468 may operate in a stoichiometric region as controlled by the vehicle fuel system. Catalytic converter 468 creates additional heat in the converted exhaust gases 472, which is supplied to the catalytic converter output conduit 446. Variable transmission 424 is coupled to reduction gear 426 and operates under the control of the variable transmission/electric motor control signal 448 that is generated by the controller 470. Variable transmission 424 operates compressor 422 that compresses gases from the cooling gas intake 420 and applies the compressed cooling gas 478 to compressed gas conduit 432. The compressed gas in the compressed cooling gas conduit 432 is mixed with the hot, converted exhaust gases 472 in the mixing chamber 416. Openings 414 allow the compressed cooling gas 478 to flow from compressed gas conduit 432 into the catalytic converter output conduit 440 to be mixed with the converted exhaust gases 472 exiting the catalytic converter 468. Temperature sensor 464 measures the temperature downstream from the mixing chamber 416. Again, the cooled exhaust gases 474 must be below a maximum temperature that would harm the turbine 408, which is approximately 900° C. to 950° C. in many embodiments. The temperature sensor 464 sends a gas mixture temperature signal 450 to the controller 470 that generates the variable transmission/electric motor control signal 448 that is used to control the speed of the compressor 422, which, in turn, controls the amount of compressed cooling gas 478 in the compressed gas conduit 432 that is mixed with the converted exhaust gases 472 in the catalytic converter output conduit 446 to maintain the temperature of the compressed cooling gas 478 at an optimal temperature of approximately 900° C. Hence, the high efficiency super-turbocharged engine system 402 utilizes an additional variable transmission 424 that is coupled to the reduction gear 426 to add compressed cooling gas 478 to the converted exhaust gases 472 prior to the compressed cooling gas 478 entering turbine 408. In this manner, the compressed air 476 from compressor 404 and conduit 412 is not extracted for the purpose of cooling the converted exhaust gases 472.

Other gases can be used, other than fresh air, as a compressed cooling gas 478 that is supplied to cooling gas intake 420. For example, tailpipe exhaust gases, crank case gases, RAM air input gases, etc., can be used as a source of cooling gas. Exhaust gases contain a large amount of water vapor and carbon dioxide that can effectively cool the converted exhaust gases 472 emitted from exhaust manifold 418. As also indicated above, a pump can be connected to pump the crank case gases from the crank case to lower the air pressure in the crank case and limit aerodynamic effects of the moving parts in the crank case. Since the crank case gases include oil vapors, introduction of the oil vapors at the front end of the catalytic converter 836 helps in reducing emissions, since the catalytic converter 836 will oxidize those oil vapors.

Figure 5:
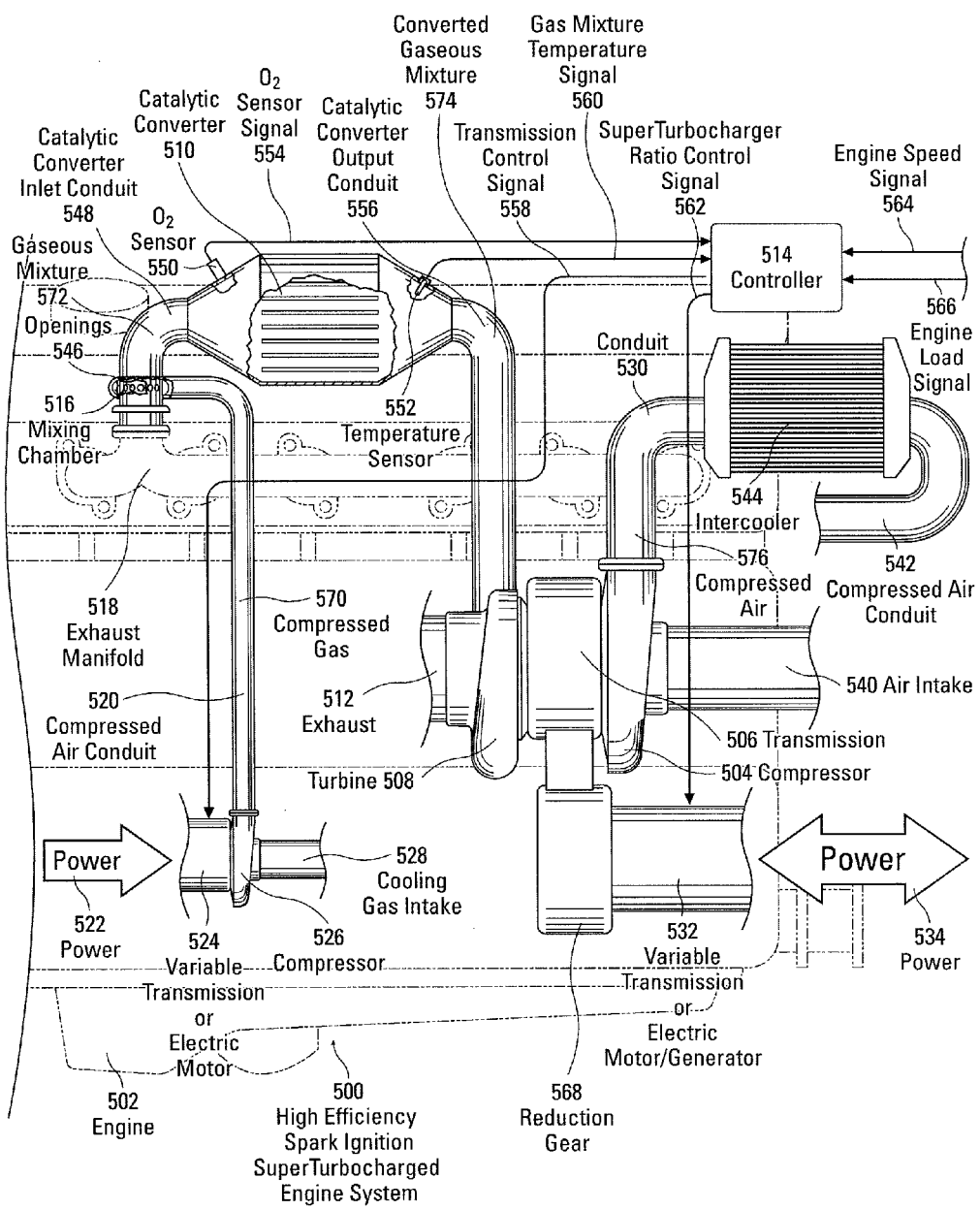
FIG. 5 is another embodiment of a high efficiency super-turbocharged engine system.
Figure 6:
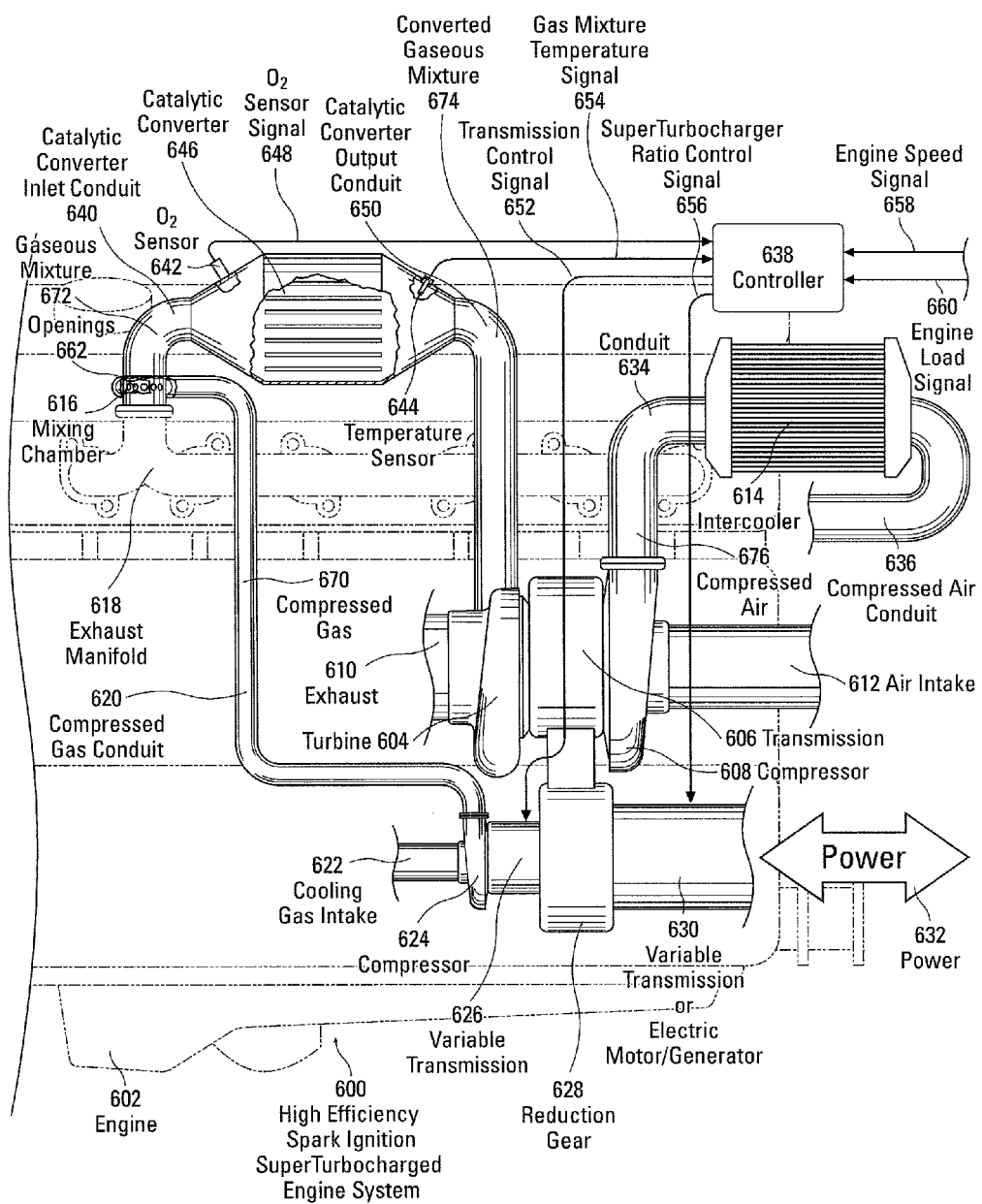
FIG. 6 is another embodiment of a high efficiency super-turbocharged engine system.

The embodiments illustrated in FIGS. 1-3 are primarily intended to be operated with engines that have an air/fuel mixture from an engine running at or slightly above the stoichiometric point. This is normally in the region of approximately 14.6-14.8 parts of air to one part fuel, by weight, for most gasoline mixtures, as disclosed in more detail below. In this manner, a three-way catalytic converter can reduce $NO_x$ and oxidize carbon monoxide and unburned hydrocarbons to produce low emissions. As disclosed below, the embodiments of FIGS. 5 and 6 are primarily intended to function with engines that utilize a rich gas/fuel mixture by adding oxygen to the input of the catalytic converter. The embodiments of FIGS. 5 and 6 are not concerned with the generation of $NO_X$ gases, but rather, are directed to achieving the maximum output power that can be supplied by the engine by utilizing a rich gas/fuel mixture for combustion and recovering waste heat through oxidation of carbon monoxide and unburned hydrocarbons in the catalytic converter.

FIG. 5 is another embodiment of a high efficiency super-turbocharged engine system 500 that uses an additional compressor 526. The embodiment of FIG. 5 is used with an engine 502 that utilizes a rich gas/fuel mixture to produce a large amount of horsepower from the engine 502. For example, the embodiment of FIG. 5 may be employed in a race car or other engine that is not subject to pollution requirements, especially with respect to $NO_X$ gases. The embodiment of FIG. 5 does oxidize hydrocarbon pollutants and carbon monoxide pollutants, but the catalytic converter 502 does not operate in a stoichiometric manner to reduce $NO_X$ pollutants.

As illustrated in FIG. 5, variable transmission or electric motor/generator 532 transfers power 534 to and from the propulsion train and/or an electrical system. A high speed transmission 506 couples the turbine 508 and the compressor 504 to the reduction gear 568. Compressor 504 compresses air from air intake 540. The compressed air is applied to conduit 530, which is connected to intercooler 544. Intercooler 544 cools the compressed air and applies the compressed air to compressed air conduit 542. Compressed air conduit 542 is coupled to the intake manifold of the engine 502. Variable transmission or electric motor/generator 532 operates under the control of a super-turbocharger ratio control signal 562 that is generated by the controller 514 from the engine speed signal 564 and the engine load signal 566, as explained in more detail above.

As also shown in FIG. 5, an additional compressor 526 is operated by a variable transmission or electric motor 524 from an electrical or mechanical power source 522. Electric power from the power source 534 can be used to operate an electric motor 524. A variable transmission or electric motor/generator 532 can be operated by mechanical power from a reduction gear 568 or mechanical rotational power from engine 502 or a propulsion train to which engine 502 is coupled. Compressor 526 compresses air received from the cooling gas intake 528 and applies the compressed air to the compressed air conduit 520. The variable transmission or electric motor 524 operates under the control of the variable transmission/electric motor/generator control signal 558. The compressed air in the compressed air conduit 520 is applied to the mixing chamber 516, which has a series of openings 546 in the catalytic converter inlet conduit 548 so that the compressed air in compressed air conduit 520 is mixed with the hot exhaust gases from the exhaust manifold 518 to produce gaseous mixture 572. The purpose of adding additional compressed air from the compressed air conduit 520 upstream from the catalytic converter 510 is to add more oxygen and/or cooling gases to the exhaust gases that supplied to the catalytic converter 510.

In the embodiment illustrated in FIG. 5, it is not necessarily intended that the catalytic converter 510 be operated in the stoichiometric region. The high efficiency super-turbocharged engine system 500 is a system that can be used on a race car or other very high powered engine systems that may emit $NO_X$ gases. In these types of engine systems, the engines are run with a rich fuel mixture in order to generate a large amount of power from the engine 502. A rich fuel mixture is a mixture of fuel and air in which all of the fuel is not burned during the combustion cycle and, as such, the exhaust contains unburned fuel. In normal passenger and commercial vehicles that are subject to pollution standards, the engine systems are carefully balanced for a three-way catalytic converter to simultaneously perform the tasks of:

1. Reduction of nitrogen oxides to nitrogen and oxygen via:

$$2NO_X \rightarrow xO_2 + N_2 \quad \text{Equation (1)}$$

2. Oxidation of carbon monoxide to carbon dioxide via:

$$2CO + O_2 \rightarrow 2CO_2 \quad \text{Equation (2)}$$

3. Oxidation of unburned hydrocarbons (HC) to carbon dioxide and water via:

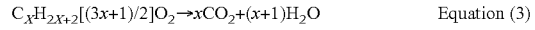

$$C_xH_{2x+2}[(3x+1)/2]O_2 \rightarrow xCO_2 + (x+1)H_2O \quad \text{Equation (3)}$$

These reactions occur most efficiently when the catalytic converter receives exhaust from an engine running at or slightly above the stoichiometric point. This is between 14.6 and 14.8 parts air to 1 part fuel, by mass, for gasoline. Within a narrow fuel/air ratio band surrounding stoichiometry, conversion of all three pollutants is nearly complete. For example, most catalytic converters operate with 97 percent efficiency. When there is more oxygen than required, the engine system is said to be running lean, and the system is in oxidizing condition. In that case, the two oxidation reactions, i.e. Equations 2 and 3 above, are favored at the expense of the reduction of $NO_X$ (Equation 1). On the other hand, when there is excessive fuel, the engine is running rich, and the reduction of $NO_X$ is favored (Equation 1), at the expense of CO and HC oxidation (Equations 2 and 3 above).

Referring again to FIG. 5, the addition of compressed air via compressed air conduit 520 to the exhaust gases in the catalytic converter inlet conduit 548 to produce gaseous mixture 572 will favor Equation 2 and Equation 3 above. Since a racing engine, or other engine that is generating a large amount of power, is running with a rich fuel mixture, such as when a vehicle is accelerated or operated with an open throttle, this will cause the catalytic converter 510 to oxidize a large amount of the rich fuel mixture that is present in the exhaust gases from the engine. Rather than allowing the rich fuel mixture to pass through the catalytic converter 510 to the exhaust 512, the addition of oxygen that is present in the compressed air from compressor 526 will allow the catalytic converter 510 to substantially fully perform the oxidation reactions set forth in Equations 2 and 3 above. The process of oxidizing unburned fuel in the catalytic converter 510 will generate a large amount of heat in the catalytic converter 510. Temperature sensor 552 generates a gas mixture temperature signal 560 that is applied to the controller 514. Again, it is necessary to maintain the temperature of the converted gaseous mixture 574 at a level below approximately 950° C. so that damage does not occur to the catalytic converter 510 or the turbine 508. In that regard, controller 514 generates the variable transmission/electric motor control signal 558 that controls the variable transmission or electric motor 524 to produce additional cooling gases in compressed air conduit 520 to maintain the temperature in the catalytic converter output conduit 556 at a nearly optimal temperature around 900° C.-950° C. More or less compressed gas can be provided by the compressor 526 to maintain the temperature measured by the temperature sensor 552 at around 900° C. Again, 900° C.-950° C. is a nearly optimal temperature because it is lower than the temperature that will cause damage to the turbine 508 and catalytic converter 510, but still high enough to generate the high velocity hot gases in the catalytic converter output conduit 556. The hotter the converted gaseous mixture 574, the greater the velocity of the converted gaseous mixture 574, so that the hotter, converted gaseous mixture 574 are capable of turning the turbine 508 at a higher rate of speed than converted gaseous mixture 574 at a lower temperature. Again, the temperature of 900° C.-950° C. is exemplary only and is based upon the materials of the system. For example, if turbine 508 can be constructed of materials that can withstand higher temperatures, a higher temperature may be a more optimal temperature.

As also illustrated in FIG. 5, oxygen sensor 550 is used to measure the oxygen level of the gases being applied to the catalytic converter 510. An oxygen sensor signal 554, generated by the oxygen sensor 550, is applied to the controller 514. The controller 514 controls the oxygen level of the mixture of exhaust gases and compressed air that are applied to the catalytic converter 510 by generating the variable transmission/electric motor control signal 558 that is applied to the variable transmission or electric motor 524, which controls the compressor 526. Controller 514 is programmed to ensure that a sufficient amount of oxygen is in the gaseous mixture 572 that is applied to the catalytic converter 510 so that the oxidation set forth in Equations 2 and 3 above is complete. Hence, a sufficient amount of compressed air will be applied to the catalytic converter inlet conduit 548 to ensure oxidation in accordance with Equations 2 and 3 above. Additional compressed air will be applied by compressor 526 when the temperature as detected by temperature sensor 552 begins to reach 900° C.-950° C. In that manner, the oxygen sensor 550 must detect a sufficient amount of oxygen in the gaseous mixture 572 to ensure oxidation in accordance with Equations 2 and 3, while maintaining the temperature below a maximum temperature level in response to the gas mixture temperature signal 560, which detects the temperature of the converted gaseous mixture 574 exiting the catalytic converter 510. Programming of the controller 514 can be accomplished using the techniques described above.

Additionally, the high efficiency super-turbocharged engine system 500, illustrated in FIG. 5, can also be operated so that the catalytic converter 510 operates in a stoichiometric fashion. For example, if the engine system 500 is employed on a vehicle, additional oxygen can be added to the catalytic converter inlet conduit 548 to maintain the balance of the reactions of Equations 1-3, so that the catalytic converter 510 operates in a stoichiometric region. A typical situation in an engine system 500 that is disposed in a vehicle is that a rich fuel mixture is used when the throttle is opened vehicle to accelerate the vehicle and obtain more power from the engine 502. In this instance, additional oxygen can be added via the compressor 526, compressed air conduit 520, mixing chamber 516 and openings 546 to balance Equations 1-3 and cause the catalytic converter 510 to operate stoichiometrically. In this manner, pollutants can be greatly reduced in exhaust 512, even during periods of acceleration of the vehicle.

FIG. 6 illustrates a system that is similar to FIG. 5, that is used with a high powered engine system 600, such as that used in a racing vehicle, or to reduce pollutants in open throttle situations. Racing engines are designed to run with a rich air/fuel mixture to ensure that a large amount of power can be generated from the engine 602. A variable transmission or electric motor/generator 630 transfers power 632 between a mechanical propulsion system or electrical propulsion system in response to the super-turbocharger ratio control signal 656 generated by controller 638 in response to engine speed signal 658 and engine load signal 660. A turbine 604 and compressor 608 are coupled to high speed transmission 606 that supplies rotational mechanical energy to reduction gear 628. Compressor 608 compresses air from air intake 612 and supplies the compressed air 676 to conduit 634. The compressed air 676 is cooled in intercooler 614 and applied to the compressed air conduit 636. The compressed air 676 in compressed air conduit 636 is applied to the intake manifold (not shown) to increase the power of the engine 602. Turbine 604 operates in response to a hot, converted gaseous mixture 674 from catalytic converter output conduit 650. The hot, converted gaseous mixture 674 operates the blades of the turbine 604 and is exhausted through exhaust 610.

As illustrated in FIG. 6, an additional compressor 624 is coupled to a variable transmission 626 that is coupled to reduction gear 628. The variable transmission 626 spins the compressor 624 at a desired speed in response to variable transmission/motor control signal 652. Compressor 624 compresses gases from cooling gas intake 622 and supplies the compressed gas 670 to compressed gas conduit 620. Again, the source of the cooling gas intake 622 can comprise any desired gas, including exhaust gases, crank case gases, fresh air or other sources of gas. The compressed gas 670 in compressed gas conduit 620 is applied to mixing chamber 616, which includes openings 662 in the catalytic converter inlet conduit 640. The catalytic converter inlet conduit 640 is also coupled to the exhaust manifold 618. Catalytic converter 646 is coupled to the catalytic converter inlet conduit 640 proximate to the exhaust manifold 618 so that the hot exhaust gases from the exhaust manifold 618 can be applied to the catalytic converter 646. Temperature sensor 644 detects the temperature of the gaseous mixture 672 of the compressed gas and the exhaust gases that are applied to the catalytic converter 646. Oxygen sensor 642 generates an oxygen sensor signal 648 that is applied to controller 638. Temperature sensor 644 monitors the temperature of the converted gaseous 674 that is exiting the catalytic converter 646. Temperature sensor 644 generates a gas mixture temperature sensor signal 654, which is applied to controller 638.

Controller 638 operates essentially in the same manner as controller 514 of FIG. 5. Since engine 602 may operate with a rich fuel mixture, a sufficient amount of compressed gas 670 is supplied to catalytic converter 646, by compressor 624, in response to the variable transmission/motor control signal 652, to cause a substantially complete oxidation of hydrocarbons and carbon monoxide in accordance with Equations 2 and 3. This causes the catalytic converter 646 to add a large amount of heat to the converted gaseous mixture 674, which is supplied to the catalytic converter output conduit 650 and subsequently to the turbine 604. Oxygen sensor 642 generates an oxygen sensor signal 648 that is applied to controller 638, which ensures that a sufficient amount of oxygen is present in gaseous mixture 672, as a result of the compressed gas 670 supplied by compressor 624, to ensure oxidation in accordance with Equations 2 and 3, in catalytic converter 646. Temperature sensor 644 generates gas mixture temperature signal 654 that is applied to controller 638 to ensure that the correct amount of compressed gas 670 is applied to the catalytic converter inlet conduit 640 to ensure that the temperature of approximately 900° C.-950° C. is maintained in the converted gaseous mixture 674, so that turbine 604 is not damaged. Variable transmission/motor control signal 652 controls the speed at which the compressor 624 is rotated which, in turn, controls the amount of compressed gas that compressor 624 applies to the compressed gas conduit 620.

As indicated above, with respect to FIG. 5, oxygen may be added to the gaseous mixture 672 by compressor 624 during acceleration or open throttle conditions of the engine 602. In that case, the engine 602 is not running stoichiometrically, but rather, a rich fuel mixture is being applied to the engine 602.

As such, additional oxygen can be supplied to the gaseous mixture 672 which is just sufficient to allow the catalytic converter 646 to operate stoichiometrically so that Equations 1-3 are balanced and the three sources of pollution, i.e., $NO_X$, carbon monoxide and hydrocarbons, are all substantially eliminated.

The energy required to operate compressors 526, 624 in FIGS. 5 and 6, respectively, is about half of the power that can be generated by turbines 508, 604, as a result of the additional heat that is generated by catalytic converters 510, 646. In this manner, a large amount of additional energy can be extracted from the rich running engines illustrated in FIGS. 5 and 6. Not only do the systems illustrated in FIGS. 5 and 6 extract additional energy to increase the power output of the engines illustrated in FIGS. 5 and 6, the oxidation described in Equations 2 and 3 significantly reduces pollutants in the exhaust gases of rich running engine systems, such as race cars. Although $NO_X$ is not reduced when extra oxygen is supplied to the input of catalytic converter 646, carbon monoxide and hydrocarbons are significantly oxidized from the exhaust output of these rich running engines. It should also be recognized that, when engine 602 is running rich, engine 602 creates fewer $NO_X$ gases in the combustion chamber, which functions to reduce the output of $NO_X$ gases, even though extra oxygen is added by compressor 624 to the input of the catalytic converter 646 which reduces the effectiveness of Equation 1. Smaller compressors, such as compressors 526, 624 in FIGS. 5 and 6, respectively, can be used since a large amount of compressed gas 670 is not necessary to cause both oxidation and the cooling of the exhaust gases necessary to operate the engine systems illustrated in FIGS. 5 and 6. Inexpensive piston, centrifugal or diaphragm compressors can be used to supply the compressed air that is required. These compressors can operate, as explained above, from an electric motor or from a variable transmission that is connected to the propulsion train. In this manner, the systems illustrated in FIGS. 5 and 6 can be easily constructed at low cost. In addition, the catalytic converters 510, 646 may comprise high flow catalytic converters that are capable of passing a large amount of the gaseous mixture through the catalytic converter. In this fashion, the catalytic converters 510, 646 do not restrict the flow of the exhaust gas to the turbines 508, 604.

Figure 7:
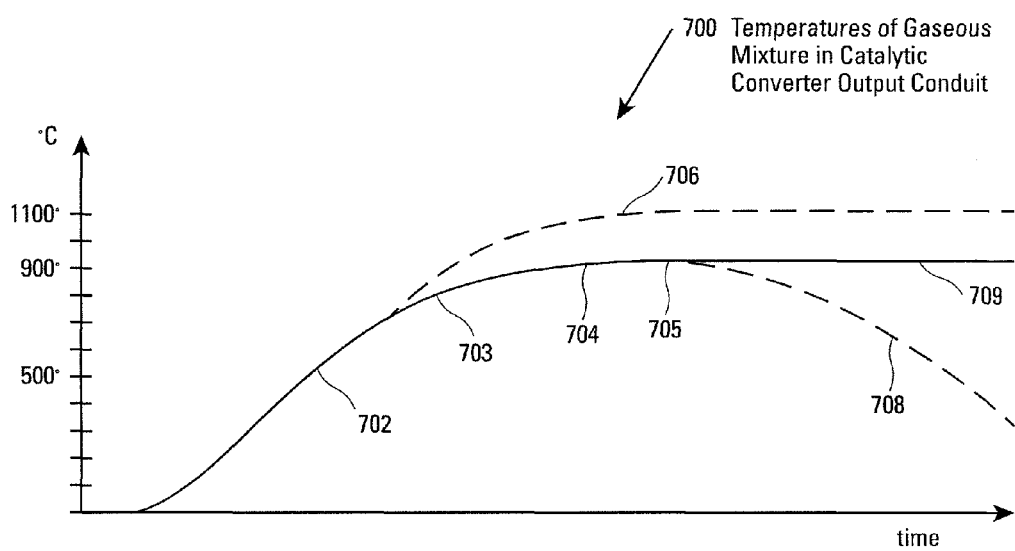
FIG. 7 is a graph of the operational temperatures of a catalytic converter.

FIG. 7 is a graph 700 illustrating the temperatures of the gaseous mixture in the catalytic converter output conduit 556 of FIG. 5 and the catalytic converter output conduit 650 of FIG. 6. As illustrated in FIG. 7, during the portion 702 of the curve, the temperature increases as the catalytic converter 510, 646 begins operation and additional oxygen is provided via the compressed air. At point 703, controllers 514, 638 determine that more air will be required to maintain the gaseous mixture at 900° C.-950° C. As such, a sufficient amount of air is added to maintain the temperature of the gaseous mixture at the output of the catalytic converter 510, 646 at approximately 900° C.-950° C., as illustrated by portion 704 of the curve. If additional compressed air was not added, the temperature of the gaseous mixture at the output of the catalytic converters 510, 646 would otherwise increase up to approximately 1100° C., as shown by curve 706. At point 705, the controllers 514, 638 determine that there is a sufficient amount of oxygen in response to the oxygen sensor signal 554, 648, but that the larger amount of air that is being supplied by compressor 526, 624 would cause temperatures of the gaseous mixture at the output of the catalytic converter 510, 646 to decrease, as illustrated by curve 708. Hence, the amount of compressed air is reduced so that the temperature of the gaseous mixture is maintained at approximately 900° C.-950° C., as illustrated by portion 709 of the curve. In this manner, the temperature of the gaseous mixture at the output of the catalytic converters 510, 646 is maintained at a substantially optimal level to extract the most amount of energy from the hot exhaust gases by turbines 508, 604, while also ensuring, through detection of the oxygen sensors 550, 642, that a sufficient amount of oxygen is present in the gaseous mixture at the input of the catalytic converters 510, 646, as detected by oxygen sensors 550, 642 to ensure that a complete oxidation occurs, in accordance with Equations 2 and 3 above.

Figure 8:
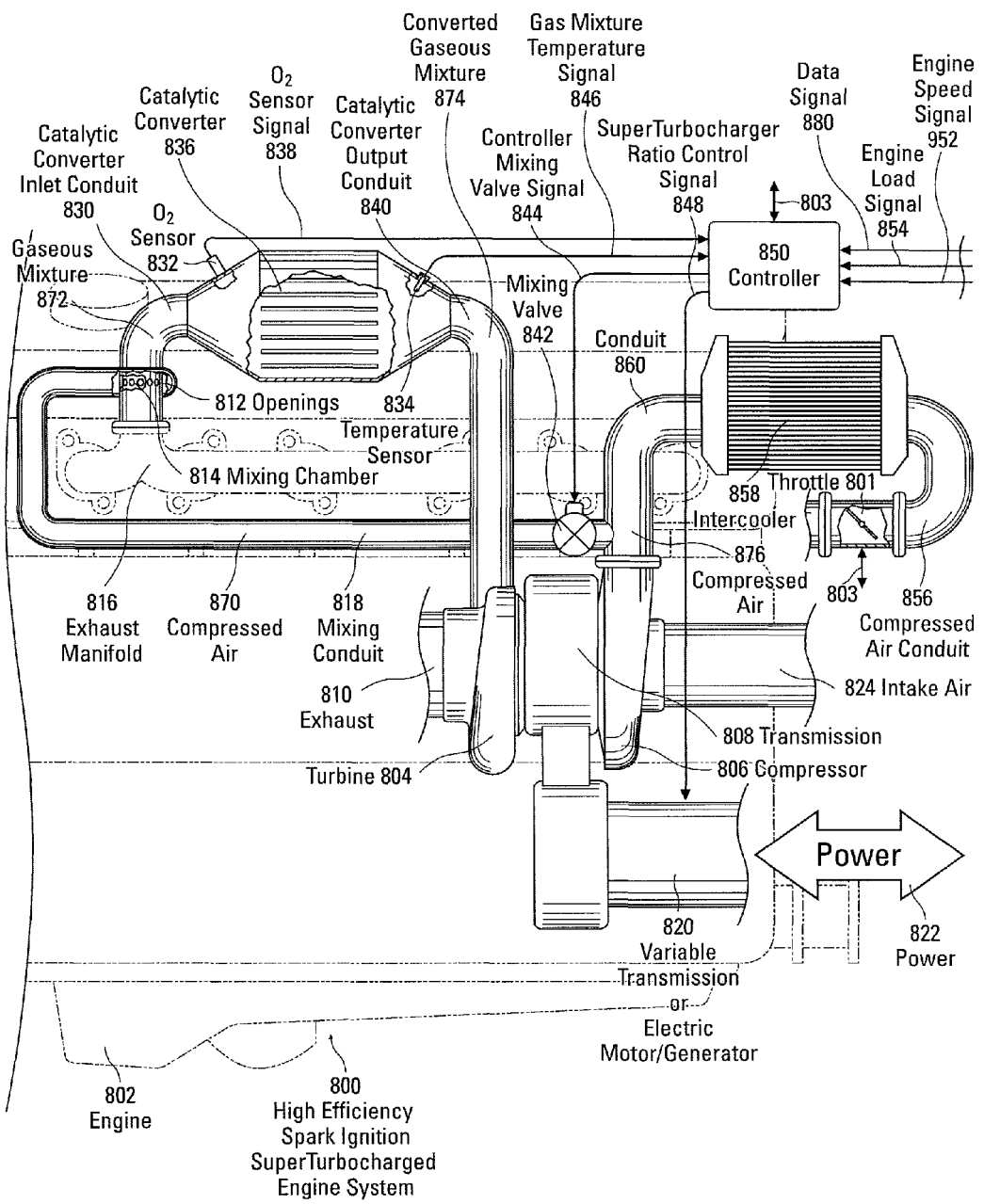
FIG. 8 is another embodiment of a high efficiency super-turbocharged engine system.

FIG. 8 is a schematic illustration of another embodiment of a high efficiency super-turbocharged engine system 800. As shown in FIG. 8, engine 802 utilizes a superturbocharger that includes a turbine 804 and a compressor 806. Connected to the turbine 804 and compressor 806 is a transmission 808 that transfers power between the variable transmission or electric motor/generator 820 and the turbine 804/compressor 806. Power 822 is transferred between the variable transmission or electric motor generator 820 and an engine output or power train, as described above. Intake gas 824 is compressed by the compressor 806 and exhaust gases 810 are exhausted from the turbine 804.

As illustrated in FIG. 8, compressor 806 supplies compressed air 876 to conduit 860. The compressed air 876 in conduit 860 is applied to intercooler 858, which cools the compressed air 876. The cooled compressed air is then applied to the intake manifold (not shown) of the engine 802 via compressed air conduit 856. Mixing valve 842 is connected to mixing conduit 818 that supplies compressed air 870 to the catalytic converter inlet conduit 830 via mixing chamber 814. Mixing valve 842 operates under the control of controller mixing valve signal 844. Openings 812 in the catalytic converter inlet conduit 830 allow the compressed air 870 to flow into the catalytic converter inlet conduit 830 and mix with the exhaust gases from the exhaust manifold 816. The pressure of the compressed air 870 in mixing conduit 818 is greater than the average pressure of the exhaust gases in the catalytic converter inlet conduit 830, so that the compressed air 870 flows into and mixes with the exhaust gases in the catalytic converter inlet conduit 830 to produce gaseous mixture 872. As indicated above, the intake gas 824 may comprise fresh intake air from the surrounding environment or other gases. If fresh air is supplied through the mixing conduit 818 to the mixing chamber 814, the addition of oxygen to the catalytic converter 836 will assist in oxidizing carbon monoxide and hydrocarbons that exist in the exhaust gases from exhaust manifold 816. By adding additional oxygen to the exhaust gases that exceeds the stoichiometric point for the air/fuel ratio, the catalytic converter 836 will effectively oxidize both the hydrocarbons and carbon monoxide gases that exist in the exhaust gases, in accordance with the processes set forth in Equation 2 and Equation 3. However, the additional oxygen, that exceeds the stoichiometric point, will reduce the processes set forth in Equation 1, so that there will be a less effective reduction of $NO_X$ gases.

As also shown in FIG. 8, the catalytic converter inlet conduit 830 is connected to the input of the catalytic converter 836. Catalytic converter 836 may comprise a high flow catalytic converter that creates little or no back pressure on the exhaust emitted from exhaust manifold 816. High flow catalytic converters can be used in all of the embodiments disclosed herein. An oxygen sensor 832 can assist in creating gaseous mixtures that have a stoichiometric ratio, so that the catalytic converter operates in a stoichiometric manner. Oxygen sensor 832 senses the oxygen level of the gaseous mixture 872. An oxygen sensor signal 838, generated by the oxygen sensor 832, is applied to the controller 850. Controller 850 calculates the proper oxygen level to create a stoichiometric ratio of the gaseous mixture 872 to reach a stoichiometric point. Controller 850 then generates a controller mixing valve signal 844 that controls the mixing valve 842 to adjust the amount of compressed air 870 that is mixed with the exhaust gases in mixing chamber 814 to create a stoichiometric ratio of these gases.

The catalytic converter can then perform the chemical reactions indicated in Equations 1-3, above. As such, carbon monoxide and hydrocarbons are oxidized in the catalytic converter 836, while $NO_X$ gases are also reduced, since a stoichiometric ratio of the air/fuel mixture is provided to the catalytic converter 836. In addition, data signal 880 can provide data from the vehicle computer to controller 850. The vehicle computer controls the air/fuel ratio of the mixture entering the engine combustion chamber. When a non-stoichiometric ratio of the air/fuel mixture is sent to the engine, that ratio of air/fuel is known by the vehicle computer. The data signal 880 includes air/fuel ratio data relating to the air/fuel ratio. Controller 850 can begin the process of controlling the opening or closing of the mixing valve 842 via the controller mixing valve signal 844 in anticipation of a change in the air/fuel ratio of the exhaust gases emitted from the exhaust manifold. For example, if the throttle is opened on the vehicle, the vehicle computer generates a control signal that controls the air/fuel ratio to control the throttle. The control signal is also applied as data signal 880 to controller 850. Controller 850 calculates the new air/fuel ratio and generates a controller mixing valve signal 844 to open the mixing valve 842 by a predetermined amount to add more compressed air 870 to the catalytic converter inlet conduit 830 to increase the oxygen content of the gaseous mixture 872. Oxygen sensor 832 generates an $O_2$ sensor signal 838 that is applied to controller 850 to confirm that the proper oxygen level of the gaseous mixture 872 exists at the input to the catalytic converter 836. Controller 850 can continue to adjust the mixing valve 842, as the air/fuel ratio changes, in response to the data signal 880. The delay between the opening of the throttle, which creates a rich fuel mixture, and the existence of the rich fuel mixture ratio in the exhaust emitted from the exhaust manifold 816 is known, or can be calculated, by controller 850. Controller 850 also calculates the delay between the opening of the mixing valve 842 and the supply of compressed air to the catalytic converter inlet conduit 830, for a given pressure of compressed air 870, so that the opening of the mixing valve 842 can be timed so that the additional oxygen from the compressed gas reaches the catalytic converter inlet conduit 830 approximately simultaneously with the rich fuel mixture emitted by the exhaust manifold 816. In this manner, a stoichiometric ratio can be continuously applied to the catalytic converter 836, so that the catalytic converter 836 can operate in a stoichiometric manner and substantially reduce pollutants in accordance with Equations 1-3. The catalytic converter 836 may also be operated in a non-stoichiometric manner, as described below.

As also shown in FIG. 8, temperature sensor 834 detects the temperature of the converted gaseous mixture 874 exiting the catalytic converter 836. Converted gaseous mixture 874 flows into catalytic converter output conduit 840 and is channeled to the turbine 804 to drive the turbine 804. The converted gaseous mixture 874 is then exhausted at exhaust 810. Controller 850 receives the $O_2$ sensor signal 838, indicating the amount of oxygen in the gaseous mixture 872 applied to the catalytic converter, and the gas mixture temperature signal 846, indicating the temperature of the converted gaseous mixture 874 flowing from the catalytic converter 836. Controller 850 generates a controller mixing valve signal 844 in response to the engine speed signal 852 and the engine load signal 854, as well as the $O_2$ sensor signal 838 and gas mixture temperature signal 846, to control the operation of the mixing valve 842. For example, the compressed air 870 that flows from the conduit 860 through the mixing control valve 842 may function to cool the gaseous mixture 872 entering the catalytic converter 836, as well as provide additional oxygen for oxidizing a rich fuel mixture without creating a stoichiometric ratio. For example, the $O_2$ sensor 832 may indicate to controller 850 that additional oxygen is needed to oxidize a rich fuel mixture to bring the catalytic converter 836 up to stoichiometric operating levels. Temperature sensor 834 may then indicate that additional compressed air may be needed to cool the gases emitted from the catalytic converter 836, so that the turbine 804 is not damaged. Controller 850 can operate the mixing valve 842 to ensure that an adequate supply of intake air is supplied to the catalytic converter input conduit 830, so that catalytic converter 836 can operate stoichiometrically in the presence of a rich fuel mixture and, if necessary, provide additional cooling gases, so that the converted gaseous mixture 874 does not exceed a temperature which would damage turbine 804. In that case, the additional compressed air 870 would cause the gaseous 872 to not be a stoichiometric ratio, but the converted exhaust gases can be cooled to prevent damage to the turbine 804.

As indicated with respect to FIG. 2, the pressure of the compressed air 876 must be greater than the pressure of the exhaust gases in the catalytic converter inlet conduit 830 to cause a flow of compressed air 870 into the catalytic converter inlet conduit 830. To ensure that the pressure of the compressed air 836 is sufficient to create enough flow of the compressed air 870 into the mixing chamber 814, a throttle 801 can be used to increase the pressure in compressed air conduit 856 and conduit 860. The throttle 801 can be adjusted to increase the back pressure in the compressed air conduit 856, by limiting the flow of compressed air into the intake manifold. Controller 850 generates a control signal 803 that controls the operation of throttle 801. As explained above, as the pressure in the compressed air conduit 856 and conduit 860 increases, the mass flow of the converted gaseous mixture 874 increases, which increases the output of turbine 804. In this manner, a sufficient pressure differential can be created between the compressed air 870 and the exhaust pressure in the exhaust manifold 816.

Figure 9:
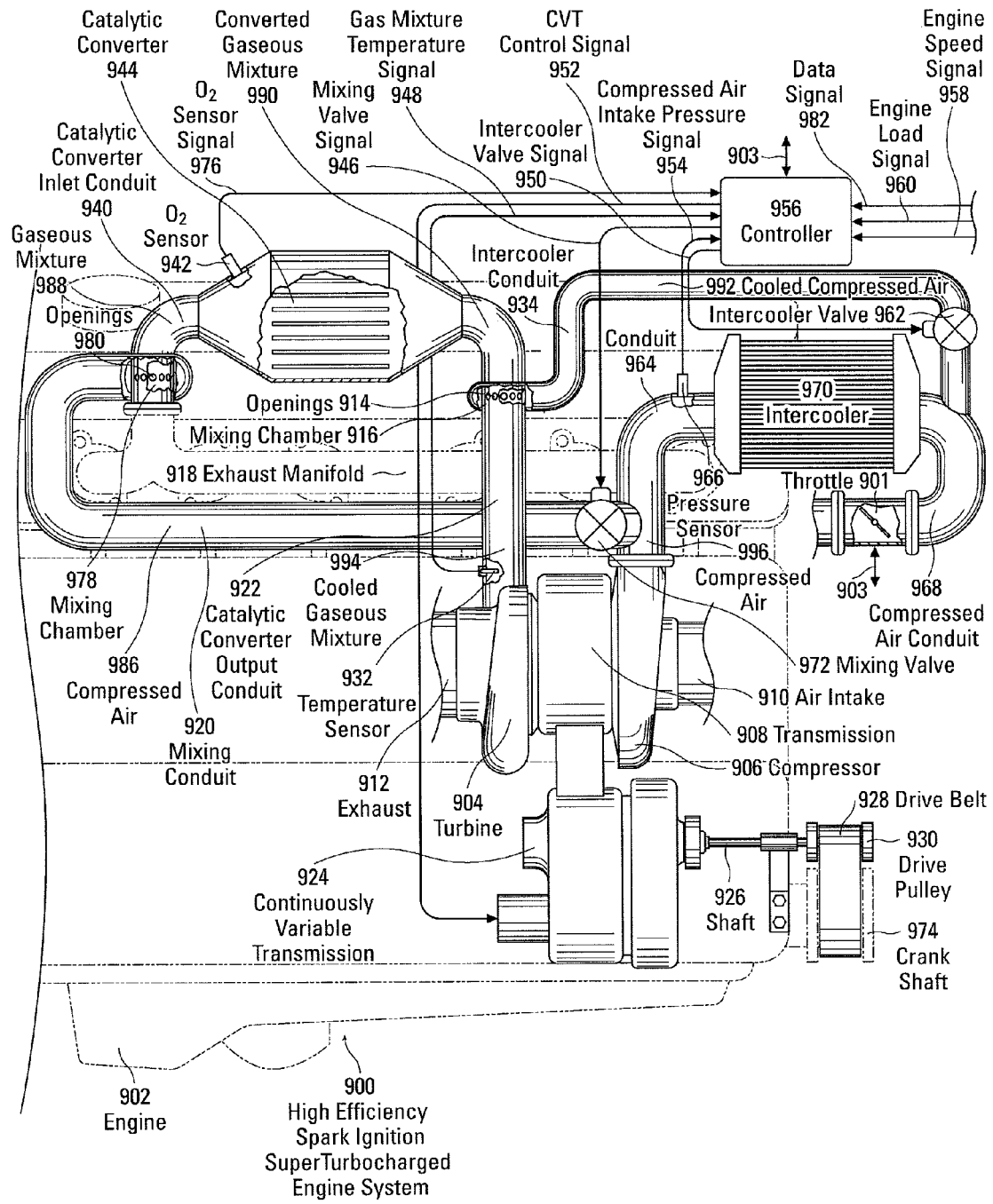
FIG. 9 is another embodiment of a high efficiency super-turbocharged engine system.

FIG. 9 is a schematic illustration of another embodiment of a high efficiency spark ignition super-turbocharged engine system 900. The engine system includes an engine 902, a turbine 904, a compressor 906 and a transmission 908. Transmission 908 transfers power between the turbine/compressor shaft (not shown) and continuously variable transmission 924. Power is also transferred between the continuously variable transmission 924 and shaft 926, drive belt 928, drive pulley 930 and crank shaft 974. CVT control signal 952 operates the continuously variable transmission 924 with respect to coupling the rotational energy from the transmission 908 to crank shaft 974 at the proper rotational speed. Alternatively, continuously variable transmission 924 can be connected to an electric motor generator, as disclosed above. Further, rather than coupling power to a crank shaft 974, power can be coupled to a propulsion train of a vehicle, such as a vehicle transmission.

As also shown in FIG. 9, compressor 906 functions to compress air from an air intake 910, which supplies compressed air 996 to conduit 964. Pressure sensor 966 generates a compressed air intake pressure signal 954 that is fed to the controller 956. Conduit 964 supplies the compressed air 996 to intercooler 970, which cools the compressed air 996. The cooled compressed air 992 is then supplied to the compressed air conduit 968, which is coupled to the intake manifold (not shown) of engine 902. The cooled compressed air 992 at the output of the intercooler 970 is also supplied to an intercooler conduit 934. Controller 956 generates an intercooler valve signal 950 that is applied to the intercooler valve 962 to control the operation of the intercooler valve 962. When the intercooler valve 962 is opened, cooled compressed air 992 is supplied by the intercooler conduit 934 to the mixing chamber 916. Openings 914 allow the cooled compressed air 992 to enter the catalytic converter output conduit 922 to cool the converted gaseous mixture 990 emitted from the catalytic converter 944. Temperature sensor 932 detects the temperature of the cooled gaseous mixture 994 and generates a gas mixture temperature signal 948 that is applied to controller 956. If the temperature of the cooled gaseous mixture 994 entering the turbine 904, as indicated by the gas mixture temperature signal 948, is too high, the intercooler valve 962 is controlled by intercooler valve signal 950 to open an additional amount to further cool the cooled gaseous mixture 994 entering the turbine 904.

As also shown in FIG. 9, mixing valve 972 operates in response to mixing valve signal 946 to supply compressed air 996 to the mixing conduit 920. Mixing conduit 920 is coupled to the mixing chamber 978 to supply compressed air 986 from the mixing conduit 920 to the catalytic converter inlet conduit 940. The compressed air 986 in the mixing conduit 920 normally constitutes compressed air that contains oxygen. Since cooling air is supplied by intercooler conduit 936, via mixing chamber 916, to the converted exhaust gases emitted by the catalytic converter 944, compressed air 986 that is supplied to the catalytic converter inlet conduit 940 does not need to both oxidize hydrocarbons and carbon monoxide and provide cooling gases to cool the gaseous mixture 988. In other words, all of the cooling of the converted gaseous mixture 990 can be accomplished by the cooled compressed air 992. In this manner, the compressed air 986 provided by mixing conduit 920 can be for the sole purpose of creating a stoichiometric ratio of gases in the catalytic converter inlet conduit 940. In a manner similar to that disclosed above with respect to FIG. 8, a data signal 982 from the vehicle computer is received by the controller 956, which indicates the ratio of the air/fuel mixture that is being applied to the combustion chambers of engine 902. Data signal 982 is used by the controller 956 to control the opening of mixing valve 972 via mixing valve signal 946. The mixing valve signal 946 opens the mixing valve 972 to allow a sufficient amount of compressed air 996 into the mixing conduit 920, which is inserted in the catalytic converter inlet conduit 940 via mixing chamber 978 and openings 980 to create a stoichiometric ratio of gases that are applied to the catalytic converter 944, in the manner described with respect to FIG. 8. $O_2$ sensor 942 confirms the oxygen level of the gaseous mixture 988 and generates $O_2$ sensor signal 976 that is applied to the controller 956 to confirm that the desired oxygen level has been achieved in gaseous mixture 988 to create a stoichiometric ratio in gaseous mixture 988. Mixing valve 972 can be operated in a continuous manner in response to mixing valve signal 946 to continuously create a stoichiometric ratio in gaseous mixture 988 for the various operating conditions of the vehicle.

Alternatively, mixing valve 972 can operate in response to the $O_2$ sensor signal 976 to simply ensure that enough oxygen is supplied to the gaseous mixture 988 to oxidize hydrocarbons and carbon monoxide without creating a stoichiometric ratio of gaseous mixture 988 that is applied to catalytic converter 944. In that case, Equations 2 and 3 are favored with respect to Equation 1. As such, catalytic converter 944, will not function to reduce $NO_X$ gases. For example, $O_2$ sensor 942 can generate an $O_2$ sensor signal 976, that is applied to controller 956, to indicate the oxygen level in the gaseous mixture 988 that is applied to the catalytic converter 944. In response to the $O_2$ sensor signal 976, controller 956 generates mixing valve signal 946 to control the level of oxygen in the gaseous mixture 988 that is applied to the catalytic converter 944. In this manner, additional oxygen can be supplied to ensure that there is a full oxidation of carbon monoxide and hydrocarbons without regard to reduction in $NO_X$ gases. The converted gases at the output of the catalytic converter 944 are then transmitted to the catalytic converter output conduit 922, where these gases are mixed with the cooled compressed air 996 from intercooler conduit 934. The cooled gaseous mixture 994 is channeled to the input of turbine 904, which is driven by cooled gaseous mixture 994 and which is exhausted by exhaust 912.

As further illustrated in FIG. 9, the compressed air intake pressure signal 954 is applied to controller 956. Controller 956 determines if a potential surge condition may be created from the compressed air intake pressure signal 954, as well as the engine speed signal 958 and engine load signal 960. If so, either mixing valve 972 or intercooler valve 962 can be opened to avoid a surge condition. It may be preferable to open the intercooler valve 962, which would simply add additional cooling gases to the converted exhaust gases exiting the catalytic converter 944, rather than opening the mixing valve 972, since opening the mixing valve 972 may result in a non-stoichiometric ratio of gases in the catalytic converter inlet conduit 940.

Again, as disclosed with respect to FIGS. 2 and 8, the pressure of the compressed air 996 must be sufficient to create a pressure gradient over the exhaust gases in exhaust manifold 918 when applied to catalytic converter inlet conduit 940 and catalytic converter output conduit 922. The pressure differential is necessary to ensure that the compressed air 986 flows into the catalytic converter inlet conduit 940 and that the cooled compressed air 992 flows into the catalytic converter output conduit 922 during all phases of operation of the engine 902. Again, when the engine 902 is operated at high engine RPM, the turbine 904 will create a back pressure in the catalytic converter output conduit 922 and catalytic converter inlet conduit 940. Hence, the compressed air 996 in conduit 964 and compressed air conduit 968 must be sufficiently greater than the pressure of the exhaust gases in catalytic converter output conduit 922 and catalytic converter inlet conduit 940 to cause the compressed air 986 and cooled compressed air 992 to flow. In that regard, throttle 901 is used to increase the pressure in the compressed air conduit 986 and conduit 964, by restricting air flow to the intake manifold (not shown), while maintaining sufficient air flow to the intake manifold, in the manner explained above. The throttle is utilized to generate higher pressures in the compressed air conduit 968 and conduit 964 when the engine is operated at high RPM. These higher pressures in the compressed air conduit 968 and conduit 964 drive the cooled compressed air 992 and the compressed air 996, which increases the air mass flow to turbine 904 and increases turbine power. Controller 956 generates a control signal 903 that is applied to throttle 901 to control the operation of the throttle. In this manner, the throttle 901 can be used to ensure that sufficient flow is created in the bypass circuits.

Figure 10:
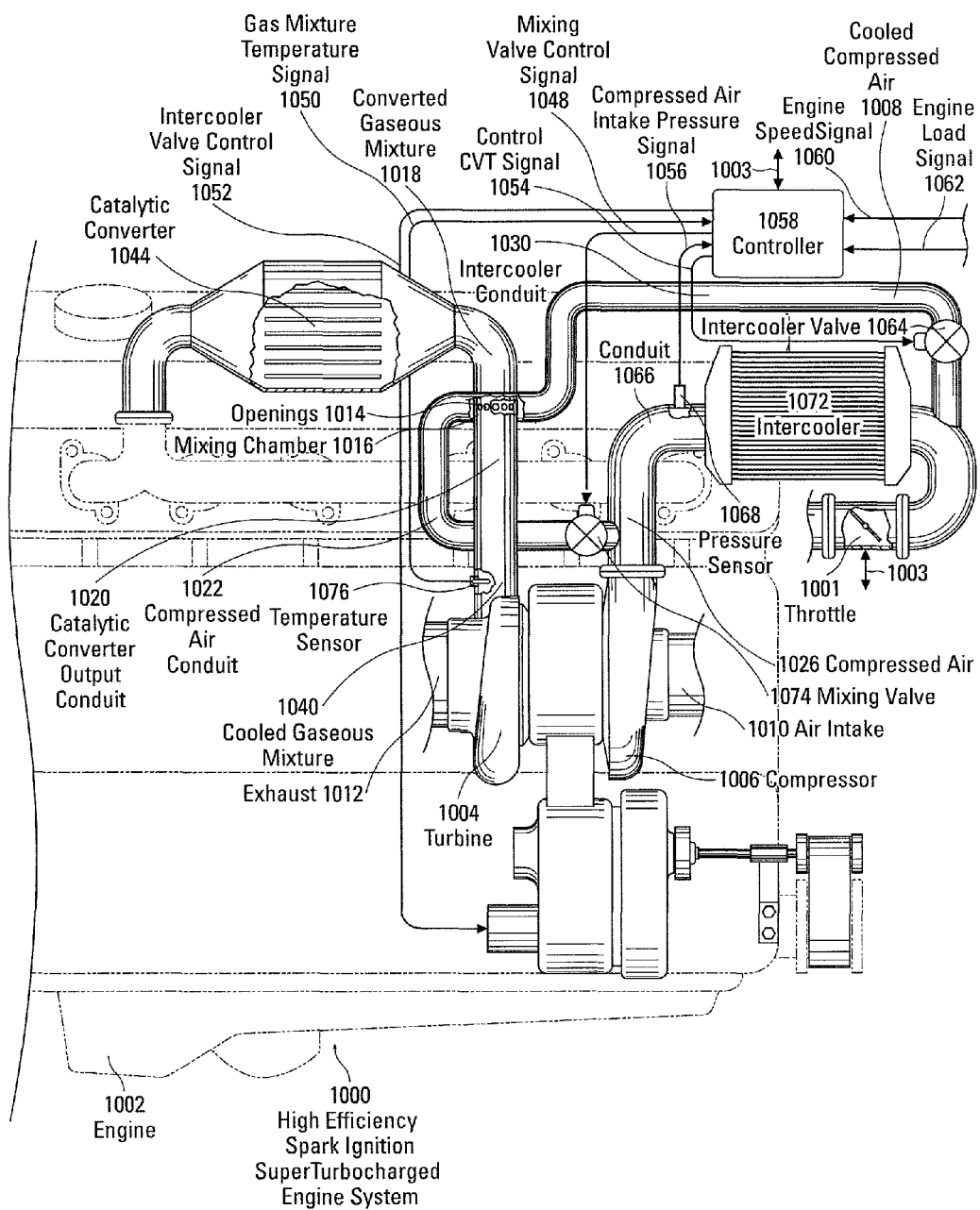
FIG. 10 is another embodiment of a high efficiency super-turbocharged engine system.

FIG. 10 is another embodiment of a high efficiency spark ignition super-turbocharged engine system 1000. Engine 1002 operates with a super-turbocharger that includes a turbine 1004 and a compressor 1006. Compressor 1006 compresses air from air intake 1010 and generates compressed air that is applied to conduit 1066. Pressure sensor 1068 is located in conduit 1066 to detect the pressure of the compressed air 1026 and generate a compressed air intake pressure signal 1056 that is applied to controller 1058. Controller 1058 reads the compressed air intake pressure signal 1056, as well as the engine speed signal 1060 and engine load signal 1062 to determine if a surge condition may be created. In that case, either mixing valve 1074, or intercooler valve 1064, can be opened in response to mixing valve control signal 1048, or intercooler valve control signal 1052, respectively.

FIG. 10 is similar to FIG. 9, in some respects, in that cooled compressed air 1008 can be applied via intercooler valve 1064 to mixing chamber 1016 and flow through openings 1014 to cool the converted gaseous mixture 1018 in the catalytic converter output conduit 1020 to produce the cooled gaseous mixture 1040, which drives turbine 1004. However, the primary source of cooling is from the compressed air 1026 in compressed air conduit 1022. Temperature sensor 1076 generates a gas mixture temperature signal 1050 that indicates the temperature of the converted gaseous mixture 1018 downstream from the mixing chamber 1016. If the temperature of the converted gaseous mixture 1018, at the input of turbine 1004, begins to increase towards a maximum temperature, such as about 950° C., the mixing valve 1074 is opened in response to the mixing valve control signal 1048, generated by controller 1058. If the mixing valve 1074 is opened completely, and the temperature of the converted gaseous mixture 1018, at the input to the turbine 1004 continues to rise, intercooler valve 1064 may be opened in response to an intercooler control valve control signal 1052 generated by controller 1058. In that case, mixing valve 1074 may be closed, or partially closed, so that cooled compressed air 1008 from intercooler 1072, that is present in intercooler conduit 1030, may be required to sufficiently cool the converted gaseous mixture 1018. Since the cooled compressed air 1008 is cooler than the compressed air 1026, the cooled compressed air 1008 may be able to sufficiently cool the converted gaseous mixture 1018, or a combination of the cooled compressed air 1008 and the compressed air 1026 may be needed to sufficiently cool the converted gaseous mixture 1018. If the controller 1058 detects that the gas temperature signal 1050 continues to rise, even though cooled compressed air 1008 and compressed air 1026 are applied to the converted gaseous mixture 1018, controller 1058 may generate a CVT control signal 1054, which will cause the compressor 1006 to be operated at a higher speed, to create more compressed air 1026 and cooled compressed air 1008. In that regard, pressure sensor 1068 creates a compressed air intake pressure signal 1056 that indicates the pressure in conduit 1066 to further determine if a sufficient amount of compressed air is present in conduit 1066. Pressure sensor 1068, as well as the pressure sensors in the other embodiments, also provides to the controller, such as controller 1058, to avoid surge conditions, as explained in more detail above.

In the embodiment illustrated in FIG. 10, compressed air, such as compressed air 1026, is not applied to the input of the catalytic converter 1044. Hence, engine 1002 may be operated with a stoichiometric air/fuel ratio, or a non-stoichiometric air/fuel ratio. In any event, the catalytic converter 1044 may operate with exhaust gases that have a stoichiometric ratio, or non-stoichiometric ratio. In either case, catalytic converter 1044 will attempt to perform the reactions of Equations 1-3 to reduce pollutants in the exhaust 1012.

As set forth above, with respect to the disclosures of FIGS. 2, 8 and 9, the pressure of the compressed air 1026 must be sufficiently high, during all modes of operation of the engine 1002, including high RPM operation, to ensure flow in compressed air conduit 1022 and intercooler conduit 1030. Again, this is accomplished by operating the throttle 1001 so that a back pressure is created in conduit 1066. Throttle 1001 can be operated to limit the flow of compressed air to the intake manifold, which will increase the pressure of compressed air 1026 in conduit 1066 in the manner described above. In this fashion, sufficient pressure of the compressed air 1026 is created in conduit 1066, which ensures the flow of air in the compressed air conduit 1022 and intercooler conduit 1030, even when the engine 1002 is operated at high RPM. Controller 1058 generates a control signal 1003 that is applied to the throttle 1001 to control the operation of throttle 1001.

Figure 11:
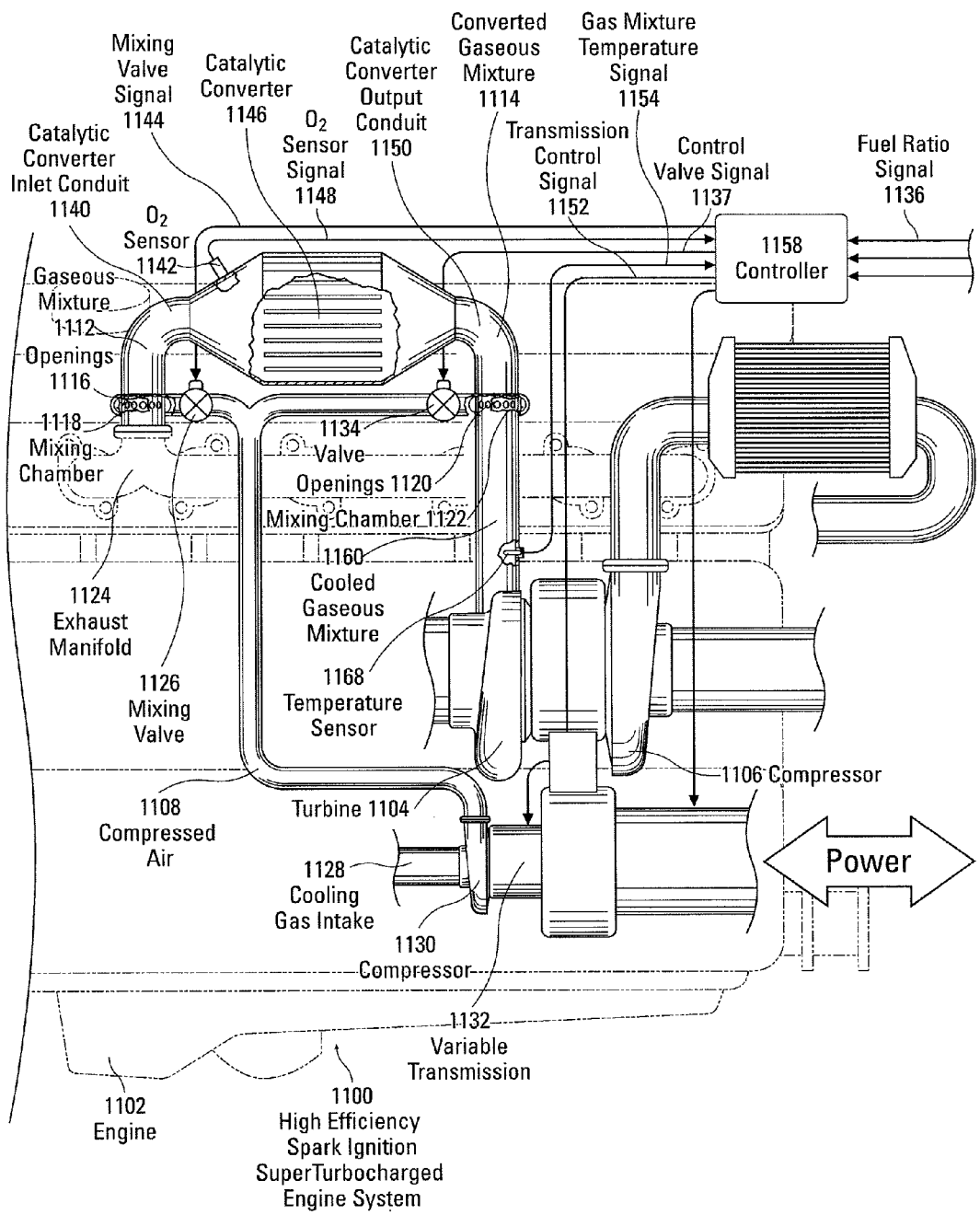
FIG. 11 is another embodiment of a high efficiency super-turbocharged engine system.

FIG. 11 is another embodiment of a high efficiency spark ignition super-turbocharged engine 1100. The super-turbocharged engine system 1100 includes an engine 1102 that has a super-turbocharger that includes a turbine 1104 and a compressor 1106. Variable transmission 1132 is connected to a compressor 1130 which compresses an intake gas from cooling gas intake 1128. The intake gas normally comprises air, but may comprise other gases such as described above. Variable transmission 1132 operates in response to a transmission control signal 1152 generated by controller 1158. The variable transmission 1132 spins the compressor 1130 to create the amount of compressed air 1008 that is desired for cooling of the converted gaseous mixture 1114 and oxidation of hydrocarbons in gaseous mixture 1112. A mixing valve 1074 controls the amount of the compressed air 1108 that is supplied to the mixing chamber 1118. Openings 1116 allow the compressed air 1108 to enter the catalytic converter inlet conduit 1140 through openings 1116 to produce the gaseous mixture 1112. Gaseous mixture 1112 comprises exhaust gases from exhaust manifold 1124 and compressed air 1108. Compressed air 1108 is also fed to mixing chamber 1122. Openings 1120 allow the compressed air 1108 to flow into the catalytic converter output conduit 1150 and mix with the converted gaseous mixture 1114. An optional valve 1134 can be included to control the amount of compressed air 1108 that is supplied to the mixing chamber 1122, in response to control valve signal 1137.

In accordance with the embodiment of FIG. 11, the amount of compressed air 1108 that is supplied by mixing valve 1126 is controlled to produce a gaseous mixture 1112 having an air/fuel ratio that has a stoichiometric ratio. In accordance with one alternative embodiment, a fuel ratio signal 1136 from the vehicle computer can be sent to controller 1158 which indicates the air/fuel ratio of the mixture that is applied to the combustion chambers of engine 1102. The fuel ratio signal 1136 is received by controller 1158, which calculates the oxygen needed to create a gaseous mixture 1112 that has a stoichiometric ratio. Controller 1158 generates a mixing valve signal 1144 in response to the fuel ratio signal 1136. Mixing valve signal 1144 is applied to the mixing valve 1126 so that the correct amount of compressed air 1108 is inserted into the catalytic converter inlet conduit 1140 to create a gaseous mixture 1112 that has a stoichiometric ratio. $O_2$ sensor 1142 detects the oxygen content and generates an $O_2$ sensor signal 1148 that is applied to controller 1158 to ensure that the correct amount of oxygen has been inserted in the catalytic converter inlet conduit 1140 to create a stoichiometric air/fuel ratio. The catalytic converter 1146 then converts the gaseous mixture 1112 to create the converted gaseous mixture 1114 in catalytic converter output conduit 1150. Compressed air 1108 is then applied to mixing chamber 1122. The compressed air 1108 flows through openings 1120 and mixes with the converted gaseous mixture 1114 to create the cooled gaseous mixture 1160 in response to a valve control signal generated by controller 1158. An optional valve 1134 can be provided to control the amount of cooling air that is inserted in the mixing chamber 1122. However, the transmission control signal 1152 can operate the variable transmission 1132 to control the amount of compressed air 1108 that is inserted in the mixing chamber 1122 so that valve 1134 is not needed. Valve 1134 can be controlled by controller 1158 using a valve control signal (not shown). Temperature sensor 1168 detects the temperature of the cooled gaseous mixture 1160 and generates a gaseous mixture temperature signal 1154. Controller 1158 monitors the temperature of the cooled gaseous mixture 1160 and controls the operation of the variable transmission 1132 by way of transmission control signal 1152 to control the amount of compressed air 1108 that is inserted in catalytic converter output conduit 1150 to ensure that the cooled gaseous mixture 1160 does not exceed a temperature that would damage turbine 1104. Alternatively, optional valve 1134 can also be controlled by the controller 1158 to control the amount of compressed air 1108 that is inserted into the catalytic converter output conduit 1150. The cooled gaseous mixture 1160 is then inserted in turbine 1104. Turbine 1104 is driven by the cooled gaseous mixture 1160, which, in turn, drives the compressor 1106.

Figure 12:
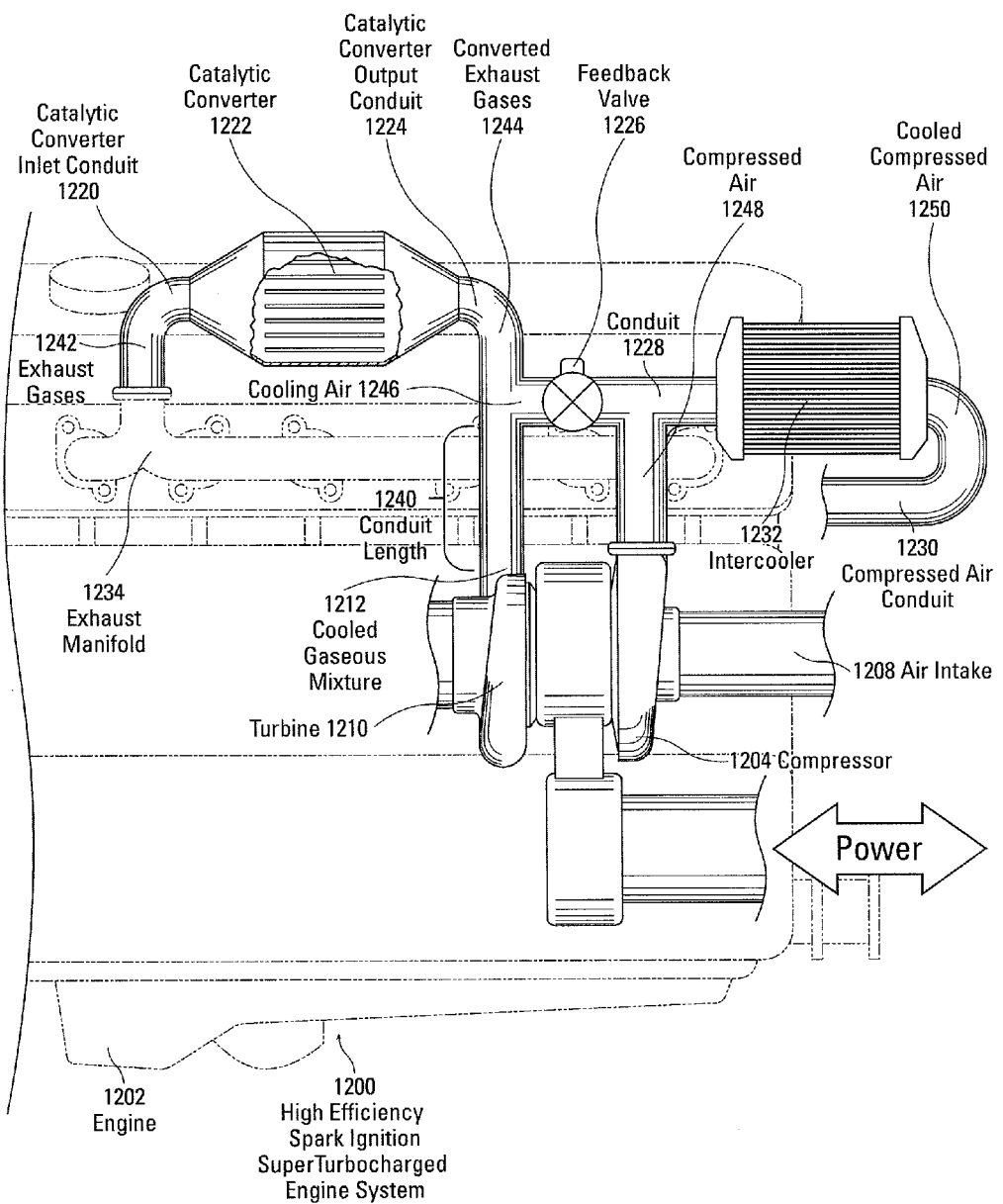
FIG. 12 is another embodiment of a high efficiency super-turbocharged engine system.

FIG. 12 illustrates another embodiment of a high efficiency spark ignition super-turbocharged engine system 1200. The super-turbocharged engine system 1200 includes as engine 1202. Engine 1202 is coupled to a super turbocharger that includes a turbine 1210 and a compressor 1204. Compressor 1204 compresses intake air supplied by air intake 1208 to generate compressed air 1248 in conduit 1228. Intercooler 1232 cools the compressed air 1248 and generates cooled compressed air 1250 in compressed air conduit 1230 that is applied to the intake manifold of engine 1202.

As also shown in FIG. 12, exhaust gases 1242 from exhaust manifold 1234 are inserted into the catalytic converter inlet conduit 1220. The catalytic converter 1222 converts the exhaust gases 1242 to generate converted exhaust gases 1244 in the catalytic converter output conduit 1224. Feedback valve 1226 is mounted in conduit 1228. Conduit 1228 is connected to catalytic converter output conduit 1224. When feedback valve 1226 is open, in response to a control signal, cooling air 1246 from the conduit 1228 mixes with the converted exhaust gases 1244. Conduit length 1240 is sufficient to allow substantial mixing of converted exhaust gases 1244 and the cooling air 1246 so that the cooled gaseous mixture 1212 is mixed and cooled prior to entering the turbine 1210. The engine 1202 can operate with either a stoichiometric air/fuel ratio or a non-stoichiometric air/fuel ratio, such as a rich fuel ratio. When the engine 1202 operates with a stoichiometric air/fuel ratio, catalytic converter 1222 performs the chemical reactions of equations 1-3 to substantially reduce pollutants and the converted exhaust gases 1244. When a non-stoichiometric ratio, such as a rich ratio is used, the catalytic converter 1222 is not as effective as hydrocarbons and carbon monoxide in the exhaust gas are not fully oxidized by the catalytic converter 1222. However, cooling air 1246 reduces the temperature of the converted exhaust gases 1244 prior to entering the turbine 1210. In that regard, during an open throttle condition for a vehicle in which engine 1202 is mounted, a rich fuel mixture is used in engine 1202. This creates higher levels of hydro carbons and carbon monoxide in the exhaust gases 1242 that are converted by catalytic converter 1222. Cooling air 1246 ensures that the temperature of the cooled gaseous mixture 1212 does not exceed a temperature which would cause damage to turbine 1210.

Figure 13:
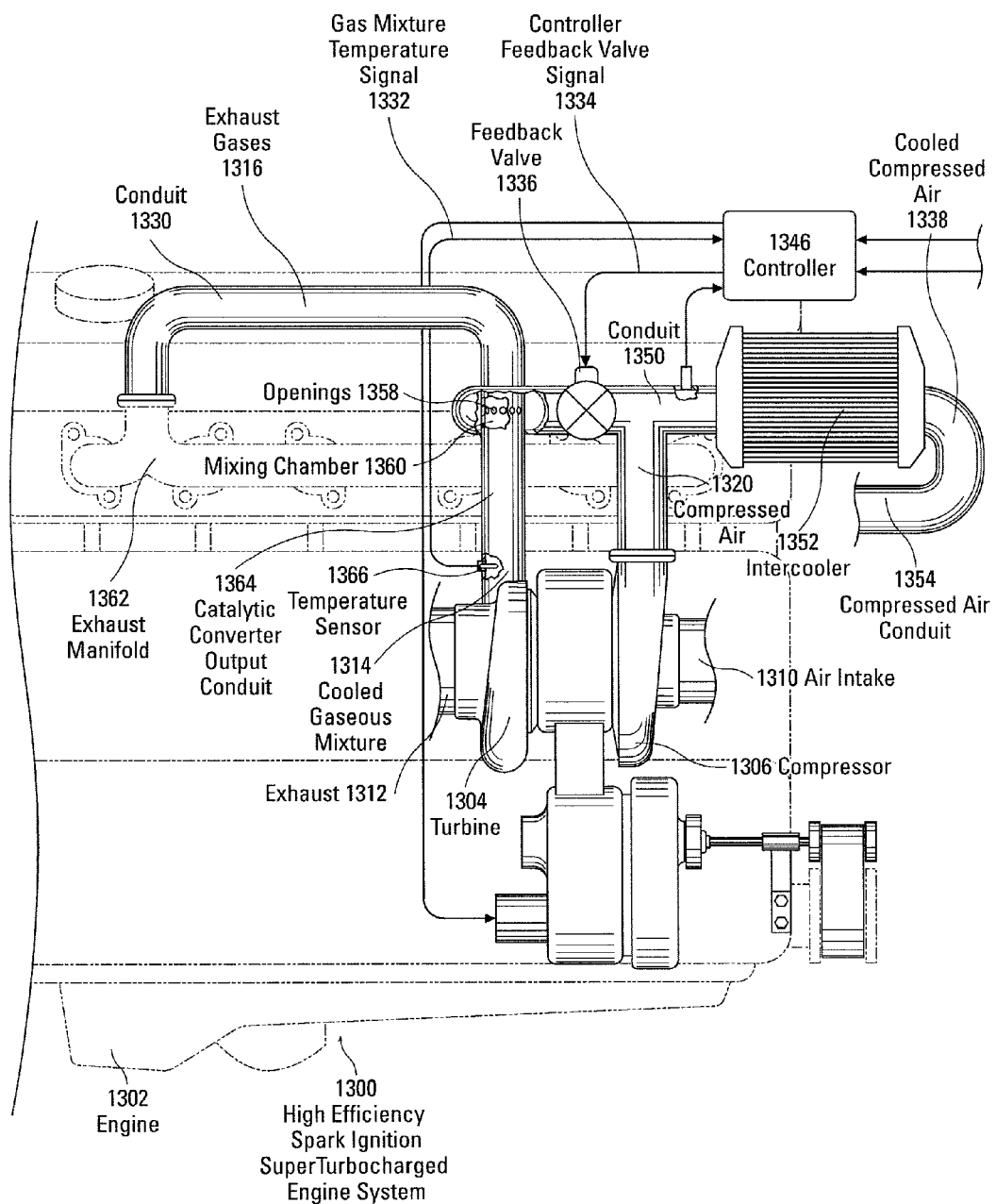
FIG. 13 is another embodiment of a high efficiency super-turbocharged engine system.

FIG. 13 is a schematic illustration of another embodiment of a high efficiency spark ignition super-turbocharged engine system 1300. The super-turbocharged engine system 1300 includes an engine 1302 having a super-turbocharger that includes a turbine 1304 and a compressor 1306. Compressor 1306 compresses air from the air intake 1310 to generate compressed air 1320 in conduit 1350. Compressed air 1320 flows through intercooler 1352 which cools the compressed air to create cooled compressed air 1338 in compressed air conduit 1354. The cooled compressed air 1338 in compressed air conduit 1354 is applied to the intake manifold (not shown) of the engine 1302. Exhaust gases 1316 are emitted by the exhaust manifold 1362 and flow through conduit 1330. Feedback valve 1336 allows the compressed air 1320 to flow to mixing chamber 1360. Openings 1358 allow the compressed air 1320 to flow into the catalytic converter output conduit 1364. Temperature sensor 1366 generates a gas mixture temperature signal 1332 that is applied to controller 1346. Controller 1346 generates a controller feedback valve signal 1334 that is applied to the feedback valve 1336 to controller the temperature of the cooled gaseous mixture 1314 detected by temperature sensor 1366. The temperature of the cooled gaseous mixture 1314 is maintained below a maximum temperature that would damage turbine 1304.

Figure 14:
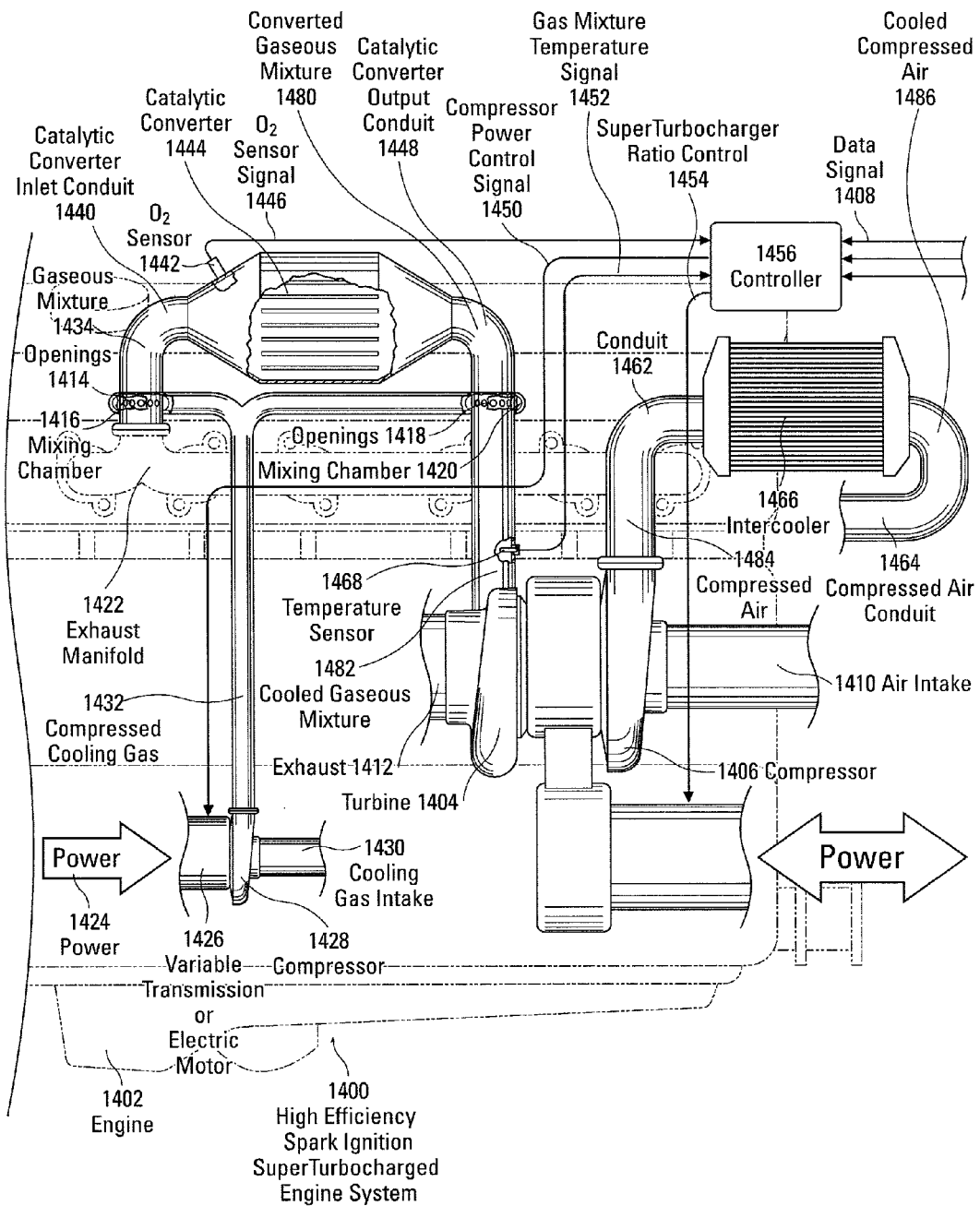
FIG. 14 is another embodiment of a high efficiency super-turbocharged engine system.

FIG. 14 is a schematic illustration of a high efficiency spark ignition super-turbocharged engine system 1400. The super-turbocharged engine system 1400 includes an engine 1402 that is equipped with a super-turbocharger. The super-turbocharger includes a turbine 1404 and a compressor 1406. Compressor 1406 compresses intake air provided by air intake 1410 to provide compressed air 1484 in conduit 1462. Intercooler 1466 cools the compressed air 1484 to create cooled compressed air 1486 in compressed air conduit 1464. The cooled compressed air 1486 is applied to the intake manifold (not shown) of the engine 1402.

As also illustrated in FIG. 14, a variable transmission or electric motor 1426 is operated under the control of compressor power control signal 1450 that is generated by controller 1456. The variable transmission or electric motor 1426 is operated by power source 1424. The power source 1424 can be an electrical power source that operates an electric motor 1426 or a mechanical power source that operates a variable transmission 1426. Compressor 1428 is coupled to the variable transmission or electric motor 1426 and generates compressed cooling gas 1432. The compressor 1428 generates the compressed cooling gas 1432 from the gas provided at the cooling gas intake 1430. In general, the cooling gas comprises of fresh air but can comprise any of the other gases described above. The compressed cooling gas is supplied to the mixing chamber 1416. The mixing chamber 1416 has openings 1414 that allow the compressed cooling gas 1432 to flow into the catalytic converter inlet conduit 1440, and mix with exhaust gases from exhaust manifold 1422, to produce a gaseous mixture 1434. In addition, the compressed cooling gas 1432 is supplied to mixing chamber 1420. Mixing chamber 1420 has openings 1418 in catalytic converter output conduit 1448 that allows the converted gaseous mixture 1480 to flow into the catalytic converter output conduit 1448 to produce cooled gaseous mixture 1482. The cooled gaseous mixture is supplied to turbine 1404, to drive turbine 1404, and is exhausted from exhaust outlet 1412. If the engine 1402 is running rich, the compressor 1428 can provide additional oxygen in the form of the compressed cooling gas 1432 that is applied to the mixing chamber 1416 to create a stoichiometric ratio of the gaseous mixture 1434. The stoichiometric ratio of the gaseous mixture 1434 can be produced in catalytic converter inlet conduit 1440 by adjusting the operation of variable transmission or electric motor 1426 in response to compressor power control signal 1450 that is provided by controller 1456. Controller 1456 controls the variable transmission or electric motor 1426 via compressor power control signal 1450 to supply more or less compressed cooling gas 1432 to the catalytic converter inlet conduit 1440. Also, oxygen sensor 1442 monitors the oxygen level in the catalytic converter inlet conduit 1440 and generates an $O_2$ sensor signal 1446 that provides controller 1456 with a signal indicating the oxygen level present in the catalytic converter inlet conduit 1440. The controller 1456 can also control the oxygen level in the catalytic converter inlet conduit 1440 by controlling the amount of compressed cooling gas 1432 that is supplied to mixing chamber 1416 by controlling the operation of variable transmission or electric motor thorough the use of $O_2$ sensor signal 1446. Alternatively, a data signal 1408 can be supplied from the vehicle computer that indicates the air/fuel ratio of the gaseous mixture that is being applied to the combustion chamber of engine 1402. Controller 1456 then generates the compressor power control signal 1450 in response to the data signal 1408. Temperature sensor 1468 generates a gas mixture temperature signal 1452 that is also applied to controller 1456. Again, the variable transmission electric motor 1426 can be adjusted by the controller 1456 which generates a compressor power control signal 1450 in response to the gas mixture temperature signal 1452 to ensure that the temperature of the cooled gaseous mixture 1482 does not exceed a maximum temperature that could damage turbine 1404.

Figure 15A:
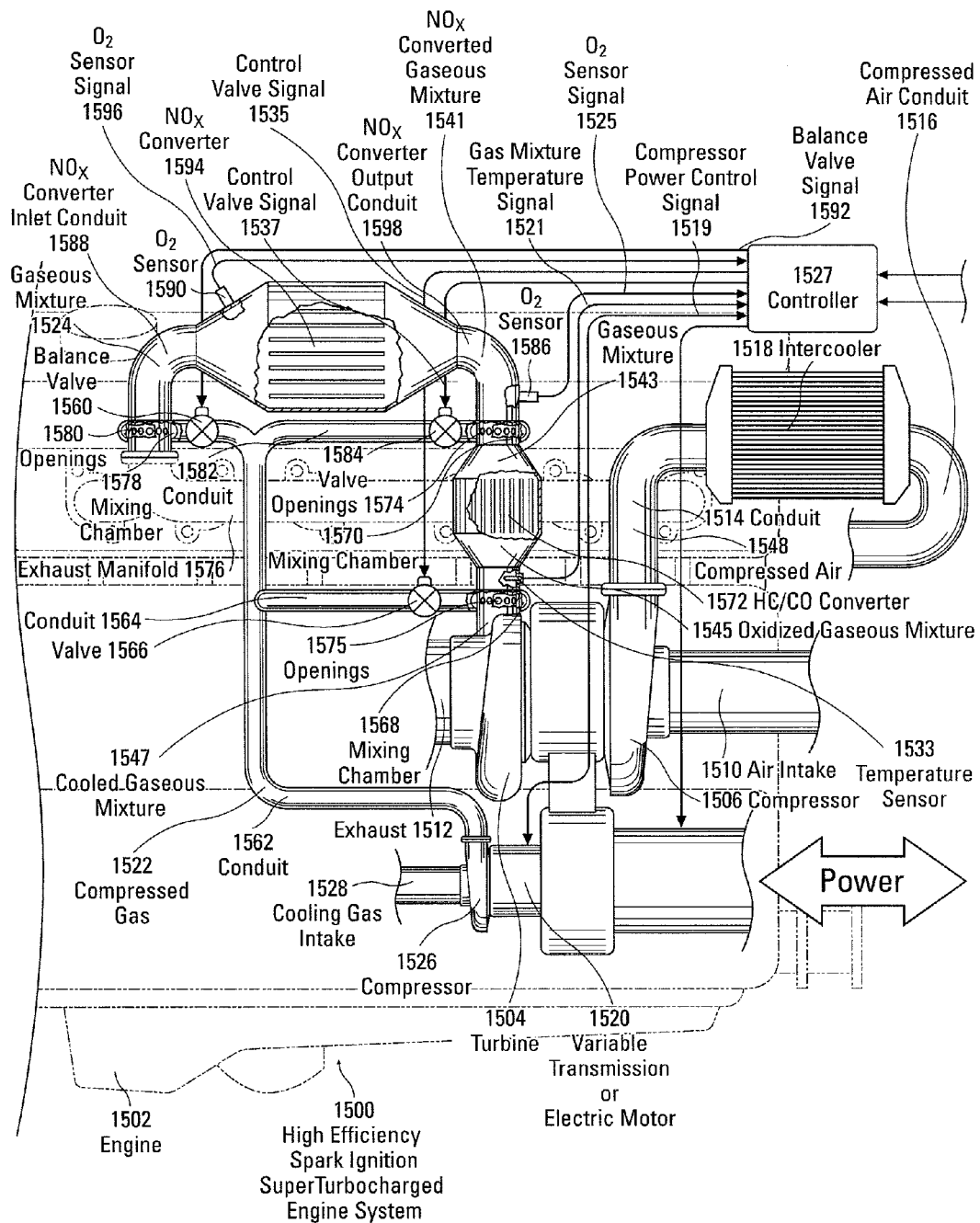
FIG. 15 is another embodiment of a high efficiency super-turbocharged engine system.

FIG. 15A illustrates another embodiment of a high efficiency spark ignition super-turbocharged engine system 1500. The super-turbocharged engine system 1500 includes an engine 1502 that is equipped with a super-turbocharger. The super-turbocharger includes a turbine 1504 and a compressor 1506. Compressor 1506 compresses intake air from air intake 1510 to create compressed air 1548 in conduit 1514. Intercooler 1518 cools the compressed air 1548 to create cooled compressed air 1550 in compressed air conduit 1516, that is applied to the intake manifold (not shown) of the engine 1502.

As also illustrated in FIG. 15A, a variable transmission or electric motor 1550 is operated in response to a compressor power control signal 1519 generated by controller 1527. A compressor 1526 is coupled to the variable transmission or electric motor 1520 and compresses a cooling gas supplied by cooling gas intake 1528. The cooling gas may comprise fresh air or other gases described above. The compressed gas 1522 produced by compressor 1526 is supplied to conduit 1562. The compressed gas is channeled through conduit 1562 to balance valve 1560. Balance valve is operated in response to balance valve signal 1592 that is generated by controller 1527. The compressed gas 1522 is applied to the mixing chamber 1578 and flows into the $NO_X$ converter inlet conduit 1588 through openings 1580 to create gaseous mixture 1524. Gaseous mixture 1524 is a mixture of the compressed gas 1522 and exhaust gases from exhaust manifold 1576. $O_2$ sensor 1590 monitors the oxygen level of the gaseous mixture 1524 and generates an $O_2$ sensor signal 1596 that is applied to controller 1527. Controller 1527 controls the operation of the balance valve 1560 via balance valve signal 1592 to supply more or less compressed gas 1522 to the $NO_X$ converter inlet conduit 1588. The $NO_X$ converter 1594 functions to reduce the $NO_X$ gases in accordance with Equation 1 above. Hydrocarbon/carbon monoxide converter 1572 functions to oxidize hydrocarbons and carbon monoxide in the $NO_X$ converted gaseous mixture 1541 that exits the $NO_X$ converter 1594. In other words, the reduction of pollutants occurs in two stages. $NO_X$ converter 1594 converts $NO_X$ gases. The $NO_X$ converted gaseous mixture 1541 is then applied to the hydrocarbon/carbon monoxide converter 1572 which oxidizes hydrocarbons and carbon monoxide in the $NO_X$ converted gaseous mixture 1541. From Equation 1, it is understood that $NO_X$ gases are reduced when the fuel ratio is rich. From Equations 2 and 3 above, additional oxygen allows the hydrocarbon/carbon monoxide converter 1572 to fully oxidize the hydrocarbons and carbon monoxide. If a very rich mixture, such as 30% over rich mixture, is combusted by engine 1502, the exhaust gases from exhaust manifold 1576 may be extremely rich with hydrocarbons and carbon monoxide. Combusting all of the hydrocarbons and carbon monoxide in hydrocarbon/carbon monoxide converter 1572 may cause the hydrocarbon/carbon monoxide converter 1572 to overheat. In that regard, oxygen can be supplied from the compressed gas 1522 via balance valve 1560 to combust some of the hydrocarbons in converter 1594, which may comprise the three-way catalytic converter that is capable of oxidizing hydrocarbons and carbon monoxide. In this manner, the existence of hydrocarbon and carbon monoxide in the $NO_X$ converted gaseous mixture 1541 is somewhat reduced so that the hydrocarbon/carbon monoxide converter 1572 does not have to oxidize all of the hydrocarbons and carbon monoxide and, as such, may avoid overheating. $O_2$ sensor 1590 provides an $O_2$ sensor signal 1596 to the controller 1527 to monitor the addition of oxygen by way of compressed gas 1522 to the $NO_X$ converter inlet conduit 1588.

As also illustrated in FIG. 15A, conduit 1562 is connected to conduit 1582 which supplies the compressed gas 1522 to a mixing chamber 1570 when valve 1584 is open. Compressed gas 1522 flows through the openings 1574 to create gaseous mixture 1543. Valve 1584 operates in response to the control valve signal 1537 which is generated by controller 1527. $O_2$ sensor 1586 monitors the oxygen level in the $NO_X$ converted gas mixture 1541 and generates an $O_2$ sensor signal 1525 that is applied to controller 1527. Controller 1527 opens the valve 1584 by way of control valve signal 1537 to add compressed gas 1522 through openings 1574 to the $NO_X$ converted gaseous mixture 1541 to ensure that there is sufficient oxygen in the gaseous mixture 1543 that is entering the hydrocarbon/carbon monoxide converter 1572 to fully combust all of the hydrocarbons and carbon monoxide. It is not necessary to create a stoichiometric ratio in the gaseous mixture 1543 since $NO_X$ gases have been converted in $NO_X$ converter 1594. Temperature sensor 1533 monitors the temperature of the oxidized gaseous mixture 1545 exiting the hydrocarbon/carbon monoxide converter 1572 and generates a gaseous mixture temperature signal 1521 that is applied to controller 1527. Controller 1527 utilizes the gas mixture temperature signal 1521 to generate a control valve signal 1535 that controls the operation of valve 1566 that is disposed in conduit 1564. Valve 1566 allows compressed gas 1522 to flow into mixing chamber 1568 and through openings 1575 to mix with the oxidized gaseous mixture 1545 to cool the oxidized gaseous mixture 1545. The cooled gaseous mixture 1547 is then applied to turbine 1504. The operation of valve 1566 ensures that the cooled gaseous mixture 1547 does not exceed a temperature which would damage turbine 1504.

The advantage of super-turbocharged engine system 1500, illustrated in FIG. 15A, is that the engine can be allowed to run rich without creating any additional pollution. By allowing the engine 1502 to run rich, the liquid fuel in the engine assists in cooling the internal engine parts which increases the longevity of engine 1502. Also, $NO_X$ converter 1594 operates more efficiently with a rich fuel mixture. Further, the rich fuel mixture is fully oxidized in hydrocarbon/carbon monoxide converter 1572 so that hydrocarbons and carbon monoxide are not present in exhaust 1512. Further, rich running engines are normally considered to be less efficient because of the wasted fuel in the exhaust. However, the heat generated by the oxidation of the hydrocarbons and carbon monoxide in hydrocarbon/carbon monoxide converter 1572 is at least partially retrieved by operating the turbine 1504 with the oxidized gaseous mixture 1545. This additional heat generated in the oxidized gaseous mixture 1545 drives the turbine 1504 in a manner that allows a large portion of the energy from the rich fuel mixture to be retrieved. Valve 1566 is operated so that the temperature of the cooled gaseous mixture 1547 is in the range of 900° C.-950° C. which is just below the temperature of which the turbine 1504 could be damaged. In addition, the engine 1502 creates additional horsepower when run on a rich fuel mixture which also adds to the efficiency of the super-turbocharged engine system 1500. Hence, the super-turbocharged engine system 1500, illustrated in FIG. 15A, increases the output horsepower of the engine 1502, does not create any pollutants and is capable of retrieving what would otherwise be a wasted heat in the cooled gaseous mixture 1597 to operate the turbine 1504. In addition, internal engine parts of engine 1502 run cooler since the rich fuel mixture functions to cool the engine parts and the $NO_X$ converter 1594 is more effective.

To further simplify the operation of the engine system 1500, the addition of compressed gas 1522 to the $NO_X$ converter inlet conduit 1588 can be eliminated. Part of the reason for adding compressed gas 1522 to the gaseous mixture 1524 is to partially oxidize the rich fuel mixture in the $NO_X$ converter 1594 which may function as a three-way converter, rather than just simply $NO_X$ converter. As indicated above, the reason for partially oxidizing the rich fuel mixture is to prevent the hydrocarbon/carbon monoxide converter 1572 from overheating because of the large amount of hydrocarbons and carbon monoxide in the $NO_X$ converted gaseous mixture 1541. However, an additional amount of compressed gas 1522 can be added to the $NO_X$ converted gaseous mixture 1541 in the $NO_X$ converter output conduit 1598 which is beyond the amount that is required to fully oxidize the hydrocarbons and carbon monoxide. In other words, an additional amount of the compressed gas 1522 can be inserted in the $NO_X$ converter output conduit 1598 to not only oxidize all the hydrocarbons and carbon monoxide in the hydrocarbon/carbon monoxide converter 1572 but also provide cooling gases to reduce the operating temperature of the hydrocarbon/carbon monoxide converter 1572. In this manner, the compressed gas 1522 supplied by the mixing chamber 1570 can be supplied in an amount that will prevent the hydrocarbon/carbon monoxide converter 1572 from overheating. The gas mixture temperature signal 1521 supplies temperature data at the output of the hydrocarbon/carbon monoxide converter 1572 to controller 1527 so that the controller 1527 can operate valve 1584 via control valve signal 1537 to prevent the hydrocarbon/carbon monoxide converter 1572 from overheating, while still maintaining a suitable operating temperature for operation of the hydrocarbon/carbon monoxide converter 1572. In this manner, balance valve 1560 can be eliminated.

Figure 15B:
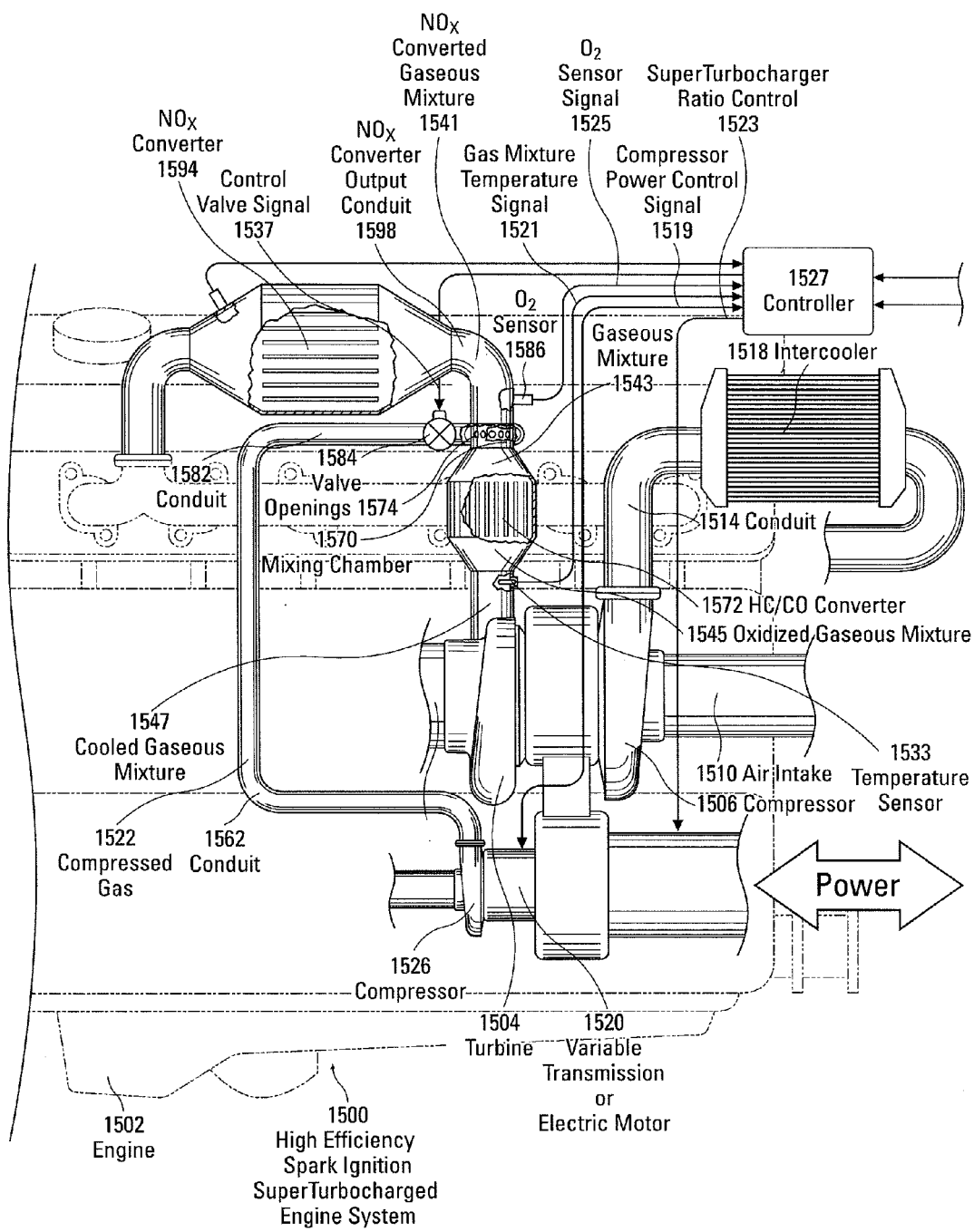

FIG. 15B is a schematic illustration of a modification of the high efficiency spark ignition super-turbocharged engine system 1500 of FIG. 15A. As shown in FIG. 15B, a single conduit 1582 is used to supply compressed air 1522 for the purpose of both providing oxygen to the hydrocarbon/carbon monoxide converter 1572 and providing cooling gas. In comparison with FIG. 15A, mixing chamber 1578 and balance valve 1560 have been removed as well as conduit 1564, valve 1566 and mixing chamber 1568. Conduit 1582 and valve 1584 can supply the oxygen necessary for the hydrocarbon/carbon monoxide converter 1572 to fully oxidize all of the hydrocarbons and carbon monoxide that exist in the $NO_X$ converted gaseous mixture 1541. Further, additional compressed air 1522 can be added to the $NO_X$ converted gaseous mixture 1541 to cool the oxidized gaseous mixture 1545 to maintain the temperature of the oxidized gaseous mixture 1545 below a maximum temperature that would cause damage to turbine 1504. Temperature sensor 1533 produces a gas mixture temperature signal 1521 that is sent to the controller 1527. The controller can simply monitor the temperature of the oxidized gaseous mixture 1545 and control the valve 1584 using control valve signal 1537 to ensure that a sufficient amount of compressed gas 1522 is supplied to the $NO_X$ converter output conduit 1598 to maintain the temperature of the oxidized gaseous mixture 1545 below a temperature that would damage turbine 1504. However, a sufficient amount of oxygen must be supplied to the $NO_X$ converted gaseous mixture 1541 to ensure that all of the hydrocarbons and carbon monoxide are oxidized in the hydrocarbon/carbon monoxide converter 1572. For example, during cold start conditions, the $NO_X$ converted gaseous mixture 1541 is relatively cool and does not need additional compressed gas 1522 for cooling. However, additional compressed gas 1522 is needed to initiate and assist the catalyst in hydrocarbon/carbon monoxide converter 1572 in performing the oxidation process of hydrocarbons and carbon monoxide. In that regard, $O_2$ sensor 1586 monitors the oxygen level in the $NO_X$ converted gaseous mixture 1541 and generates an $O_2$ sensor signal 1525 that is sent to the controller 1527 indicating the oxygen levels present in the $NO_X$ converted gaseous mixture 1541. If additional oxygen is needed in the gaseous mixture 1543 entering the hydrocarbon/carbon monoxide converter 1572 to ensure full oxidation of all of the hydrocarbons and carbon monoxide that exists in the $NO_X$ converted gaseous mixture 1541, controller 1527 can open valve 1584 to ensure that a sufficient amount of compressed air 1522 is supplied to the $NO_X$ converter output conduit 1598 to fully oxidize the hydrocarbons and carbon monoxide.

Further, valve 1584 is not necessary if the variable transmission 1520 that operates compressor 1526 is controlled by controller 1527 via compressor power control signal 1519 to supply the desired amount of compressed gas 1522 in response to the $O_2$ sensor signal 1525 and the gas mixture temperature signal 1521. Alternatively, compressor 1526 can be run at a constant speed so that a sufficient amount of compressed gas 1522 can be supplied to both oxide and cool the $NO_X$ converted gaseous mixture 1541 either without any control or by simply controlling valve 1584. If the system is run without valve 1584, compressor 1526 simply supplies a set amount of compressed gas 1522, which ensures both full oxidation and enough compressed gas 1522 to cool the gaseous mixture 1543 under all operating conditions. The only disadvantage in such a system is that the temperature of the hydrocarbon/carbon monoxide converter 1572 may be lowered and not operate as efficiently as the hydrocarbon/carbon monoxide converter 1572 could operate at a higher temperature. Further, the additional mass flow of air, under many conditions, will lower the temperature of the cooled gaseous mixture 1547 so that the turbine 1504 would not operate as efficiently as turbine 1504 would operate when the cooled gaseous mixture 1547 is near the maximum temperature that would otherwise cause damage to turbine 1504. Compressor 1526 can also be operated using an electric motor that is powered by the electrical system of the super-turbocharged engine system 1500. An electric motor 1520 can also be controlled by controller 1527 to supply the correct amount of compressed gas 1522 so that valve 1584 is not required.

The super-turbocharged engine system 1500 illustrated in FIGS. 15A and 15B, as well as the other embodiments disclosed herein, are unique in that they use compressed gas such as compressed gas 1522 as a coolant. Compressed gases are not normally considered to be an effective coolant since the properties of compressed gases are not especially effective as a coolant. Liquids such as water or liquid fuel are normally considered to be effective coolants. However, the use of a compressed gas provides the oxygen and a cooling medium for cooling the hot exhaust gases. Although a large amount of compressed air is needed for cooling, the additional mass flow is used to run the turbine 1504 at higher power levels. In addition, the turbine 1504 is kept from over speeding by transmitting the additional power back to either the crankshaft of the engine or to the propulsion train of a vehicle.

Figure 16:
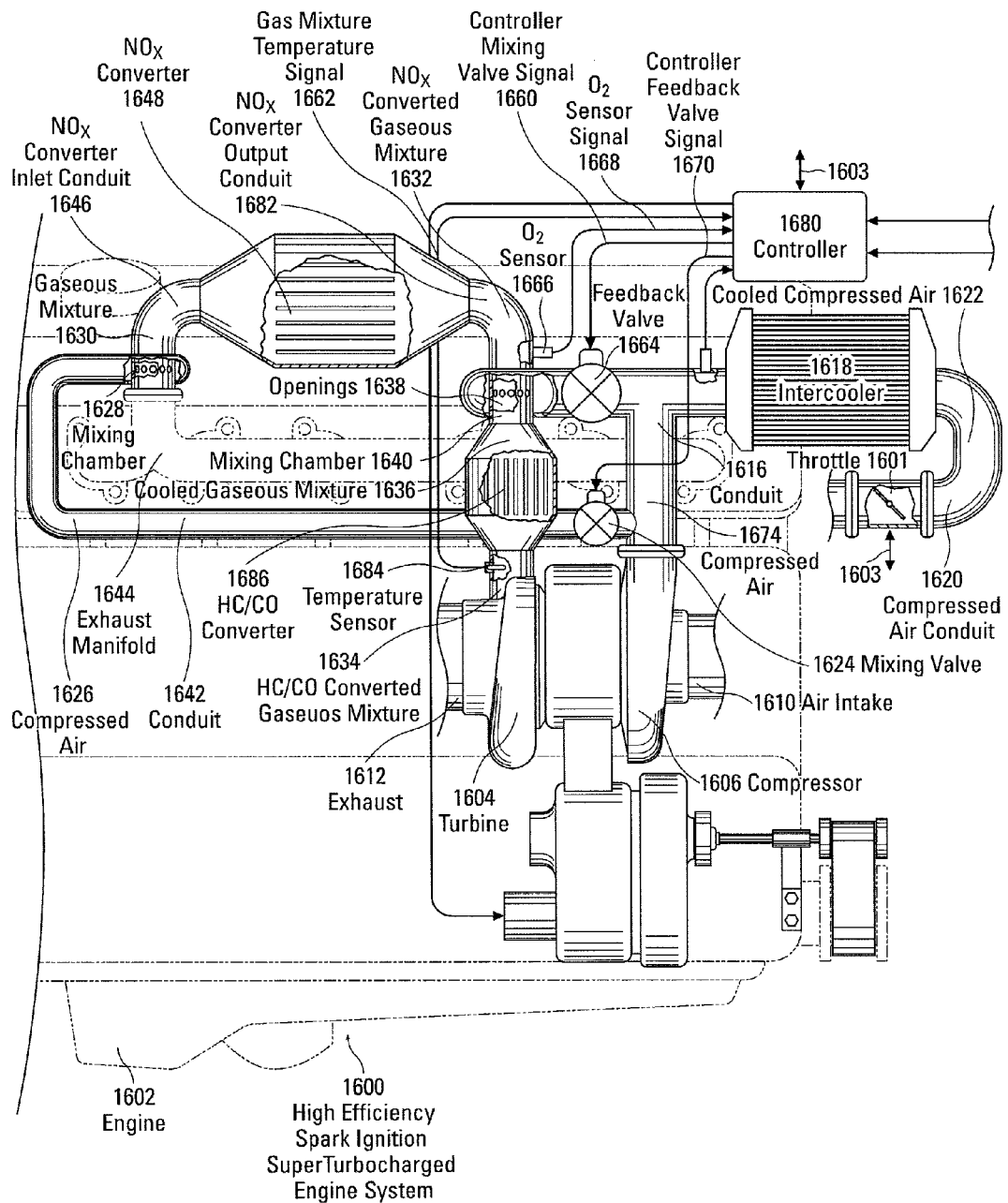
FIG. 16 is another embodiment of a high efficiency super-turbocharged engine system.

FIG. 16 is a schematic illustration of another embodiment of a high efficiency spark ignition super-turbocharged engine system 1600. As shown in FIG. 16, the super-turbocharged engine system 1600 includes an engine having a super-turbocharger. The super-turbocharger includes a turbine 1604 and a compressor 1606. Compressor 1606 compresses air supplied by air intake 1610 to produce the compressed air 1674 in conduit 1616. Intercooler 1618 cools the compressed air to produce cooled compressed air 1622 in compressed air conduit 1620, which is supplied to the intake manifold (not shown) of engine 1602. Feedback valve 1664 is mounted in the conduit 1616 and supplies compressed air 1674 to the mixing chamber 1640. Openings 1638 allows the compressed air 1674 to flow into the $NO_X$ converter output conduit 1682 to mix with the $NO_X$ converted gaseous mixture 1632. Exhaust gases from exhaust manifold 1644 flow into the $NO_X$ converter in the $NO_X$ converter inlet conduit 1646. $NO_X$ converter 1648 converts the exhaust gases to reduce $NO_X$ gases and supplies the $NO_X$ converted gaseous mixture 1632 to the $NO_X$ converter output conduit 1682. Gaseous mixture 1630 flows into the $NO_X$ converter 1648 which converts the $NO_X$ gases. The $NO_X$ converted gaseous mixture 1632 then flows into $NO_X$ converter output conduit 1682. Oxygen sensor 1666 monitors the oxygen level of the $NO_X$ converted gaseous mixture 1632 and generates $O_2$ sensor signal 1668 that is sent to controller 1680. Controller 1680 generates a controller mixing valve signal 1660 to operate the feedback valve 1664 to supply compressed air 1674 to the $NO_X$ converter output conduit 1682 to be mixed with the $NO_X$ converted gaseous mixture 1632. The compressed air 1674 that is supplied to the $NO_X$ converter output conduit 1682 by feedback valve 1664 provides oxygen as well as cooling gases that are mixed with the $NO_X$ converted gaseous mixture 1632 to create the cooled gaseous mixture 1636. The cooled gaseous mixture 1636 flows into the hydrocarbon/carbon monoxide converter 1686 which oxidizes the hydrocarbons and carbon monoxide present in the cooled gaseous mixture 1636. Temperature sensor 1684 monitors the temperature of the hydrocarbon/carbon monoxide converted gaseous mixture 1634 exiting the hydrocarbon/carbon monoxide converter 1686 and generates a gaseous mixture temperature signal 1662 that is supplied to controller 1680. Controller 1680, in response, generates a controller mixing valve signal 1660 that controls the feedback valve 1664 to supply additional compressed air 1674 to the cooled gaseous mixture 1636 if the temperature of the gaseous mixture at the output of the hydrocarbon/carbon monoxide converter 1686 is approaching a temperature that would damage turbine 1604. The hydrocarbon/carbon monoxide converted gaseous mixture 1634 is supplied to turbine 1604, to drive turbine 1604. The hydrocarbon/carbon monoxide converted gaseous mixture 1634 is then exhausted from turbine 1604 via exhaust 1612. $O_2$ sensor 1666 also monitors the oxygen level in the $NO_X$ converted gaseous mixture 1632 and generates the $O_2$ sensor signal 1668 which is fed to controller 1680. The controller 1680 also uses the $O_2$ sensor signal 1668 to control the feedback valve 1664 by way of controller mixing valve signal 1660 to ensure that there is sufficient oxygen present in the cooled gaseous mixture 1636 to fully oxidize the hydrocarbons and carbon monoxide that are present in the $NO_X$ converted gaseous mixture 1632. Hence, controller 1680 functions to control the feedback valve 1664 to provide both enough oxygen to ensure complete oxidation of hydrocarbons and carbon monoxide in hydrocarbon/carbon monoxide converter 1686 and enough cooling gases to cool the cooled gaseous mixture 1636 so that damage does not occur to turbine 1604. In this manner, the hydrocarbon/carbon monoxide converted gaseous mixture 1634 maintains a temperature that does not damage turbine 1604 while all of the hydrocarbons and carbon monoxide have been oxidized in hydrocarbon/carbon monoxide converter 1686.

FIG. 16 also illustrates an optional conduit 1642 having a mixing valve 1624. Mixing valve 1624 is operated by controller 1680 through the use of controller feedback valve signal 1670. As illustrated in FIG. 16, compressed air 1626 can optionally be provided to mixing chamber 1628 to add oxygen and cooling gases to the gaseous mixture 1630 rather than, or in addition to, the compressed air 1674 added in mixing chamber 1640. In this manner, an additional amount of compressed air 1626 can be added for both cooling and oxidation of hydrocarbons and carbon monoxide in hydrocarbon/carbon monoxide converter 1686. In that regard, conduit 1642 simply shows an alternative location for adding compressed gas. Alternatively, $NO_X$ converter 1648 may comprise a three-way converter. In that case, compressed air 1626 supplies a certain amount of oxygen that would allow oxidation of some of the hydrocarbons and carbon monoxide in a three-way converter 1648 so that all of the hydrocarbons and carbon monoxide do not necessarily have to be oxidized in hydrocarbon/carbon monoxide converter 1686. For example, if the gaseous mixture 1630 is a very rich fuel mixture, such as a fuel mixture that is 30 percent over rich, a large amount of hydrocarbons and carbon monoxide must be oxidized. In that case, hydrocarbon/carbon monoxide converter 1686 could overheat and a sufficient amount of compressed air 1674 may not be able to provide enough cooling to lower the temperature of the hydrocarbon/carbon monoxide converted gaseous mixture 1634 to a temperature that would prevent turbine 1604 from being damaged. In this case, part of the hydrocarbons and carbon monoxide are oxidized in a three-way converter 1648 so that all of the oxidation does not have to occur in hydrocarbon/carbon monoxide converter 1686.

As disclosed with respect to FIGS. 2, 8, 9 and 10, the pressure of the compressed air 1674 in conduit 1616 must be sufficiently high to ensure the flow of air into mixing chamber 1640 and mixing chamber 1628. Again, at high RPM, exhaust pressures may be greater than at lower RPM. A sufficient pressure gradient must be created between the exhaust gas pressure of the exhaust emitted from exhaust manifold 1644 and the pressure of the compressed air 1676 in conduit 1616 to ensure the flow of compressed air 1626 in conduit 1642 and compressed air 1674 through openings 1638. Again, this can be created by controlling throttle 1601 to create a higher pressure in the compressed air conduit 1620, which creates a higher pressure of the compressed air 1674 in conduit 1616. Controller 1680 generates a control signal 1603 that operates the throttle 1601. Again, throttle 1601 creates a back pressure in the compressed air conduit 1620, by limiting the flow through throttle 1601, while still allowing a sufficient amount of air to flow through the throttle 1601 to the intake manifold. The increased pressure in conduit 1616 creates a greater mass flow to the turbine 1604, which increases the turbine power.

Throttle 1601 can then be opened slightly more to increase the flow to the intake manifold, while maintaining the pressure level of the cooled compressed air 1622 in the compressed air conduit 1620. The output of the engine 1602 is therefore increased, which further increases the output of the turbine 1604. In this manner, throttle 1601 can be used to ensure that the pressure differential between the compressed air 1674 and the exhaust pressure is sufficient to create the required amount of flow of compressed air to the $NO_X$ inlet conduit 1646 and to the mixing chamber 1640.

Figure 17:
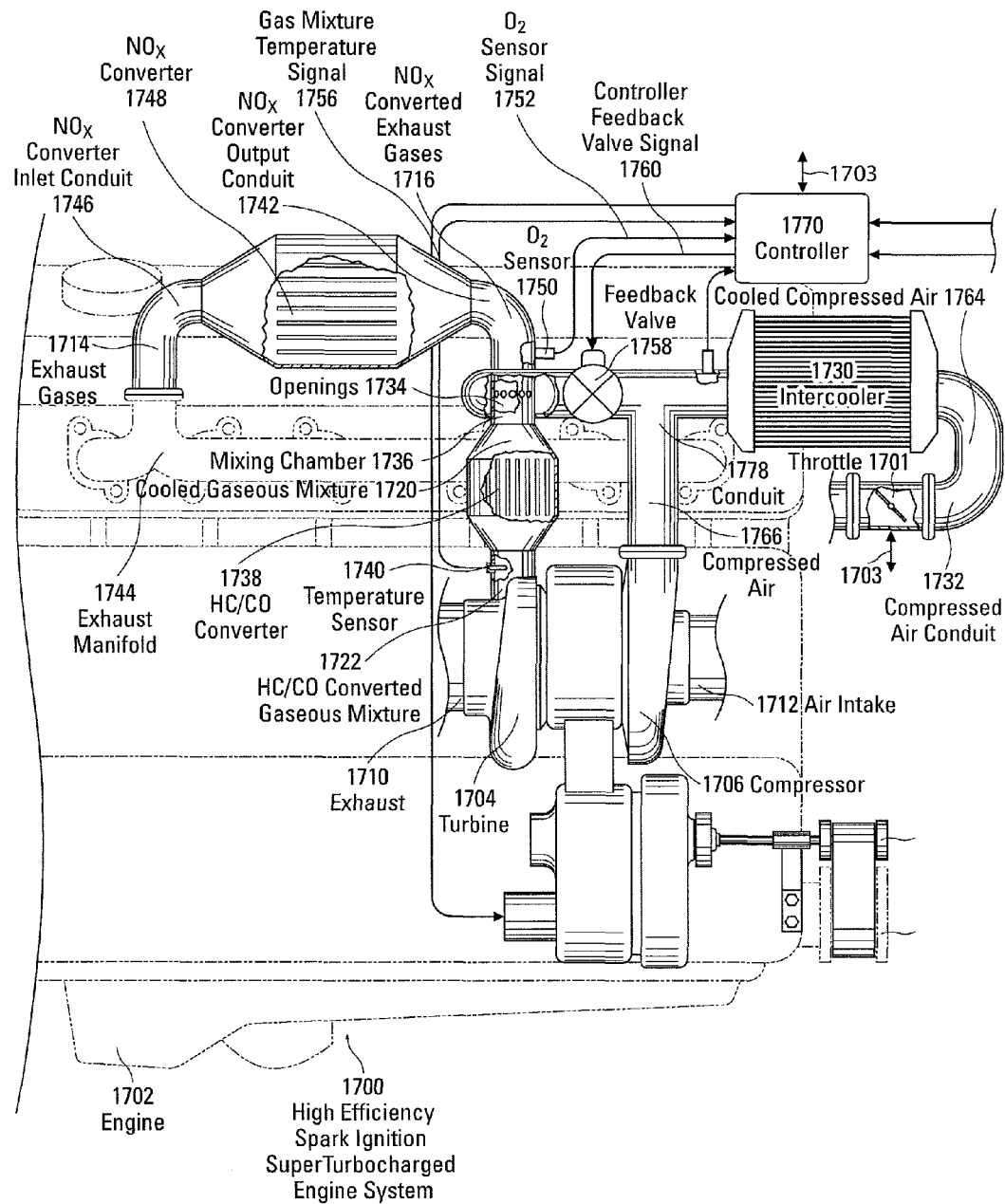
FIG. 17 is another embodiment of a high efficiency super-turbocharged engine system.

FIG. 17 is a schematic illustration of a high efficiency spark ignition super-turbocharged engine system 1700. The super-turbocharged engine system 1700 includes an engine 1702 that has a super-turbocharger. The super-turbocharger includes a turbine 1704 and a compressor 1706. Super-turbocharged engine system 1700 is similar to the super-turbocharged engine system 1600 of FIG. 16 with the conduit 1642, mixing valve 1624 and mixing chamber 1628 removed. As illustrated in FIG. 17, compressor 1706 generates a source of compressed air 1766 from air supplied by air intake 1712. Compressed air 1766 is supplied to conduit 1778. Compressed air 1766 flows through intercooler 1730 which cools the compressed air 1766 to create cooled compressed air 1764 in compressed air conduit 1732 which is coupled to the intake manifold (not shown) of engine 1702. Exhaust gases 1714 emitted by exhaust manifold 1744 flow into $NO_X$ converter inlet conduit 1746. Exhaust gases 1714 then flow from $NO_X$ converter inlet conduit 1746 into $NO_X$ converter 1748, which converts the $NO_X$ gases to produce $NO_X$ converted exhaust gases 1716 in $NO_X$ converter output conduit 1742. Engine 1702 can be allowed to run rich during open throttle conditions and other rich running conditions, which allows the $NO_X$ converter 1748 to operate effectively and allow the engine 1702 to generate a smaller amount of $NO_X$ gases in the combustion chambers of engine 1702. Oxygen sensor 1750 monitors the oxygen level of the $NO_X$ converted exhaust gases 1716 and generates an $O_2$ sensor signal 1752 that is fed to the controller 1770 that indicates the amount of oxygen present in the $NO_X$ converted exhaust gases 1716. A sufficient amount of oxygen must be supplied to the $NO_X$ converted exhaust gases 1716 to ensure that all of the hydrocarbons and carbon monoxide are oxidized in the hydrocarbon/carbon monoxide converter 1738. Controller 1770 generates a controller feedback valve signal 1760 that controls the amount of compressed air 1766 that is applied to mixing chamber 1736. The compressed air 1766 flows through the openings 1734 and mixes with the $NO_X$ converted exhaust gases 1716 to create a cooled gaseous mixture 1720. Temperature sensor 1740 monitors the temperature of the hydrocarbon/carbon monoxide converted gaseous mixture 1722 at the output of the hydrocarbon/carbon monoxide converter 1738 and generates a gas mixture temperature signal 1756 that is applied to controller 1770. Controller 1770 reads the gaseous mixture temperature signal 1756 and controls the feedback valve 1758 via controller feedback valve signal 1760 to open and close the feedback valve 1758 to maintain the temperature of the hydrocarbon/carbon monoxide converted gaseous mixture 1722 at a temperature that does not cause damage to turbine 1704. As pointed out above, temperatures in the range of 900° C. to 950° C., which is just below the temperature at which damage could be caused to turbine 1704, allow for high extraction of energy by turbine 1704 from the hydrocarbon/carbon monoxide converted gaseous mixture 1722. The hydrocarbon/carbon monoxide converted gaseous mixture 1722 is supplied to turbine 1704 to drive turbine 1704. The hydrocarbon/carbon monoxide gaseous mixture 1722 is then exhausted from turbine 1704 via exhaust 1710.

As disclosed with respect to FIGS. 2, 8, 9, 10 and 16, throttle 1701 of FIG. 17 can be used to increase the pressure in compressed air conduit 1732, which, in turn, increases the pressure in conduit 1778. By increasing the pressure in conduit 1778, sufficient flow of compressed air can be created through the feedback valve 1758 to provide sufficient oxygen for oxidation, as well as create sufficient cooling, in the manner described above. Controller 1770 generates a control signal 1703 that operates the throttle 1701.

Figure 18:
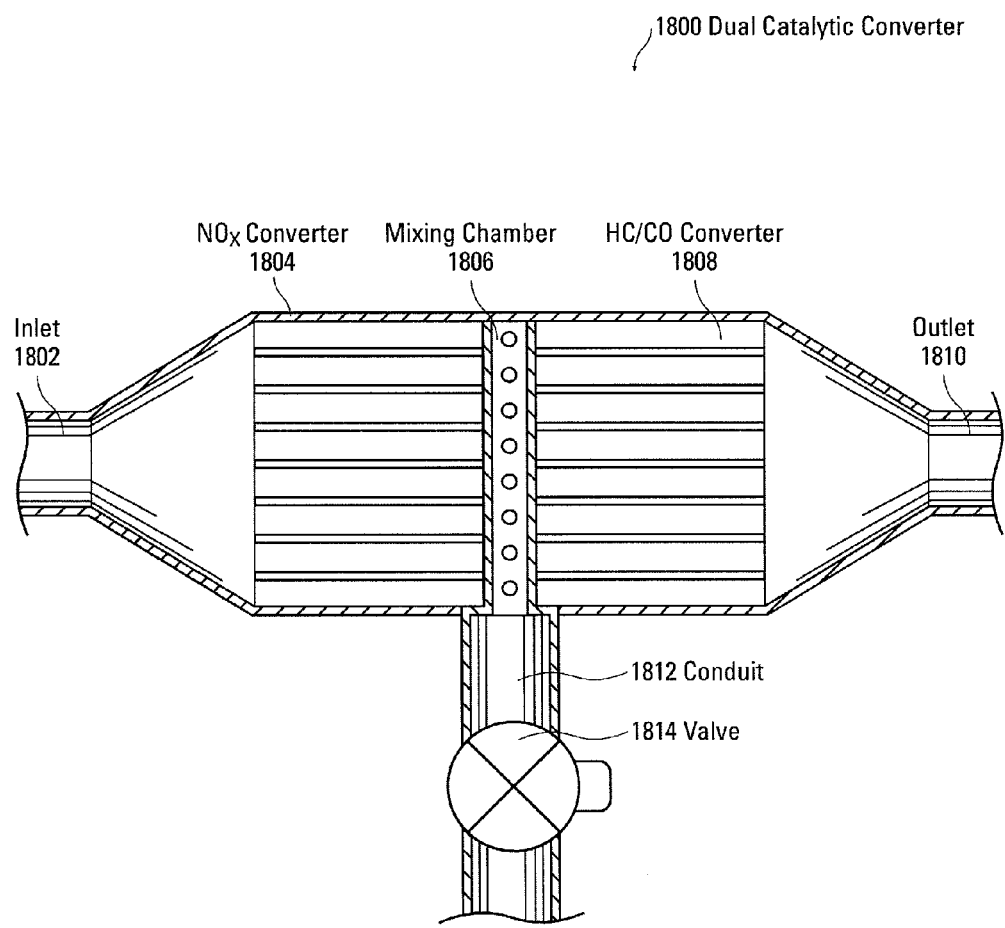
FIG. 18 is schematic illustration of another embodiment of a catalytic converter.

FIG. 18 is a sectional view of an embodiment of dual catalytic converter 1800. As shown in FIG. 18, the dual catalytic converter 1800 has an inlet 1802 in which gaseous mixtures, such as exhaust gases that include nitrogen oxide, carbon monoxide and hydrocarbons, are inserted in the initial stage of the dual catalytic converter 1800, which comprises the $NO_X$ converter section 1804. The $NO_X$ converter 1804 initially reduces the $NO_X$ gases in the gaseous mixture that is applied to the catalytic converter 1800. Fresh air is supplied by one of the compressors illustrated in the various embodiments disclosed above to valve 1814 which controls the amount of air that is supplied to conduit 1812. Conduit 1812 is connected to mixing chamber 1806 which mixes the $NO_X$ converted gases, from $NO_X$ converter section 1804, with the fresh air. The fresh air contains a sufficient amount of oxygen to cause the hydrocarbons and carbon monoxide to be oxidized in the hydrocarbon/carbon monoxide converter section 1808. The converted gases then flow out of outlet 1810.

The advantage of the catalytic converter 1800, illustrated in FIG. 18, is that a stoichiometric mixture of gases does not have to be provided to inlet 1802. In fact, a rich fuel gaseous mixture assists in allowing the $NO_X$ converter section 1804 to operate more effectively. The addition of oxygen to the mixing chamber 1806 allows nearly complete oxidation of the hydrocarbons and carbon monoxide in the hydrocarbon/carbon monoxide converter 1808. In this manner, the converted gases at outlet 1810 are extremely low in pollutants. The dual catalytic converter 1800 is normally not operated in a fashion is which a rich fuel mixture is inserted at the inlet 1802 since the heat created in the oxidation of a rich fuel mixture is normally not recoverable. However, the use of a dual catalytic converter 1800 allows for recapture of the heat generated in the hydrocarbon/carbon monoxide converter section 1808 since the hot exhaust gases are cooled to a nearly optimal temperature, with increased mass flow in the turbine which recaptures the heat energy. In other words, the dual catalytic converter 1800 as well as the two converters 1748, 1738 illustrated in FIG. 17 and the two converters 1648, 1686, illustrated in FIG. 16, allow for effective reduction in pollutants, while not reducing the efficiency of the engine systems, since the heat generated is recaptured in the increased temperatures and increased mass flow of the exhaust gases entering the turbines. Further, the ability to use a rich fuel mixture to run an engine allows for the internal parts of the engine to be cooled by the fuel which increases the longevity of the engine. Moreover, the rich fuel mixture, which initially is applied to a $NO_X$ converter, allows the $NO_X$ converter to work better. The ability to add additional oxygen to the hydrocarbon/carbon monoxide converter, rather than a stoichiometric mixture, allows for full oxidation of hydrocarbons and carbon monoxide so that the exhaust has lower pollutants than standard three-way catalytic converters. Of course, the dual catalytic converter 1800 can be utilized in the embodiments of FIGS. 15A, 15B, 16 and 17.

Figure 19:
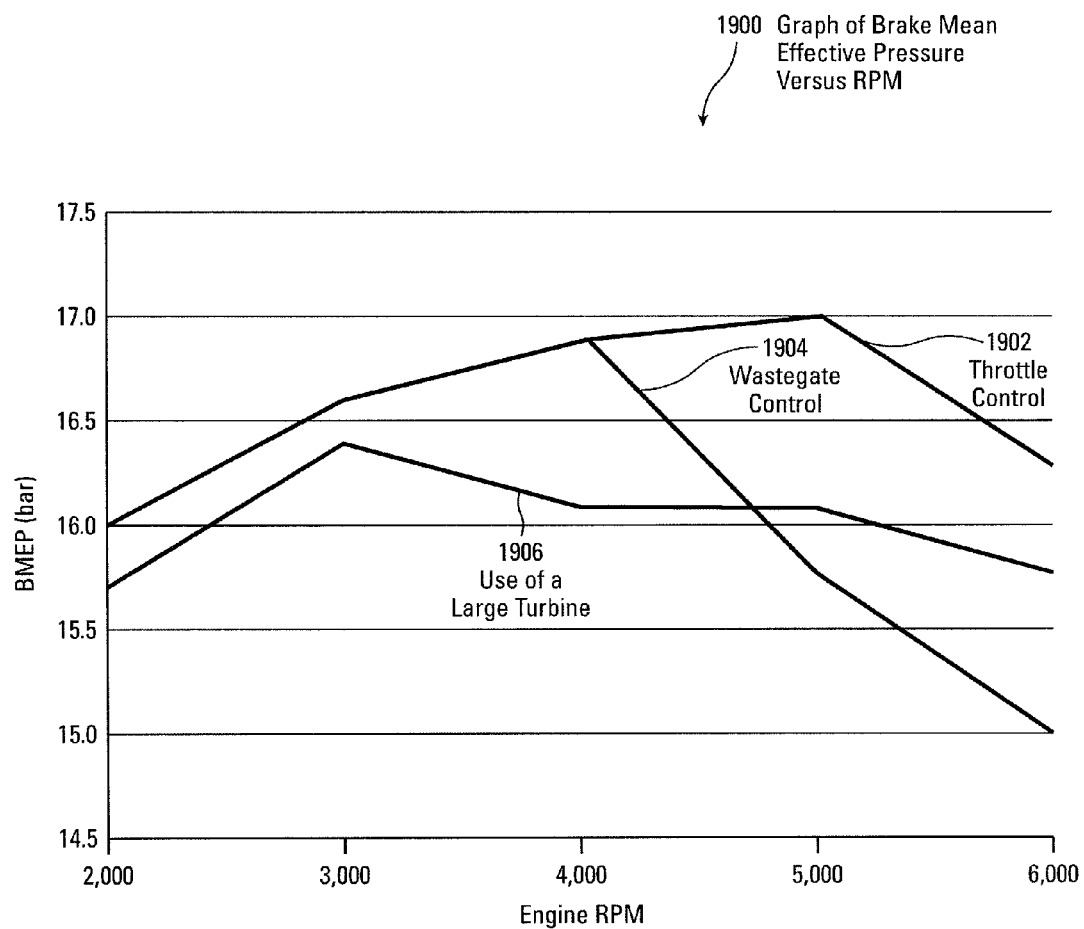
FIG. 19 is a graph of the brake mean effective pressure versus RPM of the engine.

FIG. 19 is a graph 1900 of the brake mean effective pressure versus RPM of the engine. Three cases were simulated with an 80% efficient simple turbine. Plot 1906 illustrates the use of a turbine that is large enough to provide a pressure drop for bypass flow up to 6,000 RPM. Plot 1904 illustrates a smaller turbine that can provide the pressure drop up to 4,000 RPM, with waste gating at 5,000 and 6,000 RPM. Plot 1902 illustrates the same smaller turbine with throttle control used at 5,000 and 6,000 RPM.

Figure 20:
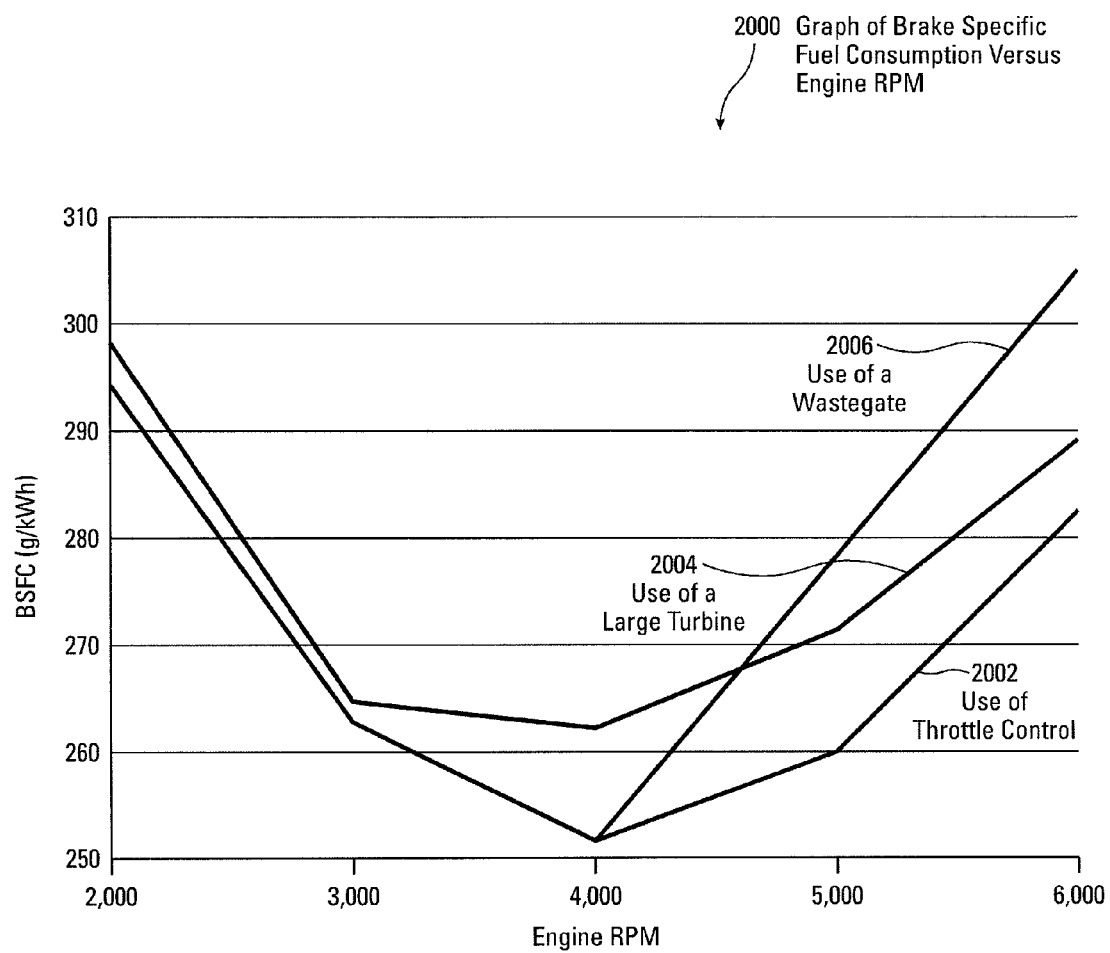
FIG. 20 is a graph of break specific fuel consumption versus engine RPM.

FIG. 20 is a graph 2000 of brake specific fuel consumption versus engine RPM. Plot 2006 illustrates the use of waste gate control in accordance with plot 1904 of FIG. 19. Plot 2004 illustrates the use of a large turbine, which corresponds to plot 1906 of FIG. 19. Plot 2002 illustrates the use of throttle control, which corresponds to the throttle control plot 1902 of FIG. 19. As can be seen from FIG. 20, fuel consumption is significantly lower using the smaller turbine with throttle control, as indicated by plot 2002.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of improving performance of an engine system, wherein said engine system comprises:
    an engine,
    a super-turbocharger that is both mechanically driven by said engine and driven by exhaust gases from said engine comprising:
        a catalytic converter connected to an exhaust conduit proximate to an exhaust outlet of said engine such that pollutants in hot exhaust gases from said engine are reduced and said catalytic converter produces converted exhaust gases,
        a compressor of said super-turbocharger connected to a source of air so that said compressor provides a supply of compressed air to a compressed air conduit that is coupled to an intake of said engine,
        a throttle in said compressed air conduit to increase pressure levels of said compressed air to a level that is greater than exhaust gas pressure levels, and
        a compressed cooling air conduit connected to said compressed air conduit so that said compressed air cooling conduit supplies a portion of said supply of compressed air, upstream from said throttle, to said converted exhaust gases so that said portion of said supply of compressed air is mixed with said converted exhaust gases to produce a gaseous mixture;
    the method comprising:
        supplying said gaseous mixture to a turbine that is mechanically coupled to said compressor so that turbine rotational mechanical energy is generated by said turbine from said gaseous mixture;
        generating a control signal from a controller that regulates said portion of said compressed air that is mixed with said converted exhaust gases to maintain said gaseous mixture below a maximum temperature;
        operating said engine with a fuel mixture to at least create a stoichiometric mixture; wherein a transmission is connected to said compressor and provides propulsion train rotational mechanical energy from a propulsion train of said engine to said compressor to reduce turbo-lag when said flow of said gaseous mixture through said turbine is not sufficient to drive said compressor to a desired boost level, and extracts excess turbine rotational mechanical energy from said turbine that is applied to said propulsion train.

2. A method of improving performance of an engine system, wherein said engine system comprises:
    an engine that operates with a rich fuel mixture to increase output power and performance of said engine system,
    a super-turbocharger that is both mechanically driven by said engine system and driven by exhaust gases from said engine system, and a throttle valve in a compressed air conduit downstream from a compressor of said super-turbocharger;
    the method comprising:
        generating a supply of compressed air from said compressor of said super-turbocharger that compresses intake air in response to a control signal to generate said supply of compressed air in said compressed air conduit coupled to the intake of said engine;
        controlling said throttle valve to control pressure levels of said compressed air in said compressed air conduit to be greater than pressure levels of said exhaust gases from said engine;
        mixing a portion of said supply of said compressed air, upstream from said throttle valve, with said exhaust gases from said engine to produce a gaseous mixture of said exhaust gases and said compressed air;
        supplying said gaseous mixture to a catalytic converter that produces an exothermic reaction that adds heat to said gaseous mixture to generate a converted gaseous mixture at an output of said catalytic converter;
        detecting oxygen levels of said gaseous mixture that enter said catalytic converter;
        detecting said temperature levels of said converted gaseous mixture exiting said catalytic converter;
        adjusting said portion of compressed air, in response to said oxygen levels, to provide a sufficient amount of said portion of compressed air to substantially oxidize hydrocarbons and carbon monoxide present in said gaseous mixture in said catalytic converter, while maintaining a predetermined temperature level of said converted gaseous mixture;
        supplying said converted gaseous mixture to a turbine of said super-turbocharger to drive said turbine with said converted gaseous mixture so that said exothermic reaction in said catalytic converter increases power generated by said turbine.

3. The method of claim 2 wherein said predetermined temperature level is a temperature level that will not damage said turbine.

4. The method of claim 2 wherein said predetermined temperature level is approximately 950° C.

5. A method of improving performance of an engine system, wherein the engine system comprises:
    an engine,
    a super-turbocharger that is both mechanically driven by said engine and driven by exhaust gases from said engine, and
    a throttle valve in a compressed air conduit downstream from a compressor of said super-turbocharger;
    the method comprising:
        supplying a fuel mixture to said engine system to at least create a stoichiometric mixture;
        applying said exhaust gases from said engine system to an NOx converter, which converts said exhaust gases to produce NOx converted gases;

generating a supply of compressed air from said compressor of said super-turbocharger that is supplied to said compressed air conduit;

controlling said throttle valve to control pressure levels of said compressed air in said compressed air conduit so that said pressure levels of said compressed air are greater than pressure levels of said exhaust gases from said engine:

mixing a first portion of said supply of said compressed air upstream from said throttle valve with said NOx converted gases to produce a first gaseous mixture of said NOx converted gases and said compressed air;

supplying said first gaseous mixture to a hydrocarbon/carbon monoxide converter that performs an exothermic reaction which is produced by residual fuel, hydrocarbons and carbon monoxide present in said NOx converted gases resulting from use of said rich fuel mixture, said exothermic reaction generating heat and producing hydrocarbon/carbon monoxide converted gases;

mixing a second portion of said supply of compressed air upstream from said throttle valve with said hydrocarbon/carbon monoxide converted gases to cool said hydrocarbon/carbon monoxide converted gases to a desired temperature to produce cooled hydrocarbon/carbon monoxide converted gases;

driving a turbine of said driven turbocharger with said cooled hydrocarbon/carbon monoxide converted gases so that said exothermic reaction in said hydrocarbon/carbon monoxide converter increases power generated by said turbine.

6. The method of claim 5, wherein said desired temperature is a temperature that will not damage said turbine.

7. The method of claim 5, wherein said first portion of compressed air is an amount that will allow said hydrocarbon/carbon monoxide converter to substantially fully oxidize hydrocarbons and carbon monoxide in said NOx converted gases.

8. A method of increasing the performance of a piston engine system,
wherein said piston engine system comprises:
a piston engine,
a super-turbocharger that is both mechanically driven by said engine and driven by exhaust gases from said piston engine, and
a throttle valve in a compressed air conduit coupled to an intake of said piston engine downstream from a compressor of said super-turbocharger;
the method comprising:
supplying a rich fuel mixture to said piston engine system to increase output power of said piston engine system;
applying said exhaust gases from said piston engine system to an NOx converter, which converts said exhaust gases to produce NOx converted gases;
generating a supply of compressed air from said compressor of said super-turbocharger that compresses intake air in response to a control signal to generate said supply of compressed air in a compressed air conduit coupled to an intake of said piston engine;
controlling said throttle valve to control pressure levels of said compressed air in said compressed air conduit so that pressure levels of said compressed air are greater than pressure levels of said exhaust gases from said piston engine;
mixing a portion of said supply of said compressed air upstream from said throttle valve with said NOx converted gases to produce a gaseous mixture of said NOx converted gases and said compressed air;

supplying said gaseous mixture of said NOx converted gases and said compressed air to a hydrocarbon/carbon monoxide converter to produce hydrocarbon/carbon monoxide converted gases;

detecting a temperature level of said hydrocarbon/carbon monoxide converted gases;

adjusting said portion of said supply of said compressed air to adjust said temperature level of said hydrocarbon/carbon monoxide converted gases to a desired temperature level;

supplying said hydrocarbon/carbon monoxide converted gases to a turbine of said driven turbocharger to drive said turbine with said hydrocarbon/carbon monoxide converted gases.

9. The method of claim 8, wherein said desired temperature level is a temperature level that will not damage said turbine.

10. The method of claim 8, wherein said process of mixing said portion of said supply of said compressed air with said NOx converted gases comprises:
mixing said portion of said supply of said compressed air in an amount that is sufficient to substantially fully oxidize hydrocarbons and carbon monoxide in said NOx converted gases.

11. A method of improving performance of an engine system, wherein said engine system comprises:
an engine that operates with a rich fuel mixture to increase output power of said engine;
a super-turbocharger that is both mechanically driven by said engine system and driven by exhaust gases from said engine system, and a throttle valve in a compressed air conduit coupled to an intake of said engine downstream from a compressor of said super-turbocharger;
the method comprising:
generating a supply of compressed air from a compressor that is supplied to a compressed air conduit;
controlling said throttle valve to control pressure levels of said supply of compressed air in said compressed air conduit so that said pressure levels of said supply of compressed air are greater than pressure levels of the exhaust gases from said engine;
mixing a first portion of said supply of said compressed air with said exhaust gases from said engine at a location that is upstream from said throttle valve to produce a first gaseous mixture of said exhaust gases and said compressed air;
supplying said first gaseous mixture to a catalytic convertor that produces an exothermic reaction that adds heat to said first gaseous mixture to generate a converted first gaseous mixture at an output of said catalytic converter;
detecting oxygen levels of said first gaseous mixture that enter said catalytic converter;
mixing a second portion of said compressed air with said converted first gaseous mixture downstream from said catalytic converter to produce a cooled second gaseous mixture of said converted first gaseous mixture said second portion of said compressed air detecting said temperature levels of said cooled second gaseous mixture;
adjusting said first portion of compressed air, in response to said oxygen levels, to provide a sufficient amount of said first portion of compressed air to substantially oxidize hydrocarbons and carbon monoxide present in said first gaseous mixture in said catalytic converter;
adjusting said second portion of compressed air to control a temperature level of said cooled second gaseous mixture that is less than a predetermined temperature level;

supplying said cooled second gaseous mixture to a turbine of said driven turbocharger to drive said turbine with said cooled second gaseous mixture so that said exothermic reaction in said catalytic converter increases turbine rotational mechanical energy generated by said turbine;

transmitting said turbine rotational mechanical energy from said turbine to said compressor that uses said turbine rotational mechanical energy to compress a source of air to produce said supply of compressed air when said flow of said cooled second gaseous mixture through said turbine is sufficient to drive said compressor;

extracting a portion of said turbine rotational mechanical energy from said turbine and applying said portion of said turbine rotational mechanical energy to a propulsion train when said portion of said turbine rotational mechanical energy from said turbine is not needed to run said compressor;

providing propulsion train rotational mechanical energy from said propulsion train to said compressor to prevent turbo-lag when said flow of said gaseous mixture through said turbine is not sufficient to drive said compressor.

12. The method of claim 11, wherein said predetermined temperature level of said cooled second gaseous mixture is below a temperature at which said cooled second gaseous mixture would cause damage to said turbine.

13. The method of claim 12, wherein said predetermined temperature level of said cooled second gaseous mixture is below approximately 950° C.

14. The method of claim 11, wherein efficiency of said engine is improved by not using a waste gate to expel excess converted first gaseous mixture.

15. The method of claim 14, wherein said engine further comprises:
a transmission that couples said portion of said turbine rotational mechanical energy and said propulsion train rotational mechanical energy between said propulsion train and a shaft connecting said turbine and said compressor.

16. The method of claim 15, wherein said engine further comprises:
a second mixing chamber having at least one opening in an exhaust conduit that is connected to a compressed air conduit so that said second portion of compressed air flows through said at least one opening and mixes with said hotter exhaust gases in said exhaust conduit.

17. An engine system comprising:
an engine that operates with a rich fuel mixture to increase output power of said engine;
a super-turbocharger that is both mechanically driven by said engine system and driven by exhaust gases from said engine system;
a catalytic converter connected to an exhaust conduit proximate to an exhaust outlet of said engine such that pollutants in said exhaust gases from said engine are reduced and said catalytic converter produces converted exhaust gases that are heated by oxidation of hydrocarbons and carbon monoxide present in said exhaust gases resulting from use of said rich fuel mixture;
a compressor of said super-turbocharger that is connected to a source of air so that said compressor generates a supply of air that is applied to a compressed cooling air conduit;
a compressed cooling air conduit coupled to said compressor; a throttle valve located in said compressed cooling air conduit that increases pressure levels of said compressed air to a level that is greater than pressure levels of said exhaust gases from said engine;
a feedback valve coupled to said compressed cooling air conduit that supplies a portion of said supply of compressed air from said compressed cooling air conduit to a mixing chamber to mix said portion of said supply of compressed air with said converted exhaust gases so that said portion of said supply of compressed air is mixed with said converted exhaust gases to produce a gaseous mixture;
a turbine of said super-turbocharger that is mechanically coupled to said compressor and coupled to said mixing chamber so that said turbine is driven by said gaseous mixture;
a controller that generates a control signal that controls said feedback valve to regulate said portion of said supply of compressed air to maintain said gaseous mixture below a maximum temperature;
a transmission that provides engine rotational mechanical energy from said engine to said compressor to reduce turbo-lag when said flow of said exhaust through said turbine is not sufficient to drive said compressor to a desired boost level, and extracts excess turbine rotational mechanical energy from said turbine and applies said excess turbine rotational mechanical energy to said engine.

18. An engine system that operates with a rich fuel mixture comprising:
an engine of said engine system that operates with a rich fuel mixture that increases output power of said engine;
a super-turbocharger that is both mechanically driven by said engine system and driven by exhaust gases from said engine system, said super-turbocharger having a turbine and a compressor that that provides a supply of compressed air to a compressed air conduit coupled to an intake of said engine;
a throttle valve disposed in said compressed air conduit downstream from said compressor that increases pressure of said compressed air;
a mixing chamber that mixes exhaust gases from said engine system with a portion of said supply of compressed air upstream from said throttle valve to produce a gaseous mixture of said exhaust gases and said compressed air;
a catalytic converter connected downstream from said mixing chamber that produces an exothermic reaction that adds heat to said gaseous mixture to generate a converted gaseous mixture at an output of said catalytic converter;
an oxygen sensor that senses oxygen levels of said gaseous mixture entering said catalytic converter and generates an oxygen sensor signal;
a temperature sensor that senses said temperature levels of said converted gaseous mixture exiting said catalytic converter and generates a temperature sensor signal;
a controller that generates a control signal in response to said oxygen sensor signal and said temperature sensor signal that controls said portion of said supply of compressed air provided to said catalytic converter so that said portion of said supply of compressed air is sufficient for said catalytic converter to substantially oxidize hydrocarbons and carbon monoxide in said gaseous mixture while maintaining a temperature level of said converted gaseous mixture exiting said catalytic converter that is less than a predetermined temperature level, and controls operation of said throttle to control pressure levels of said compressed air in said compressed air conduit so that said pressure levels of said compressed air in said compressed air conduit are greater than pressure levels of said exhaust gases;

wherein said turbine is driven with said converted gaseous mixture so that said exothermic reaction in said catalytic converter increases power generated by said turbine.

19. The engine system of claim 18, wherein said predetermined temperature level is a temperature level that is less than a temperature that will damage said turbine.

20. The engine system of claim 18, wherein said predetermined temperature level is approximately 950° C.

21. An engine system comprising:
a piston engine that operates with a rich fuel mixture to increase output power of said piston engine system and generates exhaust gases that are rich with carbon monoxide and hydrocarbons;
a super-turbocharger, that is both mechanically driven by said engine system and driven by exhaust gases from said engine system;
a NOx converter coupled to receive said exhaust gases and produce NOx converted gases in an oxygen deficient environment resulting from said rich fuel mixture;
a compressor of said driven turbocharger that provides compressed air that is applied to a compressed air conduit of said engine system;
a throttle located downstream from said compressor in said compressed air conduit of said engine system that increases pressure levels of said compressed air to a level that is greater than pressure levels of said exhaust gases;
a compressed cooling air conduit that supplies portion of said compressed air from said compressed air conduit upstream from said throttle to said NOx converted gases so that said NOx converted gases are mixed with said portion of said compressed air to produce a gaseous mixture;
a hydrocarbon/carbon monoxide converter coupled to receive said gaseous mixture and oxidize hydrocarbons and carbon monoxide present in said gaseous mixture in an exothermic reaction resulting from residual fuel in said rich fuel mixture which generates heat and produces to produce a hydrocarbon/carbon monoxide converted gaseous mixture;
a turbine of said super-turbocharger that is coupled to receive said hydrocarbon/carbon monoxide gaseous mixture and generate turbine rotational mechanical energy from said hydrocarbon/carbon monoxide converted gaseous mixture so that said exothermic reaction in said hydrocarbon/carbon monoxide converter increases turbine rotational mechanical energy generated by said turbine.

22. The engine system of claim 21, further comprising:
a controller that generates a control signal that regulates said portion of said compressed air to maintain said gaseous mixture below a maximum temperature and controls said throttle so that pressure levels of said compressed air are increased to exceed said exhaust gas pressure levels over a range of operating conditions of said engine system.

23. The engine system of claim 21, further comprising:
a transmission that extracts excess turbine rotational mechanical energy from said turbine and converts excess turbine rotational mechanical energy to propulsion train rotational mechanical energy.

24. The engine system of claim 21, wherein said portion of said compressed air supplies a sufficient amount of oxygen to cause said hydrocarbons and carbon monoxide to be substantially fully oxidized in said hydrocarbon/carbon monoxide converter.

25. The engine system of claim 24, wherein said portion of said compressed air is sufficient to cool said hydrocarbon/carbon monoxide converted gaseous mixture to a desired temperature.

26. The engine system of claim 21, wherein said portion of said compressed air is sufficient to cool said hydrocarbon/carbon monoxide converted gaseous mixture to a desired temperature.

27. The engine system of claim 21, further comprising:
an additional compressed cooling air conduit that supplies an additional portion of said compressed air that is mixed with said hydrocarbon/carbon monoxide converted gaseous mixture to cool said hydrocarbon/carbon monoxide converted gaseous mixture to a temperature level below a maximum temperature level that would cause damage to said turbine.

28. An engine system comprising:
a piston engine that generates exhaust gases;
a super-turbocharger, that is both mechanically driven by said engine system and driven by exhaust gases from said engine system;
a NOx converter coupled to receive said exhaust gases and produce NOx converted gases;
a compressor of said driven turbocharger connected to a source of air that provides compressed air that is applied to a compressed air conduit of said engine system;
a throttle located downstream from said compressor in said compressed air conduit of said engine system that increases pressure levels of said compressed air to a level that is greater than pressure levels of said exhaust gases;
a feedback valve that supplies a portion of said compressed air upstream from said throttle that is mixed with said NOx converted gases to produce a gaseous mixture;
a hydrocarbon/carbon monoxide converter connected to receive said gaseous mixture and oxidize hydrocarbons and carbon monoxide in said gaseous mixture to produce a hydrocarbon/carbon monoxide converted gaseous mixture;
a turbine of said super-turbocharger that is coupled to receive said hydrocarbon/carbon monoxide gaseous mixture and generate turbine rotational mechanical energy from said hydrocarbon/carbon monoxide converted gaseous mixture.

29. The engine system of claim 28, further comprising:
a controller that generates a first control signal that regulates said portion of said compressed air to maintain said gaseous mixture below a maximum temperature and a second control signal that controls operation of said throttle.

30. The engine system of claim 29, further comprising:
a transmission that extracts excess turbine rotational mechanical energy from said turbine and converts said excess turbine rotational mechanical energy to propulsion train rotational mechanical energy.

31. The engine system of claim 30, wherein said transmission provides propulsion train rotational mechanical energy from a propulsion train to said compressor to reduce turbo-lag when said flow of said exhaust gases through said turbine is not sufficient to drive said compressor to a desired boost level.

32. The engine system of claim 30, wherein said transmission extracts excess turbine rotational mechanical energy from said turbine to maintain rotational speeds of said compressor to drive said compressor to a desired boost level.

33. The engine system of claim 30, wherein said transmission extracts excess turbine rotational mechanical energy from said turbine to maintain rotational speeds of said compressor below a predetermined maximum rotational speed at which damage would occur to said compressor.

34. The engine system of claim 30, wherein said transmission provides propulsion train rotational mechanical energy from a propulsion train to said compressor to drive said compressor to a desired boost level when said flow of said exhaust through said turbine is not sufficient.

35. The engine system of claim 34, wherein said feedback valve allows said portion of said compressed air to be mixed with said NOx converted gases to avoid surge and achieve a desired boost level when said flow of compressed air through said compressor would otherwise cause surge in said compressor.

36. The engine system of claim 28, wherein said portion of said compressed air supplies a sufficient amount of oxygen to cause said hydrocarbons and carbon monoxide to be substantially fully oxidized in said hydrocarbon/carbon monoxide converter.

37. The engine system of claim 36, wherein said portion of said compressed air is sufficient to cool said hydrocarbon/carbon monoxide converted gaseous mixture to a desired temperature.

38. The engine system of claim 28, wherein said portion of said compressed air is sufficient to cool said hydrocarbon/carbon monoxide converted gaseous mixture to a desired temperature.

39. The engine system of claim 28, further comprising:
a second feedback valve that supplies a second portion of said compressed air that is mixed with said hydrocarbon/carbon monoxide converted gaseous mixture to cool said hydrocarbon/carbon monoxide converted gaseous mixture to a temperature level below a maximum temperature level that would cause damage to said turbine.

* * * * *